(12) United States Patent
Kocaturk

(10) Patent No.: US 8,155,145 B2
(45) Date of Patent: Apr. 10, 2012

(54) METHOD AND SYSTEM FOR TELECOMMUNICATIONS USING LAYER 3 PACKETS OBTAINED FROM A SEQUENCE OF LAYER 2 RADIO LINK CONTROL LAYER DATA FRAMES

(75) Inventor: Mustafa Kocaturk, University Park, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 497 days.

(21) Appl. No.: 12/058,352

(22) Filed: Mar. 28, 2008

(65) Prior Publication Data
US 2009/0252040 A1 Oct. 8, 2009

(51) Int. Cl.
*H04J 3/22* (2006.01)
(52) U.S. Cl. ............... 370/469
(58) Field of Classification Search ............... 370/394, 370/349, 338, 345, 329, 320, 469, 470, 471, 370/229
See application file for complete search history.

(56) References Cited

U.S. PATENT DOCUMENTS

| | | | |
|---|---|---|---|
| 2003/0046581 A1* | 3/2003 | Call et al. | 713/201 |
| 2006/0007859 A1* | 1/2006 | Kadambi et al. | 370/229 |
| 2009/0323646 A1* | 12/2009 | Ketchum et al. | 370/338 |

* cited by examiner

*Primary Examiner* — Man Phan
*Assistant Examiner* — Nourali Mansoury

(57) ABSTRACT

A telecommunications system includes a first node. The system includes a base station that communicates with the first node. The system includes a radio network controller in communication with the base station. The system includes a computer in communication with the radio network controller that reassembles a sequence of layer 3 packets from a sequence of layer 2 radio link control layer data frames that originates from the first node. The system includes a network in communication with the computer and the radio network controller. The system includes a second node in communication with the network. A method for identifying performance of wireless packet communications.

29 Claims, 5 Drawing Sheets

METHOD AND SYSTEM FOR TELECOMMUNICATIONS USING LAYER 3 PACKETS OBTAINED FROM A SEQUENCE OF LAYER 2 RADIO LINK CONTROL LAYER DATA FRAMES

FIELD OF THE INVENTION

The present invention is related to the use of layer 3 packets obtained from a sequence of layer 2 radio link control layer data frames in a telecommunications network. (As used herein, references to the "present invention" or "invention" relate to exemplary embodiments and not necessarily to every embodiment encompassed by the appended claims.) More specifically, the present invention is related to measuring performance of a communication in the telecommunications network by collecting measurement logs of layer 2 radio link control layer frames sent from a wireless packet data terminal containing an end-to-end communication so established, by switching on a trace function built into the radio network controller for such measurement, and reassembling a sequence of layer 3 packets from a sequence of the layer 2 radio link control layer data frames in regard to the measurement logs.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The promptness of response to a user request is a key indicator of the quality of a packet data service. Operators regularly collect measurements of response time at various network elements to be able to monitor and improve end-user experience.

This invention makes it possible to use measurements collected at link layer (layer 2) to improve the user experience of a packet data application on the network layer (layer 3).

End-user applications use packets carried at layer 3 and above in the Open Systems Interconnection (OSI) model.

To measure the response time accurately, it is essential to collect measurements as close to the user as possible.

The collected measurement must contain sufficient data to identify the request and the response, and to accurately determine the time each was sent and received. The message length must also be known, which requires that the entire packet be captured.

When the correct set of packets and their time stamps are known, the greatest component of the indicator is identified, making it possible to localize and eliminate any source of unnecessary delays in the transaction path, thus improving the application design to consistently deliver better user experience.

The backbone of the network is usually connected together with a high-speed and a low-delay connection technology, where performance is tightly controlled by the operator, with plenty of throughput to carry the offered load with minimum delay.

The remaining parts of the end-to-end service delivery path consist of the "edge", comprising the access and user terminal, which share limited resources with other users. When limited resources are shared, delay is incurred in accessing the resource.

Battery saving techniques add to the delay. When access connection is established, the resulting throughput depends on factors such as the type of access technology, channel, quality, and throughput of service negotiated. Because of the range of possible outcomes, the access and terminal incur a relatively large and variable delay compared to the other segments of the path. This contribution must therefore be measured accurately to correctly quantify its share in the end-to-end delay experienced by the user.

A well-known method exists to capture the time stamp, header, and packet data carried on certain network access hardware, such as Ethernet. This method is known as Packet Capture, tcpdump, or PCAP method.

The PCAP method works natively on a wide range of fixed and wireless access hardware, including WiFi, ATM, and IRDA. PCAP is used to collect measurements in the backbone network.

In access nodes, such as base station controller (BSC) and Radio Network Controller (RNC), frame time stamp and data can be captured at layer 2.

Layer 3 packet capture using PCAP is possible in a mobile packet core or backbone node, which works well for packet data application measurements.

A mobile radio access network controller works at layer 2, with frames belonging to the Radio Link Control (RLC) protocol. A frame is captured with its timestamp at layer 2, but the corresponding layer-3 information is not readily available at layer 2 with adequate precision and completeness.

To be able to use the measurement data collected on layer 2, the RLC protocol frames on layer 2 must be reassembled to constitute layer 3 IP packets. This reassembly procedure can be time consuming and prone to error if attempted manually. The magnitude of the challenge and potential for error is multiplied with the number of packets that must be handled to achieve a level of significance of measurement, making manual/mental processing prohibitively costly.

BRIEF SUMMARY OF THE INVENTION

The present invention pertains to a telecommunications system. The system comprises a first node. The system comprises a base station that communicates with the first node. The system comprises a radio network controller in communication with the base station. The system comprises a computer in communication with the radio network controller that reassembles a sequence of layer 3 packets from a sequence of layer 2 radio link control layer data frames that originates from the first node. The system comprises a network in communication with the computer and the radio network controller. The system comprises a second node in communication with the network.

The present invention pertains to a method for identifying performance of wireless packet communications. The method comprises the steps of establishing a wireless packet data communication between a first user and a second user, where the first user communicates with the second user through a wireless packet data terminal, a base station, a radio network controller, a mobile packet network, an external packet network, and the second user's communication network. There is the step of measuring performance of the communication by collecting measurement logs of layer 2 radio link control layer frames sent from the wireless packet data terminal containing the end-to-end communication so established, by switching on a trace function built into the radio network controller for such measurement. There is the step of transferring the collected layer 2 measurement logs to a computer. There is the step of reassembling a sequence of layer 3 packets from a sequence of the layer 2 radio link control layer data frames in regard to the measurement logs.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
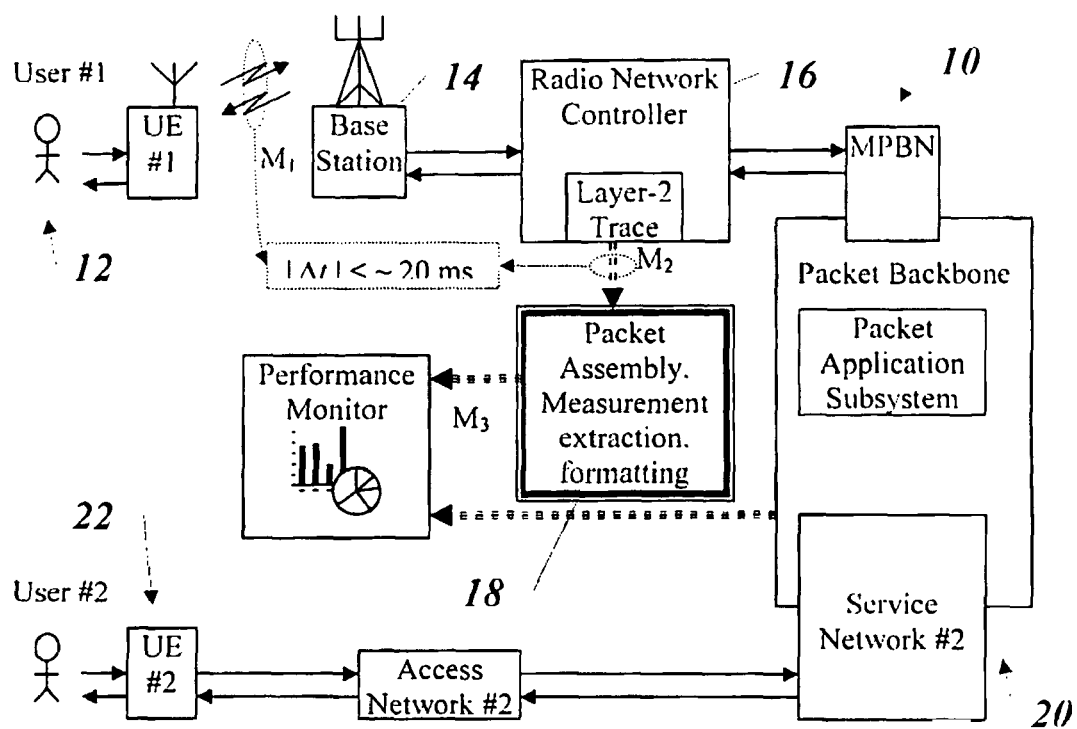
FIG. 1 shows a flow of packets, frames, and performance measurements in a packet-based service session of a telecommunications system of the present invention.

Referring now to the drawings wherein like reference numerals refer to similar or identical parts throughout the several views, and more specifically to FIG. 1 thereof, there is shown a telecommunications system 10. The system 10 comprises a first node 12. The system 10 comprises a base station 14 that communicates with the first node 12. The system 10 comprises a radio network controller 16 in communication with the base station 14. The system 10 comprises a computer 18 in communication with the radio network controller 16 that reassembles a sequence of layer 3 packets from a sequence of layer 2 radio link control layer data frames that originates from the first node 12. The system 10 comprises a network 20 in communication with the computer 18 and the radio network controller 16. The system 10 comprises a second node 22 in communication with the network 20. For purposes herein, the term computer includes but is not limited to a standalone computer, a server, a PC, a processor or any other device capable of processing data such as a processor board.

Preferably, the computer 18 reads radio links control measurement sequentially, acting on data frame logging units in the measurements. Each unit preferably includes a timestamp, a terminal identifier, a channel identifier, a direction indicator, a frame type indicator, a sequence number, bearer type, and data bytes. Preferably, the computer 18 detects a beginning of a data frame logging unit delivered in multi-line textual format, and extracts the corresponding timestamp, terminal identifier, channel identifier, direction indicator, frame type indicator, sequence number, bearer type, data frame size, and data header size, hereafter collectively called a logging unit header.

Figure 4:
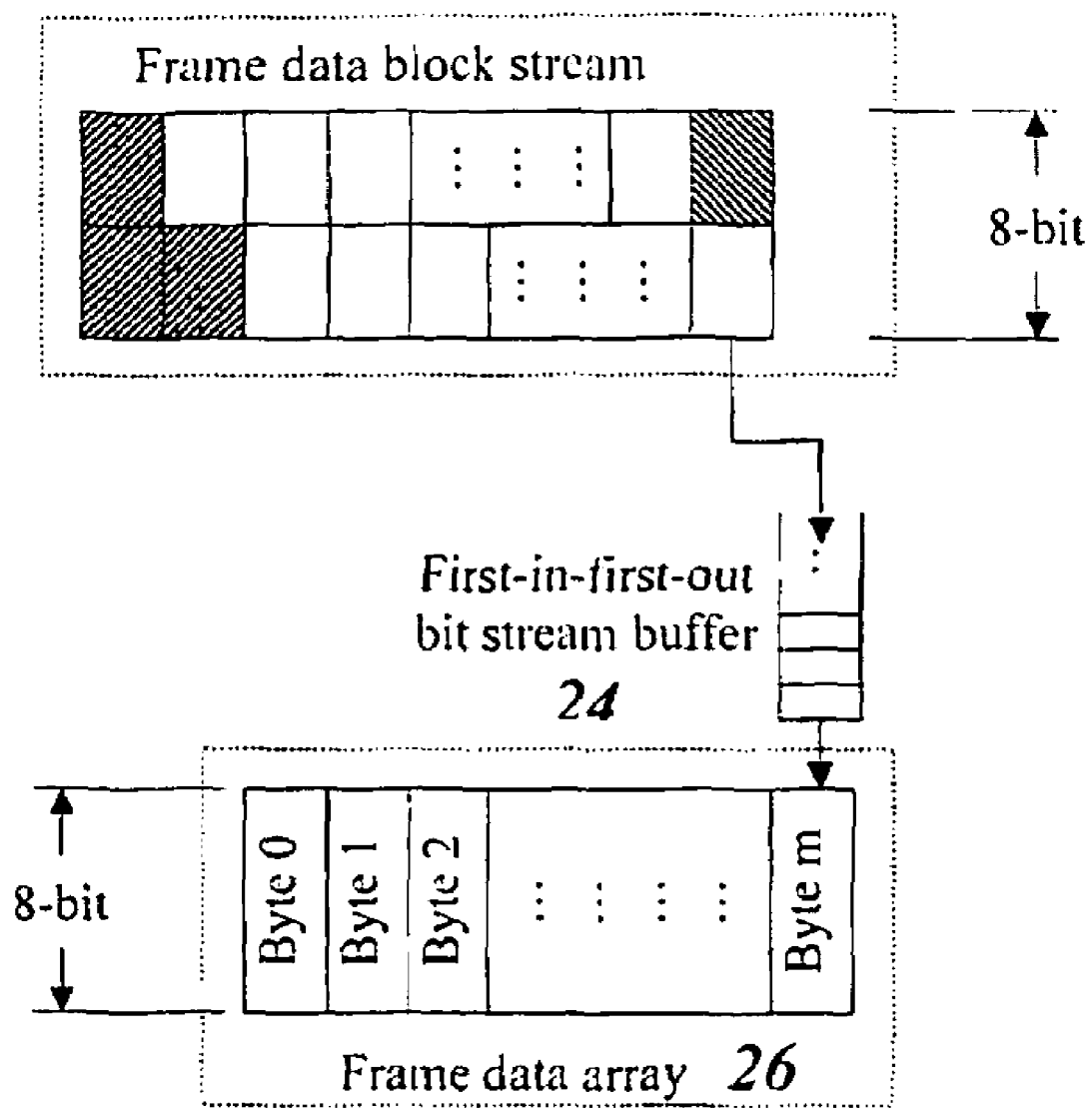
FIG. 4 is a block diagram of the frame data header elimination and frame data extraction operation of the system.

The computer 18 preferably detects a number of lines containing data bytes following the logging unit header. The system 10 preferably includes a first-in-first-out-bit stream buffer 24 having an in port and an out port as shown in FIG. 4, and wherein the computer 18 reads each data byte from a data frame logging unit stream, discards the contents of the first n bit positions in each data frame logging unit, where n is given by the data header size of the data frame logging unit header, and with each subsequent byte read from the frame header into the in port of the buffer, a byte is taken away from the out port of the buffer, the byte so removed from the buffer is appended to an array 26 representing the data frame logging unit. Preferably, the computer 18 detects an end of the sequence of data bytes in the logging unit. The computer 18 preferably filters out any line of trace log text that contains information germane to the packet flow and that is not part of the logging unit to save memory and processing time resources during reassembly of the sequence of layer 3 packets. Preferably, the computer 18 constructs a channel identity based on the terminal identifier, channel identifier, direction, and channel type.

Figure 3:
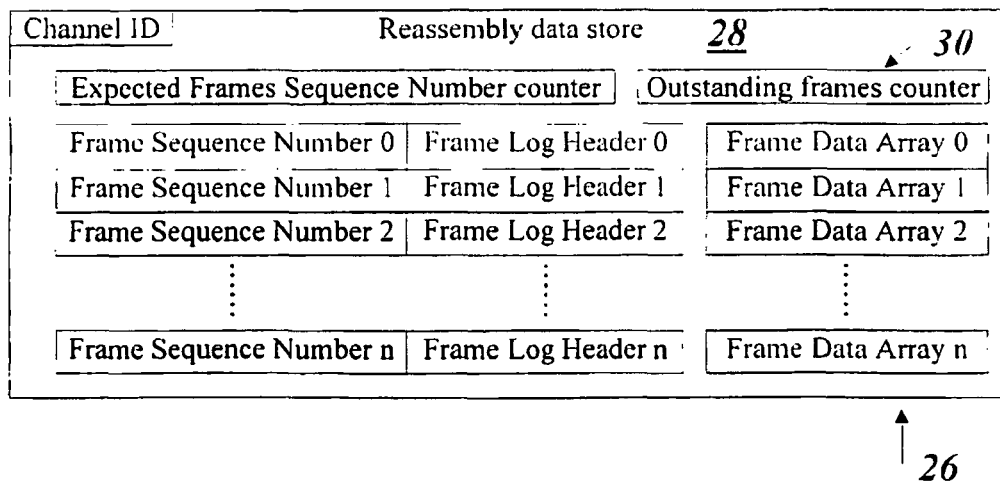
FIG. 3 shows components of a reassembly data store for one channel in the system.

The computer 18 preferably derives for each channel identity an expected frame sequence number for a next frame by incrementing the last sequence number received. Preferably, the system 10 includes a reassembly data store 28 corresponding to the channel identity, as shown in FIG. 3, and wherein the computer 18 stores the data frame in a storage cell corresponding to the sequence number on the data store 28 if the sequence number is equal to an expected sequence number and the data frame is free of error.

For capturing the layer 3 packet start time, the computer 18 preferably writes an artificial ICMP Timestamp Request packet in PCAP format, with the timestamp of a first data frame starting the reassembly of each layer 3 packet. Preferably, the writing by the computer 18 of the ICMP Timestamp Request packet indicating packet start time can be enabled or disabled by a switch. The computer 18 preferably writes the reassembled layer 3 packet in PCAP format, with the timestamp of the last data frame completing the reassembly.

Preferably, the system 10 includes an outstanding frames counter 30, and wherein if the received frame sequence number exceeds the expected number, by less than a threshold, then intervening frames are considered to have been lost, and the outstanding frames counter 30 is incremented by the number of intervening frames. The computer 18 preferably recognizes as outstanding and stores the received frame number sequence in the storage cell if the received frame sequence number is less than the expected frame sequence number and has a corresponding empty cell in the data store 28, and decrements the corresponding outstanding frames counter 30 by one. Preferably, the computer 18 has reassembled the layer 3 packet if the data frame contains an end of a service data unit and if there are no outstanding packets.

The present invention pertains to a method for identifying performance of wireless packet communications. The method comprises the steps of establishing a wireless packet data communication between a first user and a second user, where the first user communicates with the second user through a wireless packet data terminal, a base station 14, a radio network controller 16, a mobile packet network 20, an external packet network 20, and the second user's communication network 20. There is the step of measuring performance of the communication by collecting measurement logs of layer 2 radio link control layer frames sent from the wireless packet data terminal containing the end-to-end communication so established, by switching on a trace function built into the radio network controller 16 for such measurement. There is the step of transferring the collected layer 2 measurement logs to a computer 18. There is the step of reassembling a sequence of layer 3 packets from a sequence of the layer 2 radio link control layer data frames in regard to the measurement logs.

Preferably, the reassembling step includes the steps of the computer 18 reading radio link control measurements sequentially, and acting on data frame logging units in the measurements. Each unit preferably includes a timestamp, a terminal identifier, a channel identifier, a direction indicator, a frame type indicator, a sequence number, bearer type, and data bytes and the reassembling step includes the steps of the computer 18 detecting a beginning of a data frame logging unit delivered in multi-line textual format, and extracting the corresponding timestamp, terminal identifier, channel identifier, direction indicator, frame type indicator, sequence number, bearer type, data frame size, and data header size, hereafter collectively called a logging unit header. Preferably, the reassembling step includes the step of the computer 18 detecting a number of lines containing data bytes following the logging unit header. There is preferably a first-in-first-out-bit stream buffer 24 having an in port and an out port and wherein reassembling step includes the steps of the computer 18 reading each data byte from a data frame logging unit stream, discarding the contents of the first n bit positions in each data frame logging unit, where n is given by the data header size of the data frame logging unit header, and with each subsequent byte read from the frame data logging unit stream into the in port of the buffer, taking a byte away from the out port of the buffer, the byte so removed from the buffer is appended to an array 26 representing the data frame logging unit. The reassembling step preferably includes the step of the computer 18 detecting an end of the sequence of data bytes in the logging unit.

Preferably, the reassembling step includes the step of the computer 18 filtering out any line of trace log text that contains information germane to the packet flow and that is not part of the logging unit to save memory and processing time resources during the reassembly step. The reassembling step preferably includes the step of the computer 18 constructing a channel identity based on the terminal identifier, channel identifier, direction, and channel type. Preferably, the reassembling step includes the step of the computer 18 deriving for each channel identity an expected frame sequence number for a next frame by incrementing the last sequence number received.

There is preferably a reassembly data store 28 corresponding to the channel identity, and wherein the reassembling step includes the step of the computer 18 storing the data frame in a storage cell corresponding to the sequence number on the data store 28 if the sequence number is equal to an expected sequence number and the data frame is free of error. Preferably, for capturing the layer 3 packet start time, the reassembling step includes the step of the computer 18 writing an artificial ICMP Timestamp Request packet in PCAP format, with the timestamp of a first data frame starting the reassembly of layer 3 packets. The writing by the computer 18 of the ICMP Timestamp Request packet indicating packet start time preferably can be enabled or disabled by a switch.

Preferably, the reassembling step includes the step of the computer 18 writing the reassembled layer 3 packet in PCAP format, with the timestamp of the last data frame completing the reassembly. There is preferably an outstanding frames counter 30, and wherein if the received frame sequence number exceeds the expected number, by less than a threshold, then intervening frames are considered to have been lost, and there is the step of the outstanding frames counter 30 being incremented by the number of intervening frames. Preferably, the reassembling step includes the step of the computer 18 recognizing as outstanding and storing the received frame number sequence in the storage cell if the received frame sequence number is less than the expected frame sequence number and has a corresponding empty cell in the data store 28, and decrementing the corresponding outstanding frames counter 30 by one.

The computer 18 preferably has reassembled the layer 3 packet if the data frame contains an end of a service data unit and if there are no outstanding packets. Preferably, the reassembling step includes the step of the computer 18 writing the reassembled packet in a format that can be altered to match the requirements of a layer packet protocol analyzer. The reassembling step preferably includes the step of the computer 18 writing, in a separate display channel, details of each layer 2 frame processed in such a way as to allow immediate inspection of the fame and what the reassembly step has done with the frame.

In the operation of the invention, a sequence of layer 3 packets (data payload) is reconstructed from a sequence of layer 2 radio link control (RLC) layer data frames. Erroneous or repeated frames are identified and excluded. Out-of-order frames are reordered.

The result is constructed in the format used in layer 3 measurements, with a time stamp, user equipment identity, channel identity, and direction (uplink or downlink) accompanying each packet. Optionally, frame-by-frame statistics (frame payload size, error, or repeat counter) are provided.

Figure 2:
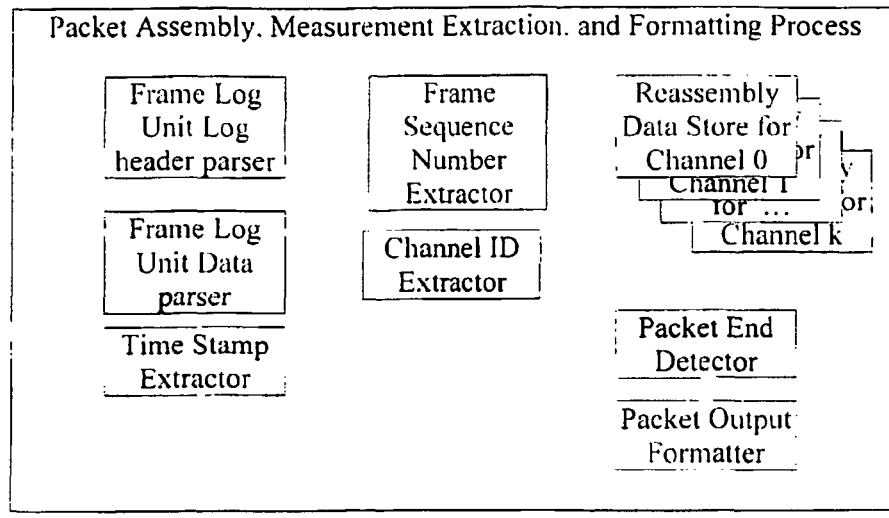
FIG. 2 is a block diagram showing components of the Packet Assembly, Measurement Extraction, and Formatting Process of the system.

Consider the flow of packets in a packet-based service session (e.g., IP telephony). FIG. 1 depicts an instance of communication between two users where one user is connected to a communications system through a wireless access method, such as the Universal Mobile Telecommunications System Radio Access Network (UTRAN), and the communications system uses packet-switched network protocol, such as the Internet Protocol (IP). FIG. 2 illustrates the main components of the Packet Assembly, Measurement Extraction and Formatting Process. FIG. 3 shows components of a reassembly data store for one channel in the system. FIG. 4 illustrates the stripping of the frame data header and extraction of the remaining bits of the frame data. In regard to FIG. 1:

User #1 and User #2 are the end-users of a communications service, in communication with each other.

UE #1 and UE #2 are user equipment that allows a user to access a communications network and to establish and carry on communication with others in the network.

UE #1 is accessing the network wirelessly. When communicating it sends or receives radio link control (RLC) frames to or from the base station at regular intervals called the transmission time interval (TTI). TTI is on the order of tens of milliseconds (ms), typically 20 ms.

A Base Station, also called a "Node B", allows a user equipment to establish a wireless physical connection channel to the rest of the communications network. The base station relays communications between the user and the radio network controller (RNC). It also reports the status of physical channels to the RNC.

Radio network controller (RNC) relays communications between the base station and the mobile packet backbone (MPBN). It also performs error checking, correction, retransmission (radio link control), allocation of channels and power level to user equipment (radio resource management), keeping track of a user equipment's identity and location (mobility management).

The mobile packet backbone network (MPBN) relays communication between the radio network controller and the packet backbone network. It also keeps track of which RNC a user is (mobility management) and maintains the integrity of the packet flow to or from the user.

The packet backbone network relays the communications between the mobile packet backbone network, a packet application subsystem, and the other user's service network (Service Network #2). It is a common transport medium for all packet (layer 3) traffic.

The packet application subsystem delivers additional communications services offered by the operator and performs charging functions for billing such services. Examples of such services are voice mail, announcement, interactive voice response, media storage, retrieval and transcoding, directory lookup, contact list & presence, instant messaging, among others. Service network #2 performs control functions needed to establish communications with User #2. When communication is established, it relays the communications between the packet backbone and access network of the other user, User #2. In addition, it delivers other services needed on the leg of the communications on the User #2's side.

Access Network #2 is the means through which User #2 accesses its communications services. It may be wireless or wired, packet-switched or circuit-switched.

The radio network controller contains a trace function which can be instructed to capture a copy of each radio link frame from a UE and send it to a specified file or computer communication channel.

The Packet Assembly, Measurement, Extraction, and Formatting function (one of the key aspects of the invention) reassembles the layer 2 frame flow into the corresponding flow at layer 3 of packets belonging to the user communication, with appropriate timestamp and statistic information.

The performance monitor supports the operation and maintenance of the network by providing an indication of how well each part of the end-to-end communication path is performing, by producing statistics and reports of the characteristics of the communication. Its operation is carried out by computer 18.

The radio link is subject to impairments of varying degree and kind, such as frame loss, error, bearer type change, interruption, and delay. As a result, performance characteristics of the link and the quality of the carried communication are degraded considerably in various ways to a varying degree, which are difficult to predict. Measurements are collected of frame transmission and reception process by the RNC to help diagnose the reasons of such degradation. The collected RNC measurements constitute flows of frames on layer 2, whereas the user communication takes place on layer 3 in the form of flows of IP packets, as does the performance monitoring. The purpose of the invention (Packet Assembly, Measurement, extraction, and formatting function in the figure) is to convert the layer 2 frame trace produced by the RNC into the layer 3 packet flow format expected by the performance monitoring function.

The closer a measurement is to the end user, the more is captured of the possible range of degradation sources, and the more accurate becomes the knowledge of the end-to-end service quality experienced by the user.

On the other hand, the cost of measurement decreases in the opposite direction, that is, as the collection point moves from $M_1$ to $M_2$ and $M_3$. Measurements at $M_1$ are usually within a layer 2 frame period (for example, 20 ms) of $M_2$, therefore network operator may measurement at $M_2$ sufficient, and derive the expected value at $M_1$ from those at $M_2$.

Measurements are collected and output at point $M_2$ in layer 2 radio link control (RCL) format. Each measurement unit corresponds to a frame, consisting of a timestamp, a terminal identifier, a channel identifier, direction indicator (uplink or downlink), frame type indicator (data or control), sequence number, bearer type, and data bytes.

Measurements at point $M_3$ are in a format used on layer 3.

The invention includes the process labeled "Packet Assembly, Measurement Extraction, Formatting" in FIG. 1.

The process reads the RLC measurements sequentially, acting on the data frame logging units. The process constructs a channel identity based on the terminal identifier, channel identifier, direction, and channel type.

An expected frame sequence number for the next frame is derived for each channel identity, by incrementing the last sequence number received, modulo the RLC protocol window size.

If the received frame number is equal to the expected sequence number, and the data frame is free of error, the data frame is stored into the storage cell corresponding to the frame sequence number, on the reassembly data store corresponding to the channel identity. The frame data may start with a certain number of unused bits, the so-called "data header", which must be skipped to be able to decode the rest of the frame data correctly. The entire frame data block is shifted to the right by that number of bits, and must be shifted to the left in order to obtain the correct data bytes. The number of bits to skip is specified in the frame header by a parameter called "data header size". This used to be zero before, but is found in logs from recent RNC versions. The solution is: Each data byte read from the frame data block stream is placed in a first-in-first-out (FIFO) bit stream buffer. The contents of the very first n bit positions in each frame data block is discarded, where n is given by the "data header size" parameter previously read from the frame log header. With each subsequent byte read from the frame data block stream into the "in" port of the buffer, a byte (eight bits) are taken away from the "out" port of the buffer. The byte so removed from the buffer is appended to an array representing the frame data.

If the received frame sequence number exceeds the expected number, by less than a threshold, then intervening frames are considered to have been lost (skipped), and the outstanding frames counter is incremented by the number of intervening frames.

If the received frame sequence number is less than the expected frame sequence number and has a corresponding empty cell in the data store, the frame is recognized as outstanding, is stored in the cell, and the corresponding outstanding frames counter is decremented by one.

Otherwise, the received frame is considered a repetition, or redundant, and ignored.

If the data frame contains the end of a service data unit (layer-3 packet) and if there are no outstanding packets, the layer 3 packet is considered to have been reassembled.

The process writes the reassembled layer-3 packet in PCAP format, with the timestamp of the last data frame completing the reassembly. The channel identity is included in the PCAP record as part of the media access control (Layer 2) source or destination address, depending on the direction of the frame.

Figure 5:
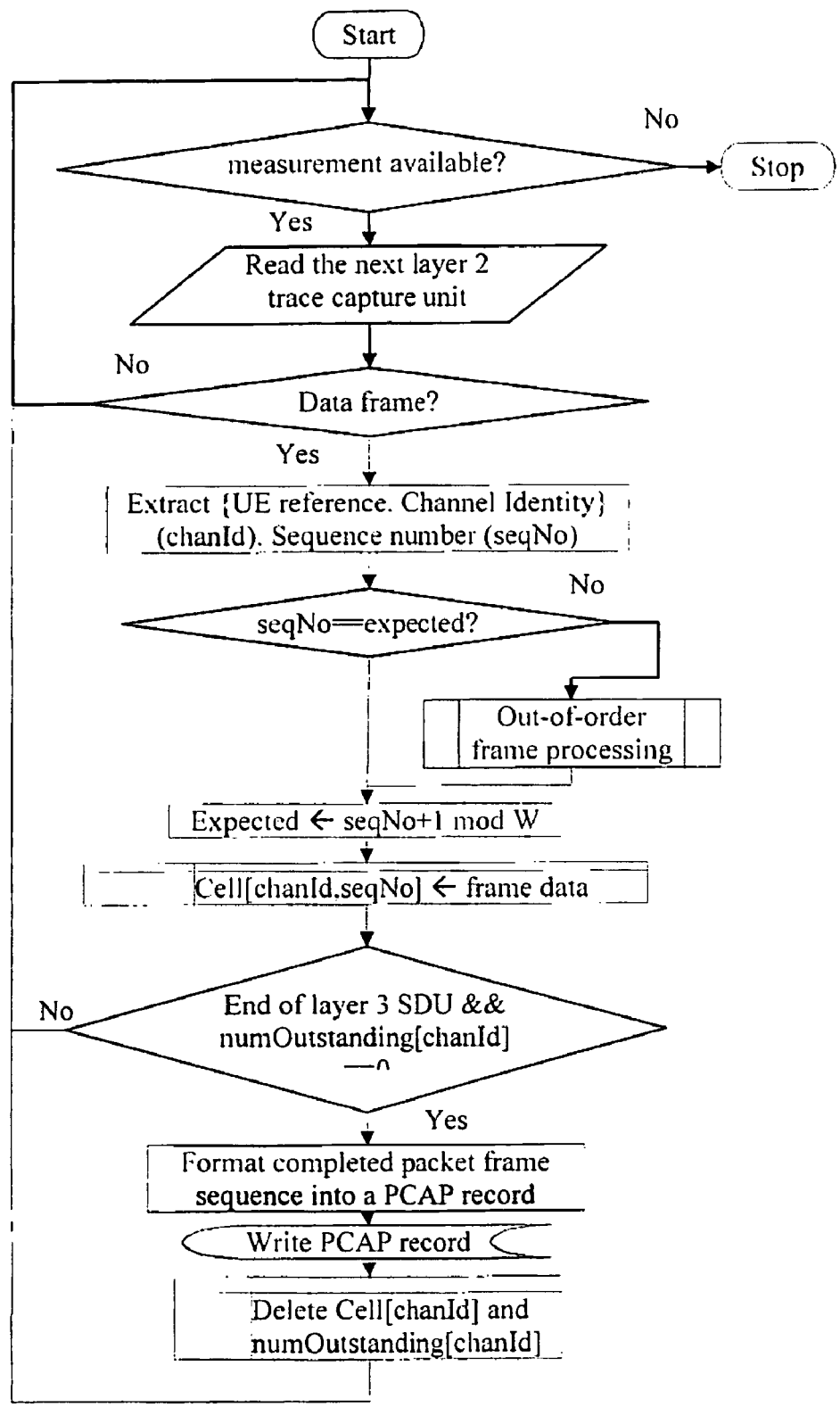
FIG. 5 is a flow chart for assembly of Layer 2 packets into a Layer 3 packet.
Figure 6:
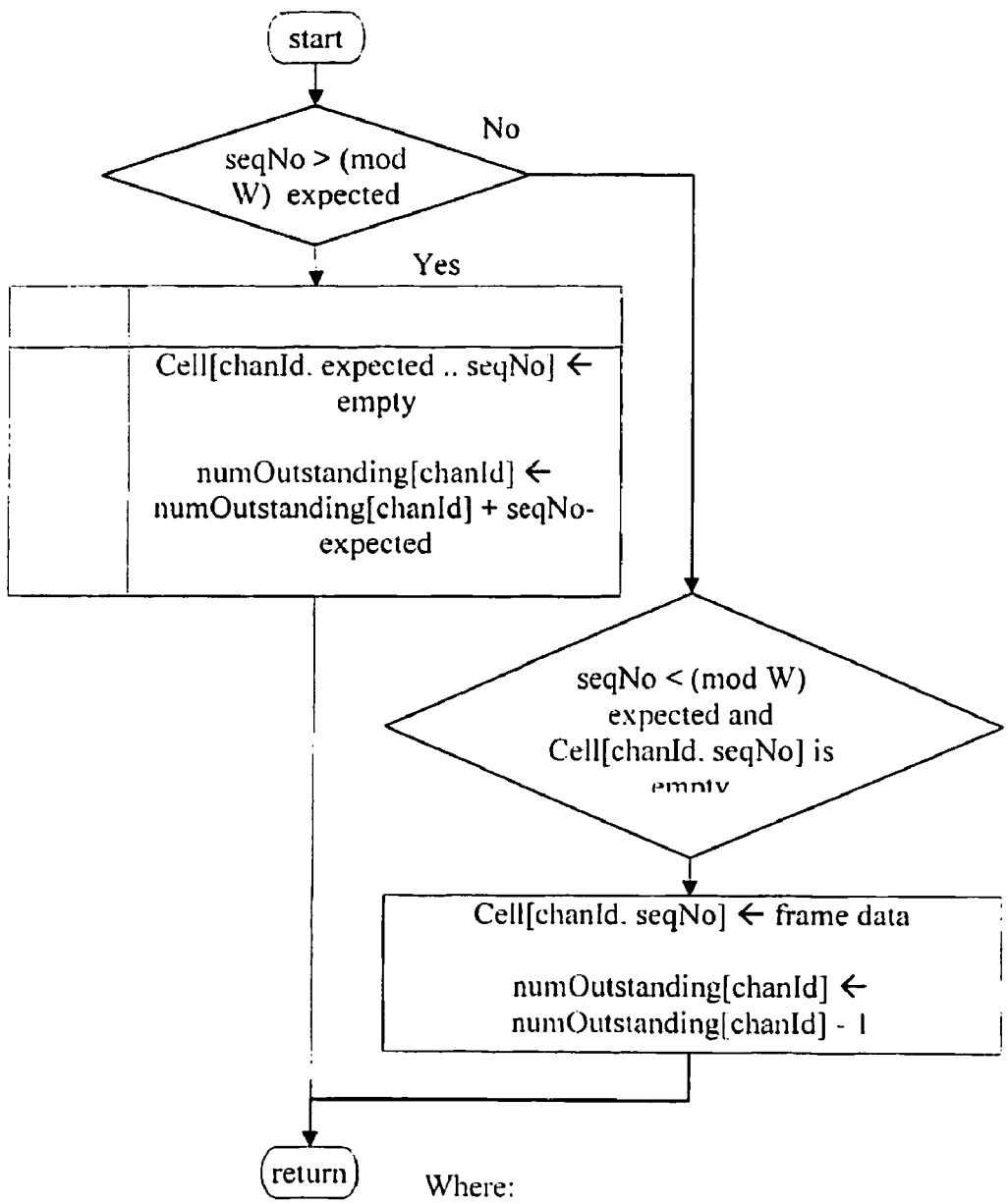
FIG. 6 is a flow chart of out-of-order frame processing.

FIGS. 5 and 6 depict the process.

The recommended implementation of the method is either as a filter script (for batch post-processing) or as a procedure built into the access node generating the layer 2 frame data log. The node would then be capable of producing the corresponding layer-3 measurement log.

The current implementation accepts layer 2 trace logs described in Ericsson's RNC Trace Guide, having document number 18/1551-AXD 105 03/1 Uen dated Dec. 10, 2007, incorporated by reference herein, and produces the layer 3 results in the PCAP format, described in PCAP or tcpdump Format having document number 3.9.8/LIBPCAP 0.9.8, incorporated by reference herein. Sample input and output logs are shown in Table 1. Table 2, Table 3 and Table 4.

An implementation for another input or output format can be devised provided that the format is adequately documented.

For post-processing, batch processing by a script implementation is recommended. This allows flexibility to customize the output format to match the format of comparable measurements.

For on-line processing, building the capability into the radio network controller is recommended. This eliminates the need to store and handle intermediate capture logs.

The recommended mode of use depends on whether:
1. post processing or on-line processing is preferred
2. frame level statistics are desired or not
3. flexibility to modify the output format is desired or not Below in Table 1 is an example set of artifacts produced as a result of applying the reassembly process on a small sample layer 2 Radio Link Control trace capture log.

TABLE 1

Sample layer 2 radio link control trace log

[2007-10-09 19:59:52.213] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2906, vr_r 2906, vr_h 2906, vr_mr 3418, block 0, macPduSize 336, macHeaderSize 0, deciphered data:

| 0000 | DA | D0 | 45 | 00 | 00 | 40 | 19 | E5 | 40 | 00 | 45 | 06 | F7 | DF | AC | 11 | '..E..@..@.E.....' |
| 0010 | 64 | 12 | 0A | 08 | 09 | C8 | 91 | EA | 13 | C4 | 06 | 1A | 0E | 7E | 00 | 00 | 'd............~..' |
| 0020 | 00 | 00 | B0 | 02 | BF | 40 | 66 | E9 | 00 | 00 | DA | | | | | | '.....@f....' |

[2007-10-09 19:59:52.213] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2907, vr_r 2907, vr_h 2907, vr_mr 3419, block 1, macPduSize 336, macHeaderSize 0, deciphered data:

| 0000 | DA | DD | 31 | FE | 02 | 04 | 05 | 50 | 01 | 01 | 08 | 0A | DF | 62 | 52 | 9E | '..l....P.....bR.' |
| 0010 | 00 | 00 | 00 | 00 | 01 | 03 | 03 | 00 | 01 | 01 | 04 | 02 | 55 | 55 | 55 | 55 | '............UUUU' |
| 0020 | 55 | 55 | 55 | 55 | 55 | 55 | 55 | 55 | 55 | 55 | 45 | | | | | | 'UUUUUUUUUUE' |

[2007-10-09 19:59:52.222] 001900/sp2.lnh/DedicatedChModelPT(RLC_UP_DL_UE)
dcsRlcTxHandler.cc:3018 BUS SEND:[ueRef 847, modId 0, rbId 16, rbType 7:14:7, instanceId 4]AcknowledgedMode, seqNo 2102, PDU no. 0 in the frame, vt_a 2102, vt_s 2103, vt_ms 53, Mac request: numberOfPdus 2, macPduSize 340, macHeaderSize 4, data to be ciphered:

| 0000 | 0C | 1B | 04 | 50 | 00 | 02 | C5 | 2A | 44 | 00 | 03 | A0 | 6C | A3 | 40 | A0 | '...P...*D...l.@.' |
| 0010 | 80 | 9C | 8A | C1 | 16 | 41 | 21 | 3C | 49 | 1E | AC | D8 | 4D | F2 | 90 | 61 | '.....A!<I...M..a' |
| 0020 | A0 | E7 | F6 | 01 | 24 | C0 | 09 | FF | 80 | 00 | 05 | | | | | | '....$......' |

[2007-10-09 19:59:52.222] 001900/sp2.lnh/DedicatedChModelPT(RLC_UP_DL_UE)
dcsRlcTxHandler.cc:3018 BUS SEND:[ueRef 847, modId 0, rbId 16, rbType 7:14:7, instanceId 4]AcknowledgedMode, seqNo 2103, PDU no. 1 in the frame, vt_a 2102, vt_s 2104, vt_ms 53, Mac request: numberOfPdus 2, macPduSize 340, macHeaderSize 4, data to be ciphered:

| 0000 | 0C | 1B | D0 | 9F | E0 | 20 | 42 | 6E | 88 | FA | E3 | 6F | B2 | B0 | 1B | 23 | '..... Bn...o...#' |
| 0010 | B4 | 0B | A5 | 5E | A1 | 7A | D9 | 73 | C7 | 81 | 25 | 90 | C6 | 10 | FB | 97 | '...^.z.s........' |
| 0020 | 60 | 9D | 78 | B1 | 25 | B6 | E8 | DE | 1F | 59 | 49 | | | | | | '`.x.%....YI' |

[2007-10-09 19:59:52.313] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2908, vr_r 2908, vr_h 2908, vr_mr 3420, block 0, macPduSize 336, macHeaderSize 0, deciphered data:

| 0000 | DA | E0 | 45 | 00 | 00 | 28 | 19 | E6 | 40 | 00 | 45 | 06 | F7 | F6 | AC | 11 | '..E..(..@.E.....' |
| 0010 | 64 | 12 | 0A | 08 | 09 | C8 | 91 | EA | 13 | C4 | 06 | 1A | 0E | 7F | CD | 84 | 'd...............' |
| 0020 | DF | 2A | 50 | 10 | BF | 40 | 65 | A9 | 00 | 00 | DA | | | | | | '.*P..@e....' |

[2007-10-09 19:59:52.313] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2909, vr_r 2909, vr_h 2909, vr_mr 3421, block 1, macPduSize 336, macHeaderSize 0, deciphered data:

| 0000 | DA | E9 | 00 | 45 | 00 | 05 | 78 | 19 | E7 | 40 | 00 | 45 | 06 | F2 | A5 | AC | '...E..x..@.E....' |
| 0010 | 11 | 64 | 12 | 0A | 08 | 09 | C8 | 91 | EA | 13 | C4 | 06 | 1A | 0E | 7F | CD | '.d..............' |
| 0020 | 84 | DF | 2A | 50 | 10 | BF | 40 | 1F | 76 | 00 | 32 | | | | | | '..*P..@.v.2' |

[2007-10-09 19:59:52.333] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2910, vr_r 2910, vr_h 2910, vr_mr 3422, block 0, macPduSize 336, macHeaderSize 0, deciphered data:

| 0000 | DA | F0 | 00 | 49 | 4E | 56 | 49 | 54 | 45 | 20 | 73 | 69 | 70 | 3A | 61 | 64 | '...INVITE sip:ad' |
| 0010 | 2D | 68 | 6F | 63 | 40 | 73 | 61 | 74 | 75 | 72 | 6E | 2E | 63 | 6F | 6D | 20 | '-hoc@saturn.com ' |
| 0020 | 53 | 49 | 50 | 2F | 32 | 2E | 30 | 0D | 0A | 76 | DA | | | | | | 'SIP/2.0..v.' |

[2007-10-09 19:59:52.333] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2911, vr_r 2911, vr_h 2911, vr_mr 3423, block 1, macPduSize 336, macHeaderSize 0, deciphered data:

| 0000 | DA | F8 | 3A | 20 | 53 | 49 | 50 | 2F | 32 | 2E | 30 | 2F | 54 | 43 | 50 | 20 | '..: SIP/2.0/TCP ' |
| 0010 | 31 | 37 | 32 | 2E | 31 | 37 | 2E | 31 | 30 | 30 | 2E | 31 | 38 | 3A | 33 | 37 | '172.17.100.18:37' |
| 0020 | 33 | 35 | 34 | 3B | 62 | 72 | 61 | 6E | 63 | 68 | DB | | | | | | '354;branch.' |

[2007-10-09 19:59:52.333] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2912, vr_r 2912, vr_h 2912, vr_mr 3424, block 2, macPduSize 336, macHeaderSize 0, deciphered data:

| 0000 | DB | 00 | 3D | 7A | 39 | 68 | 47 | 34 | 62 | 4B | 66 | 32 | 31 | 64 | 39 | 32 | '..=z9hG4bKf21d92' |
| 0010 | 30 | 66 | 3B | 72 | 70 | 6F | 72 | 74 | 0D | 0A | 74 | 3A | 20 | 3C | 73 | 69 | '0f;rport..t: <si' |
| 0020 | 70 | 3A | 61 | 64 | 2D | 68 | 6F | 63 | 40 | 73 | DB | | | | | | 'p:ad-hoc@s.' |

[2007-10-09 19:59:52.333] 001900/sp2.lnh/DedicatedChModelPT(RLC_UP_UL_UE)

TABLE 1-continued

Sample layer 2 radio link control trace log dcsRlcRxHandler.cc:1423 BUS RECEIVE:[ueRef 847, modId 0, rbId 16, rbType 7:14:7, instanceId 4]AcknowledgedMode, Data pdu, seqNo 2913, vr_r 2913, vr_h 2913, vr_mr 3425, block 3, macPduSize 336, macHeaderSize 0, deciphered data:

| 0000 | DB | 08 | 61 | 74 | 75 | 72 | 6E | 2E | 63 | 6F | 6D | 3E | 0D | 0A | 66 | 3A | '..aturn.com>..f:' |
| 0010 | 20 | 22 | 31 | 39 | 32 | 36 | 22 | 20 | 3C | 73 | 69 | 70 | 3A | 31 | 39 | 37 | ' "1926" <sip:197' |
| 0020 | 32 | 36 | 37 | 35 | 31 | 39 | 32 | 36 | 40 | 73 | 1F | | | | | | '26751926@s.' |

[2007-10-09 19:59:52.353] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2914, vr_r 2914, vr_h 2914, vr_mr 3426, block 0, macPduSize 336, macHeaderSize 0, deciphered data:

| 0000 | DB | 10 | 61 | 74 | 75 | 72 | 6E | 2E | 63 | 6F | 6D | 3E | 3B | 74 | 61 | 67 | '..aturn.com>;tag' |
| 0010 | 3D | 31 | 38 | 31 | 33 | 30 | 0D | 0A | 43 | 53 | 65 | 71 | 3A | 20 | 31 | 32 | '=18130..CSeq: 12' |
| 0020 | 38 | 31 | 39 | 20 | 49 | 4E | 56 | 49 | 54 | 45 | DB | | | | | | '819 INVITE.' |

[2007-10-09 19:59:52.353] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2915, vr_r 2915, vr_h 2915, vr_mr 3427, block 1, macPduSize 336, macHeaderSize 0, deciphered data:

| 0000 | DB | 18 | 0D | 0A | 69 | 3A | 20 | 37 | 36 | 36 | 62 | 35 | 64 | 34 | 65 | 65 | '....i: 766b5d4ee' |
| 0010 | 38 | 34 | 34 | 0D | 0A | 4D | 61 | 78 | 2D | 46 | 6F | 72 | 77 | 61 | 72 | 64 | '844..Max-Forward' |
| 0020 | 73 | 3A | 20 | 37 | 30 | 0D | 0A | 6D | 3A | 20 | DB | | | | | | 's: 70..m: .' |

[2007-10-09 19:59:52.353] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2916, vr_r 2916, vr_h 2916, vr_mr 3428, block 2, macPduSize 336, macHeaderSize 0, deciphered data:

| 0000 | DB | 20 | 22 | 31 | 39 | 32 | 36 | 22 | 20 | 3C | 73 | 69 | 70 | 3A | 31 | 39 | '. "1926" <sip:19' |
| 0010 | 32 | 36 | 40 | 31 | 37 | 32 | 2E | 31 | 37 | 2E | 31 | 30 | 30 | 2E | 31 | 38 | '26@172.17.100.18' |
| 0020 | 3A | 31 | 34 | 33 | 39 | 3E | 3B | 2B | 67 | 2E | DB | | | | | | ':1439>;+g..' |

[2007-10-09 19:59:52.353] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2917, vr_r 2917, vr_h 2917, vr_mr 3429, block 3, macPduSize 336, macHeaderSize 0, deciphered data:

| 0000 | DB | 28 | 70 | 6F | 63 | 2E | 74 | 61 | 6C | 6B | 62 | 75 | 72 | 73 | 74 | 3B | '.(poc.talkburst;' |
| 0010 | 2B | 67 | 2E | 70 | 6F | 63 | 2E | 67 | 72 | 6F | 75 | 70 | 61 | 64 | 0D | 0A | '+g.poc.groupad..' |
| 0020 | 53 | 75 | 70 | 70 | 6F | 72 | 74 | 65 | 64 | 3A | 3C | | | | | | 'Supported:<' |

[2007-10-09 19:59:52.373] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2918, vr_r 2918, vr_h 2918, vr_mr 3430, block 0, macPduSize 336, macHeaderSize 0, deciphered data:

| 0000 | DB | 30 | 20 | 74 | 69 | 6D | 65 | 72 | 2C | 20 | 61 | 6E | 73 | 77 | 65 | 72 | '.0 timer, answer' |
| 0010 | 6D | 6F | 64 | 65 | 0D | 0A | 55 | 73 | 65 | 72 | 2D | 41 | 67 | 65 | 6E | 74 | 'mode..User-Agent' |
| 0020 | 3A | 20 | 50 | 6F | 43 | 2D | 63 | 6C | 69 | 65 | DB | | | | | | ': PoC-clie.' |

[2007-10-09 19:59:52.373] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2919, vr_r 2919, vr_h 2919, vr_mr 3431, block 1, macPduSize 336, macHeaderSize 0, deciphered data:

| 0000 | DB | 38 | 6E | 74 | 2F | 4F | 4D | 41 | 31 | 2E | 30 | 20 | 4F | 62 | 69 | 67 | '.8nt/OMA1.0 Obig' |
| 0010 | 6F | 50 | 6F | 43 | 2F | 76 | 31 | 2E | 30 | 2E | 30 | 0D | 0A | 41 | 63 | 63 | 'oPoC/v1.0.0..Acc' |
| 0020 | 65 | 70 | 74 | 2D | 43 | 6F | 6E | 74 | 61 | 63 | DB | | | | | | 'ept-Contac.' |

[2007-10-09 19:59:52.373] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2920, vr_r 2920, vr_h 2920, vr_mr 3432, block 2, macPduSize 336, macHeaderSize 0, deciphered data:

| 0000 | DB | 40 | 74 | 3A | 20 | 2A | 3B | 2B | 67 | 2E | 70 | 6F | 63 | 2E | 74 | 61 | '@t: *;+g.poc.ta' |
| 0010 | 6C | 6B | 62 | 75 | 72 | 73 | 74 | 3B | 72 | 65 | 71 | 75 | 69 | 72 | 65 | 3B | 'lkburst;require;' |
| 0020 | 65 | 78 | 70 | 6C | 69 | 63 | 69 | 74 | 0D | 0A | DB | | | | | | 'explicit...' |

[2007-10-09 19:59:52.373] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2921, vr_r 2921, vr_h 2921, vr_mr 3433, block 3, macPduSize 336, macHeaderSize 0, deciphered data:

| 0000 | DB | 48 | 53 | 65 | 73 | 73 | 69 | 6F | 6E | 2D | 45 | 78 | 70 | 69 | 72 | 65 | '.HSession-Expire' |
| 0010 | 73 | 3A | 20 | 33 | 36 | 30 | 30 | 3B | 72 | 65 | 66 | 72 | 65 | 73 | 68 | 65 | 's: 3600;refreshe' |
| 0020 | 72 | 3D | 75 | 61 | 63 | 0D | 0A | 41 | 6C | 6C | 4F | | | | | | 'r=uac..AllO' |

[2007-10-09 19:59:52.393] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2922, vr_r 2922, vr_h 2922, vr_mr 3434, block 0, macPduSize 336, macHeaderSize 0, deciphered data:

| 0000 | DB | 50 | 6F | 77 | 3A | 20 | 49 | 4E | 56 | 49 | 54 | 45 | 2C | 20 | 41 | 43 | '.Pow: INVITE, AC' |
| 0010 | 4B | 2C | 20 | 42 | 59 | 45 | 2C | 20 | 43 | 41 | 4E | 43 | 45 | 4C | 2C | 20 | 'K, BYE, CANCEL, ' |
| 0020 | 55 | 50 | 44 | 41 | 54 | 45 | 2C | 20 | 4E | 4F | DB | | | | | | 'UPDATE, NO.' |

[2007-10-09 19:59:52.393] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2923, vr_r 2923, vr_h 2923, vr_mr 3435, block 1, macPduSize 336, macHeaderSize 0, deciphered data:

| 0000 | DB | 58 | 54 | 49 | 46 | 59 | 2C | 20 | 4D | 45 | 53 | 53 | 41 | 47 | 45 | 2C | '.XTIFY, MESSAGE,' |
| 0010 | 20 | 4F | 50 | 54 | 49 | 4F | 4E | 53 | 0D | 0A | 50 | 2D | 50 | 72 | 65 | 66 | ' OPTIONS..P-Pref' |
| 0020 | 65 | 72 | 72 | 65 | 64 | 2D | 49 | 64 | 65 | 6E | DB | | | | | | 'erred-Iden.' |

[2007-10-09 19:59:52.393] 001900/sp2.lnh/DedicatedChModelPT(RLC__UP__UL__UE)

TABLE 1-continued

Sample layer 2 radio link control trace log dcsRlcRxHandler.cc:1423 BUS RECEIVE:[ueRef 847, modId 0, rbId 16, rbType 7:14:7, instanceId 4]AcknowledgedMode, Data pdu, seqNo 2924, vr_r 2924, vr_h 2924, vr_mr 3436, block 2, macPduSize 336, macHeaderSize 0, deciphered data:

```
0000  DB  60  74  69  74  79  3A  20  3C  73  69  70  3A  31  39  37    '.'tity: <sip:197'
0010  32  36  37  35  31  39  32  36  40  73  61  74  75  72  6E  2E    '26751926@saturn.'
0020  63  6F  6D  3E  0D  0A  52  6F  75  74  DB                        'com>..Rout.'
```

[2007-10-09 19:59:52.393] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2925, vr_r 2925, vr_h 2925, vr_mr 3437, block 3, macPduSize 336, macHeaderSize 0, deciphered data:

```
0000  DB  68  65  3A  20  3C  73  69  70  3A  31  30  2E  38  2E  39    '.he: <sip:10.8.9'
0010  2E  32  30  30  3A  35  30  36  30  3B  6C  72  3E  0D  0A  63    '.200:5060;lr>..c'
0020  3A  20  6D  75  6C  74  69  70  61  72  0C                        ': multipar.'
```

[2007-10-09 19:59:52.413] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2926, vr_r 2926, vr_h 2926, vr_mr 3438, block 0, macPduSize 336, macHeaderSize 0, deciphered data:

```
0000  DB  70  74  2F  6D  69  78  65  64  3B  62  6F  75  6E  64  61    '.pt/mixed;bounda'
0010  72  79  3D  22  63  65  30  63  35  38  61  65  37  66  62  32    'ry="ce0c58ae7fb2'
0020  64  37  31  37  22  0D  0A  43  6F  6E  DB                        'd717"..Con.'
```

[2007-10-09 19:59:52.413] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2927, vr_r 2927, vr_h 2927, vr_mr 3439, block 1, macPduSize 336, macHeaderSize 0, deciphered data:

```
0000  DB  78  74  65  6E  74  2D  4C  65  6E  67  74  68  3A  20  38    '.xtent-Length: 8'
0010  30  31  0D  0A  0D  0A  2D  2D  63  65  30  63  35  38  61  65    '01....--ce0c58ae'
0020  37  66  62  32  64  37  31  37  0D  0A  DB                        '7fb2d717...'
```

[2007-10-09 19:59:52.413] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2928, vr_r 2928, vr_h 2928, vr_mr 3440, block 2, macPduSize 336, macHeaderSize 0, deciphered data:

```
0000  DB  80  43  6F  6E  74  65  6E  74  2D  54  79  70  65  3A  20    '..Content-Type: '
0010  61  70  70  6C  69  63  61  74  69  6F  6E  2F  73  64  70  0D    'application/sdp.'
0020  0A  43  6F  6E  74  65  6E  74  2D  4C  DB                        '.Content-L.'
```

[2007-10-09 19:59:52.413] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2929, vr_r 2929, vr_h 2929, vr_mr 3441, block 3, macPduSize 336, macHeaderSize 0, deciphered data:

```
0000  DB  88  65  6E  67  74  68  3A  20  33  34  36  0D  0A  0D  0A    '..ength: 346....'
0010  76  3D  30  0D  0A  6F  3D  75  73  65  72  6E  61  6D  65  20    'v=0..o=username '
0020  31  31  39  31  39  34  31  39  39  36  45                        '1191941996E'
```

[2007-10-09 19:59:52.433] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2930, vr_r 2930, vr_h 2930, vr_mr 3442, block 0, macPduSize 336, macHeaderSize 0, deciphered data:

```
0000  DB  90  20  31  31  39  31  39  34  31  39  39  36  20  49  4E    '.. 1191941996 IN'
0010  20  49  50  34  20  31  37  32  2E  31  37  2E  31  30  30  2E    ' IP4 172.17.100.'
0020  31  38  0D  0A  73  3D  73  65  73  73  DB                        '18..s=sess.'
```

[2007-10-09 19:59:52.433] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2931, vr_r 2931, vr_h 2931, vr_mr 3443, block 1, macPduSize 336, macHeaderSize 0, deciphered data:

```
0000  DB  98  69  6F  6E  0D  0A  63  3D  49  4E  20  49  50  34  20    '..ion..c=IN IP4 '
0010  31  37  32  2E  31  37  2E  31  30  30  2E  31  38  0D  0A  74    '172.17.100.18..t'
0020  3D  30  20  30  0D  0A  6D  3D  61  75  DB                        '=0 0..m=au.'
```

[2007-10-09 19:59:52.433] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2932, vr_r 2932, vr_h 2932, vr_mr 3444, block 2, macPduSize 336, macHeaderSize 0, deciphered data:

```
0000  DB  A0  64  69  6F  20  35  39  30  31  30  20  52  54  50  2F    '..dio 59010 RTP/'
0010  41  56  50  20  39  36  0D  0A  61  3D  72  74  70  6D  61  70    'AVP 96..a=rtpmap'
0020  3A  39  36  20  41  4D  52  2F  38  30  DB                        ':96 AMR/80.'
```

[2007-10-09 19:59:52.433] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2933, vr_r 2933, vr_h 2933, vr_mr 3445, block 3, macPduSize 336, macHeaderSize 0, deciphered data:

```
0000  DB  A8  30  30  2F  31  0D  0A  61  3D  70  74  69  6D  65  3A    '..00/1..a=ptime:'
0010  32  30  30  0D  0A  61  3D  6D  61  78  70  74  69  6D  65  3A    '200..a=maxptime:'
0020  34  30  30  0D  0A  61  3D  66  6D  74  32                        '400..a=fmt2'
```

[2007-10-09 19:59:52.453] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2934, vr_r 2934, vr_h 2934, vr_mr 3446, block 0, macPduSize 336, macHeaderSize 0, deciphered data:

```
0000  DB  B0  70  3A  39  36  20  6D  6F  64  65  2D  73  65  74  3D    '..p:96 mode-set='
0010  31  3B  6F  63  74  65  74  2D  61  6C  69  67  6E  3D  31  0D    '1;octet-align=1.'
0020  0A  61  3D  2B  67  2E  70  6F  63  2E  DB                        '.a=+g.poc..'
```

[2007-10-09 19:59:52.453] 001900/sp2.lnh/DedicatedChModelPT(RLC_UP_UL_UE)

TABLE 1-continued

Sample layer 2 radio link control trace log dcsRlcRxHandler.cc:1423 BUS RECEIVE:[ueRef 847, modId 0, rbId 16, rbType 7:14:7, instanceId 4]AcknowledgedMode, Data pdu, seqNo 2935, vr_r 2935, vr_h 2935, vr_mr 3447, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | B8 | 74 | 61 | 6C | 6B | 62 | 75 | 72 | 73 | 74 | 0D | 0A | 6D | 3D | 61 | '..talkburst..m=a' |
| 0010 | 70 | 70 | 6C | 69 | 63 | 61 | 74 | 69 | 6F | 6E | 20 | 35 | 39 | 30 | 31 | 31 | 'pplication 59011' |
| 0020 | 20 | 75 | 64 | 70 | 20 | 54 | 42 | 43 | 50 | 0D | DB | | | | | | ' udp TBCP..' |

[2007-10-09 19:59:52.453] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2936, vr_r 2936, vr_h 2936, vr_mr 3448, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | C0 | 0A | 61 | 3D | 66 | 6D | 74 | 70 | 3A | 54 | 42 | 43 | 50 | 20 | 71 | '...a=fmtp:TBCP q' |
| 0010 | 75 | 65 | 75 | 69 | 6E | 67 | 3D | 30 | 3B | 74 | 69 | 6D | 65 | 73 | 74 | 61 | 'ueuing=0;timesta' |
| 0020 | 6D | 70 | 3D | 30 | 3B | 74 | 62 | 5F | 67 | 72 | DB | | | | | | 'mp=0;tb_gr.' |

[2007-10-09 19:59:52.453] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2937, vr_r 2937, vr_h 2937, vr_mr 3449, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | C8 | 61 | 6E | 74 | 65 | 64 | 3D | 30 | 3B | 70 | 6F | 63 | 5F | 73 | 65 | '..anted=0;poc_se' |
| 0010 | 73 | 73 | 5F | 70 | 72 | 69 | 6F | 72 | 69 | 74 | 79 | 3D | 31 | 3B | 70 | 6F | 'ss_priority=1;po' |
| 0020 | 63 | 5F | 6C | 6F | 63 | 6B | 3D | 30 | 0D | 0A | 3C | | | | | | 'c_lock=0..<' |

[2007-10-09 19:59:52.473] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2938, vr_r 2938, vr_h 2938, vr_mr 3450, block 0, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | D0 | 0D | 0A | 2D | 2D | 63 | 65 | 30 | 63 | 35 | 38 | 61 | 65 | 37 | 66 | '....--ce0c58ae7f' |
| 0010 | 62 | 32 | 64 | 37 | 31 | 37 | 0D | 0A | 43 | 6F | 6E | 74 | 65 | 6E | 74 | 2D | 'b2d717..Content-' |
| 0020 | 54 | 79 | 70 | 65 | 3A | 20 | 61 | 70 | 70 | 6C | DB | | | | | | 'Type: appl.' |

[2007-10-09 19:59:52.473] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2939, vr_r 2939, vr_h 2939, vr_mr 3451, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | D8 | 69 | 63 | 61 | 74 | 69 | 6F | 6E | 2F | 72 | 65 | 73 | 6F | 75 | 72 | '..ication/resour' |
| 0010 | 63 | 65 | 2D | 6C | 69 | 73 | 74 | 73 | 2B | 78 | 6D | 6C | 0D | 0A | 43 | 6F | 'ce-lists+xml..Co' |
| 0020 | 6E | 74 | 65 | 6E | 74 | 2D | 44 | 69 | 73 | 70 | DB | | | | | | 'ntent-Disp.' |

[2007-10-09 19:59:52.473] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2940, vr_r 2940, vr_h 2940, vr_mr 3452, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | E0 | 6F | 73 | 69 | 74 | 69 | 6F | 6E | 3A | 20 | 72 | 65 | 63 | 69 | 70 | '..osition: recip' |
| 0010 | 69 | 65 | 6E | 74 | 2D | 6C | 69 | 73 | 74 | 0D | 0A | 43 | 6F | 6E | 74 | 65 | 'ient-list..Conte' |
| 0020 | 6E | 74 | 2D | 4C | 65 | 6E | 67 | 74 | 68 | 3A | DB | | | | | | 'nt-Length:.' |

[2007-10-09 19:59:52.473] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2941, vr_r 2941, vr_h 2941, vr_mr 3453, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | E8 | 20 | 32 | 32 | 39 | 0D | 0A | 0D | 0A | 3C | 3F | 78 | 6D | 6C | 20 | '.. 229....<?xml ' |
| 0010 | 76 | 65 | 72 | 73 | 69 | 6F | 6E | 3D | 22 | 31 | 2E | 30 | 22 | 20 | 65 | 6E | 'version="1.0" en' |
| 0020 | 63 | 6F | 64 | 69 | 6E | 67 | 3D | 22 | 55 | 54 | 01 | | | | | | 'coding="UT.' |

[2007-10-09 19:59:52.493] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2942, vr_r 2942, vr_h 2942, vr_mr 3454, block 0, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | F0 | 46 | 2D | 38 | 22 | 3F | 3E | 0D | 0A | 3C | 72 | 65 | 73 | 6F | 75 | '..F-8"?>..<resou' |
| 0010 | 72 | 63 | 65 | 2D | 6C | 69 | 73 | 74 | 73 | 20 | 78 | 6D | 6C | 6E | 73 | 3D | 'rce-lists xmlns=' |
| 0020 | 22 | 75 | 72 | 6E | 3A | 69 | 65 | 74 | 66 | 3A | DB | | | | | | '"urn:ietf:.' |

[2007-10-09 19:59:52.493] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instance+Id 4]AcknowledgedMode, Data pdu, seqNo 2943, vr_r 2943, vr_h 2943, vr_mr 3455, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DB | F8 | 70 | 61 | 72 | 61 | 6D | 73 | 3A | 78 | 6D | 6C | 3A | 6E | 73 | 3A | '..params:xml:ns:' |
| 0010 | 72 | 65 | 73 | 6F | 75 | 72 | 63 | 65 | 2D | 6C | 69 | 73 | 74 | 73 | 22 | 20 | 'resource-lists" ' |
| 0020 | 78 | 6D | 6C | 6E | 73 | 3A | 78 | 73 | 69 | 3D | DC | | | | | | 'xmlns:xsi=.' |

[2007-10-09 19:59:52.493] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2944, vr_r 2944, vr_h 2944, vr_mr 3456, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DC | 01 | 02 | 22 | 45 | 00 | 00 | B4 | 19 | E8 | 40 | 00 | 45 | 06 | F7 | 68 | '..."E....@.E..h' |
| 0010 | AC | 11 | 64 | 12 | 0A | 08 | 09 | C8 | 91 | EA | 13 | C4 | 06 | 1A | 13 | CF | '..d............' |
| 0020 | CD | 84 | DF | 2A | 50 | 18 | BF | 40 | 79 | D1 | DC | | | | | | '...*P..@y..' |

[2007-10-09 19:59:52.493] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2945, vr_r 2945, vr_h 2945, vr_mr 3457, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | DC | 08 | 00 | 00 | 68 | 74 | 74 | 70 | 3A | 2F | 2F | 77 | 77 | 77 | 2E | 77 | '....http://www.w' |
| 0010 | 33 | 63 | 2E | 6F | 72 | 67 | 2F | 32 | 30 | 30 | 31 | 2F | 58 | 4D | 4C | 53 | '3c.org/2001/XMLS' |
| 0020 | 63 | 68 | 65 | 6D | 61 | 2D | 69 | 6E | 73 | 74 | 0C | | | | | | 'chema-inst.' |

[2007-10-09 19:59:52.513] 001900/sp2.lnh/DedicatedChModelPT(RLC_UP_UL_UE)

TABLE 1-continued

Sample layer 2 radio link control trace log dcsRlcRxHandler.cc:1423 BUS RECEIVE:[ueRef 847, modId 0, rbId 16, rbType 7:14:7, instanceId 4]AcknowledgedMode, Data pdu, seqNo 2946, vr__r 2946, vr__h 2946, vr__mr 3458, block 0, macPduSize 336, macHeaderSize 0, deciphered data:
```
0000  DC  10  61  6E  63  65  22  3E  0D  0A  3C  6C  69  73  74  3E    '..ance">..<list>'
0010  0D  0A  3C  65  6E  74  72  79  20  75  72  69  3D  22  74  65    '..<entry uri="te'
0020  6C  3A  2B  31  39  37  32  36  37  35  DC                        '1:+1972675.'
```
[2007-10-09 19:59:52.513] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2947, vr__r 2947, vr__h 2947, vr__mr 3459, block 1, macPduSize 336, macHeaderSize 0, deciphered data:
```
0000  DC  18  31  39  34  36  22  20  2F  3E  0D  0A  3C  2F  6C  69    '..1946" />..</li'
0010  73  74  3E  0D  0A  3C  2F  72  65  73  6F  75  72  63  65  2D    'st>..</resource-'
0020  6C  69  73  74  73  3E  0D  0A  0D  0A  DC                        'lists>.....'
```
[2007-10-09 19:59:52.513] 001900/sp2.lnh/DedicatedChModelPT(RLC__UP__UL__UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2948, vr__r 2948, vr__h 2948, vr__mr 3460, block 2, macPduSize 336, macHeaderSize 0, deciphered data:
```
0000  DC  25  2D  FE  2D  2D  63  65  30  63  35  38  61  65  37  66    '.%-.--ce0c58ae7f'
0010  62  32  64  37  31  37  2D  2D  0D  0A  55  55  55  55  55  55    'b2d717--..UUUUUU'
0020  55  55  55  55  55  55  55  55  55  55  1F                        'UUUUUUUUUU.'
```
[2007-10-09 19:59:52.514] 001900/sp2.lnh/DedicatedChModelPT(RLC__UP__DL__UE)
dcsRlcTxHandler.cc:3018 BUS SEND:[ueRef 847, modId 0, rbId 16, rbtype 7:14:7, instanceId 4]AcknowledgedMode, seqNo 2104, PDU no. 1 in the frame, vt__a 2102, vt__s 2105, vt__ms 53, Mac request: numberOfPdus 3, macPduSize 340, macHeaderSize 4, data to be ciphered:
```
0000  0C  1C  04  50  00  02  85  2A  84  00  03  A0  6C  A3  40  A0    '...P...*....l.@.'
0010  B0  9C  8A  C1  16  41  21  3C  49  1E  AC  D8  4D  F2  A0  61    '.....A!<I...M..a'
0020  A1  3C  F5  01  04  C0  0D  39  90  00  00                        '.<.....9...'
```
[2007-10-09 19:59:52.514] 001900/sp2.lnh/DedicatedChModelPT(RLC__UP__DL__UE)
dcsRlcTxHandler.cc:3018 BUS SEND:[ueRef 847, modId 0, rbId 16, rbType 7:14:7, instanceId 4]AcknowledgedMode, seqNo 2105, PDU no. 2 in the frame, vt__a 2102, vt__s 2106, vt__ms 53, Mac request: numberOfPdus 3, macPduSize 340, macHeaderSize 4, data to be ciphered:
```
0000  0C  1C  D0  1F  E8  DC  C3  9D  8E  BE  EE  99  49  27  79  B2    '............I'y.'
0010  5F  19  67  4B  67  CF  9E  F0  CB  91  F3  B0  2C  2F  F2  93    '_.gKg......,/..'
0020  3A  16  46  11  BB  19  45  75  CF  64  8F                        ':.F...Eu.d.'
```
[2007-10-09 19:59:52.551] 001900/sp2.lnh/DedicatedChModelPT(RLC__UP__DL__UE)
dcsRlcTxHandler.cc:3018 BUS SEND:[ueRef 847, modId 0, rbId 16, rbType 7:14:7, instanceId 4]AcknowledgedMode, seqNo 2106, PDU no. 0 in the frame, vt__a 2102, vt__s 2107, vt__ms 53, Mac request: numberOfPdus 7, macPduSize 340, macHeaderSize 4, data to be ciphered:
```
0000  0C  1D  04  50  00  11  15  2A  94  00  03  A0  6C  94  A0  A0    '...P...*....l...'
0010  80  9C  8A  C1  16  41  21  3C  49  1E  AC  D8  4D  F2  A0  61    '.....A!<I...M..a'
0020  A1  45  B5  01  84  C0  07  C2  40  00  06                        '.E......@..'
```
[2007-10-09 19:59:52.551] 001900/sp2.lnh/DedicatedChModelPT(RLC__UP__DL__UE)
dcsRlcTxHandler.cc:3018 BUS SEND:[ueRef 847, modId 0, rbId 16, rbType 7:14:7, instanceId 4]AcknowledgedMode, seqNo 2107, PDU no. 1 in the frame, vt__a 2102, vt__s 2108, vt__ms 53, Mac request: numberOfPdus 7, macPduSize 340, macHeaderSize 4, data to be ciphered:
```
0000  0C  1D  85  34  95  02  F3  22  E3  02  03  13  03  02  05  47    '...4..."......G'
0010  27  96  96  E6  70  D0  A5  46  F3  A2  03  C7  36  97  03  A6    ''...p..F....6...'
0020  16  42  D6  86  F6  34  07  36  47  5C                            '.B...4.6,G\'
```
[2007-10-09 19:59:52.551] 001900/sp2.lnh/DedicatedChModelPT(RLC__UP__DL__UE)
dcsRlcTxHandler.cc:3018 BUS SEND:[ueRef 847, modId 0, rbId 16, rbType 7:14:7, instanceId 4]AcknowledgedMode, seqNo 2108, PDU no. 2 in the frame, vt__a 2102, vt__s 2109, vt__ms 53, Mac request: numberOfPdus 7, macPduSize 340, macHeaderSize 4, data to be ciphered:
```
0000  0C  1E  07  26  E2  E6  36  F6  D3  E0  D0  A4  67  26  F6  D3    '...&..6.....g&..'
0010  A2  02  23  13  93  23  62  22  03  C7  36  97  03  A3  13  93    '..#..#"b"..6.....'
0020  73  23  63  73  53  13  93  23  64  07  30                        's#csS..#d.0'
```
[2007-10-09 19:59:52.551] 001900/sp2.lnh/DedicatedChModelPT(RLC__UP__DL__UE)
dcsRlcTxHandler.cc:3018 BUS SEND:[ueRef 847, modId 0, rbId 16, rbType 7:14:7, instanceId 4]AcknowledgedMode, seqNo 2109, PDU no. 3 in the frame, vt__a 2102, vt__s 2110, vt__ms 53, Mac request: numberOfPdus 7, macPduSize 340, macHeaderSize 4, data to be ciphered:
```
0000  0C  1E  86  17  47  57  26  E2  E6  36  F6  D3  E3  B7  46  16    '....GW&..6....F.'
0010  73  D3  13  83  13  33  00  D0  A4  36  13  C6  C2  D4  94  43    's....3...6.....C'
0020  A2  03  73  63  66  23  56  43  46  56  5A                        '..scf#VCFVZ'
```
[2007-10-09 19:59:52.551] 001900/sp2.lnh/DedicatedChModelPT(RLC__UP__DL__UE)
dcsRlcTxHandler.cc:3018 BUS SEND:[ueRef 847, modId 0, rbId 16, rbType 7:14:7, instance1d 4]AcknowledgedMode, seqNo 2110, PDU no. 4 in the frame, vt__a 2102, vt__s 2111, vt__ms 53, Mac request: numberOfPdus 7, macPduSize 340, macHeaderSize 4, data to be ciphered:
```
0000  0C  1F  03  83  43  40  D0  A4  35  36  57  13  A2  03  13  23    '....C@..56W....#'
0010  83  13  92  04  94  E5  64  95  44  50  D0  A4  36  F6  E7  46    '......d.DP..6..F'
0020  56  E7  42  D4  C6  56  E6  77  46  83  A3                        'V.B..V.wF..'
```
[2007-10-09 19:59:52.551] 001900/sp2.lnh/DedicatedChModelPT(RLC__UP__DL__UE)
dcsRlcTxHandler.cc:3018 BUS SEND:[ueRef 847, modId 0, rbId 16, rbType 7:14:7, instanceId 4]AcknowledgedMode, seqNo 2111, PDU no. 5 in the frame, vt__a 2102, vt__s 2112, vt__ms 53, Mac request: numberOfPdus 7, macPduSize 340, macHeaderSize 4, data to be ciphered:
```
0000  0C  1F  82  03  00  D0  A5  66  96  13  A2  05  34  95  02  F3    '.......f....4...'
0010  22  E3  02  F5  44  35  02  03  13  73  22  E3  13  72  E3  13    '"...D5...s"..r.'
0020  03  02  E3  13  83  A3  33  73  33  53  49                        '......3s3SI'
```
[2007-10-09 19:59:52.551] 001900/sp2.lnh/DedicatedChModelPT(RLC__UP__DL__UE)

TABLE 1-continued

Sample layer 2 radio link control trace log dcsRlcTxHandler.cc:3018 BUS SEND:[ueRef 847, modId 0, rbId 16, rbType 7:14:7, instanceId 4]AcknowledgedMode, seqNo 2112, PDU no. 6 in the frame, vt_a 2102, vt_s 2113, vt_ms 53, Mac request: numberOfPdus 7, macPduSize 340, macHeaderSize 4, data to be ciphered:

```
0000  0C  20  54  3F  E3  B6  27  26  16  E6  36  83  D7  A3  96  84   '. T?..'&..6.....'
0010  73  46  24  B6  63  23  16  43  93  23  06  63  B7  27  06  F7   'sF$.c#.C.#.c.'..'
0020  27  40  D0  A0  D0  AA  16  1B  8C  F8  45                       ''@........E'
```
[2007-10-09 19:59:52.833] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2949, vr_r 2949, vr_h 2949, vr_mr 3461, block 0, macPduSize 336, macHeaderSize 0, deciphered data:
```
0000  DC  28  45  00  00  28  19  E9  40  00  45  06  F7  F3  AC  11   '.(E..(..@.E.....'
0010  64  12  0A  08  09  C8  91  EA  13  C4  06  1A  14  5B  CD  84   'd............[..'
0020  E0  13  50  10  BE  57  5F  CD  00  00  DC                       '..P..W_....'
```
[2007-10-09 19:59:52.833] 001900/sp2.lnh/DedicatedChModelPT(RLC_UP_UL_UE)
dcsRlcRxHandler.cc:1423 BUS RECEIVE:[ueRef 847, modId 0, rbId 16, rbType 7:14:7, instanceId 4]AcknowledgedMode, Data pdu, seqNo 2950, vr_r 2950, vr_h 2950, vr_mr 3462, block 1, macPduSize 336, macHeaderSize 0, deciphered data:
```
0000  DC  35  01  FE  55  55  55  55  55  55  55  55  55  55  55  55   '.5..UUUUUUUUUUUU'
0010  55  55  55  55  55  55  55  55  55  55  55  55  55  55  55  55   'UUUUUUUUUUUUUUUU'
0020  55  55  55  55  55  55  55  55  55  55  1F                       'UUUUUUUUUU.'
```
[2007-10-09 19:59:53.040] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3211, PDU no. 0 in the frame, vt_a 3211, vt_s 3212, vt_ms 1162, Mac request: numberOfPdus 2, macPduSize 340, macHeaderSize 4, data to be ciphered:
```
0000  0E  45  84  50  00  02  C5  36  94  00  03  B0  6C  86  E0  A0   '.E.P...6....l...'
0010  80  9C  8A  C1  16  41  3B  FC  D0  5B  84  71  B8  E7  10  00   '.....A;..[.q....'
0020  00  00  06  00  24  C0  06  BE  B0  00  06                       '....$......'
```
[2007-10-09 19:59:53.040] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3212, PDU no. 1 in the frame, vt_a 3211, vt_s 3213, vt_ms 1162, Mac request: numberOfPdus 2, macPduSize 340, macHeaderSize 4, data to be ciphered:
```
0000  0E  46  50  9F  E0  20  42  6E  83  11  93  39  7E  E2  64  64   '.FP.. Bn...9~.dd'
0010  75  C6  2B  B1  EA  D5  9D  68  BB  51  F0  D8  C6  17  23  9D   'u.+....h.Q....+.'
0020  6D  E0  56  C1  63  6F  7A  D9  E6  94  70                       'm.V.coz...p'
```
[2007-10-09 19:59:53.116] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1565, vr_r 1565, vr_h 1565, vr_mr 2077, block 0, macPduSize 336, macHeaderSize 0, deciphered data:
```
0000  B0  E8  45  00  00  2C  91  60  40  00  45  06  80  77  AC  11   '..E..,.`@.E..w..'
0010  64  13  0A  08  09  C8  05  B8  BF  CD  05  DE  8C  5D  47  1B   'd............]G.'
0020  8E  72  60  12  BF  40  87  F6  00  00  B0                       '.r`..@.....'
```
[2007-10-09 19:59:53.117] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1566, vr_r 1566, vr_h 1566, vr_mr 2078, block 1, macPduSize 336, macHeaderSize 0, deciphered data:
```
0000  B0  F5  09  FE  02  04  05  50  55  55  55  55  55  55  55  55   '.......PUUUUUUUU'
0010  55  55  55  55  55  55  55  55  55  55  55  55  55  55  55  55   'UUUUUUUUUUUUUUUU'
0020  55  55  55  55  55  55  55  55  55  55  0C                       'UUUUUUUUUU.'
```
[2007-10-09 19:59:53.123] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3213, PDU no. 0 in the frame, vt_a 3213, vt_s 3214, vt_ms 1164, Mac request: numberOfPdus 2, macPduSize 340, macHeaderSize 4, data to be ciphered:
```
0000  0E  46  84  50  00  02  85  36  B4  00  03  B0  6C  87  00  A0   '.F.P...6....l...'
0010  80  9C  8A  C1  16  41  3B  FC  D0  5B  84  71  B8  E7  20  5D   '.....A;..[.q.. ]'
0020  E8  C5  E5  01  04  DD  01  0C  00  00  0F                       '...........'
```
[2007-10-09 19:59:53.123] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3214, PDU no. 1 in the frame, vt_a 3213, vt_s 3215, vt_ms 1164, Mac request: numberOfPdus 2, macPduSize 340, macHeaderSize 4, data to be ciphered:
```
0000  0E  47  50  1F  E7  3F  A8  B4  18  44  32  51  5F  E3  71  84   '.GP..?...D2Q_.q.'
0010  07  0F  94  B3  60  6B  14  AA  D7  03  8A  57  58  D8  3B  8E   '....`k....WX.;.'
0020  FE  F5  CD  8A  44  F6  7B  1E  84  4C  D8                       '....D.{..L.'
```
[2007-10-09 19:59:53.126] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3215, PDU no. 0 in the frame, vt_a 3213, vt_s 3216, vt_ms 1164, Mac request: numberOfPdus 6, macPduSize 340, macHeaderSize 4, data to be ciphered:
```
0000  0E  47  84  50  00  53  C5  36  D4  00  03  B0  6C  35  A0  A0   '.G.P.S.6....15..'
0010  80  9C  8A  C1  16  41  3B  FC  D0  5B  84  71  B8  E7  20  5D   '.....A;..[.q.. ]'
0020  E8  C5  E5  01  04  DD  01  53  D0  00  04                       '.......S...'
```
[2007-10-09 19:59:53.126] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3216, PDU no. 1 in the frame, vt_a 3213, vt_s 3217, vt_ms 1164, Mac request: numberOfPdus 6, macPduSize 340, macHeaderSize 4, data to be ciphered:
```
0000  0E  48  04  94  E5  64  95  44  52  07  36  97  03  A3  13  93   '.H..d.DR.6.....'
0010  43  64  03  13  73  22  E3  13  72  E3  13  03  02  E3  13  93   'Cd..s"..r.......'
0020  A3  13  43  63  42  05  34  95  02  F3  2C                       '..CcB.4....'
```
[2007-10-09 19:59:53.126] 002000/sp2.lnh/DedicatedChModelPT(RLC_UP_DL_UE)

TABLE 1-continued

Sample layer 2 radio link control trace log dcsRlcTxHandler.cc:3018 BUS SEND:[ueRef 848, modId 0, rbId 16, rbType 7:14:7, instanceId 4]AcknowledgedMode, seqNo 3217, PDU no. 2 in the frame, vt_a 3213, vt_s 3218, vt_ms 1164, Mac request: numberOfPdus 6, macPduSize 340, macHeaderSize 4, data to be ciphered:

| 0000 | 0E | 48 | 82 | E3 | 00 | D0 | A5 | 46 | F3 | A2 | 03 | C7 | 36 | 97 | 03 | A3 | '.H.....F....6...' |
| 0010 | 13 | 93 | 73 | 23 | 63 | 73 | 53 | 13 | 93 | 43 | 64 | 07 | 36 | 17 | 47 | 57 | '..s#csS..Cd.6.GW' |
| 0020 | 26 | E2 | E6 | 36 | F6 | D3 | E0 | D0 | A4 | 67 | 23 | | | | | | '&..6.....g#' |

[2007-10-09 19:59:53.126] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3218, PDU no. 3 in the frame, vt_a 3213, vt_s 3219, vt_ms 1164, Mac request: numberOfPdus 6, macPduSize 340, macHeaderSize 4, data to be ciphered:

| 0000 | 0E | 49 | 06 | F6 | D3 | A2 | 02 | 23 | 13 | 93 | 23 | 62 | 22 | 03 | C7 | 36 | '.I.....#..#b"..6' |
| 0010 | 97 | 03 | A3 | 13 | 93 | 73 | 23 | 63 | 73 | 53 | 13 | 93 | 23 | 64 | 07 | 36 | '.....s#csS..#d.6' |
| 0020 | 17 | 47 | 57 | 26 | E2 | E6 | 36 | F6 | D3 | E3 | BE | | | | | | '.GW&..6....' |

[2007-10-09 19:59:53.126] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3219, PDU no. 4 in the frame, vt_a 3213, vt_s 3220, vt_ms 1164, Mac request: numberOfPdus 6, macPduSize 340, macHeaderSize 4, data to be ciphered:

| 0000 | 0E | 49 | 87 | 46 | 16 | 73 | D7 | 06 | 67 | 42 | B6 | 53 | 96 | 63 | 73 | 03 | '.I.F.s..gB.S.cs.' |
| 0010 | 93 | 03 | 56 | 43 | 46 | 26 | 33 | 23 | 73 | 43 | 16 | 53 | 73 | 93 | 23 | 46 | '..VCF&3#sC.Ss.#F' |
| 0020 | 36 | 33 | 73 | 63 | 56 | 46 | 13 | 56 | 63 | 13 | 21 | | | | | | '63scVF.Vc.!' |

[2007-10-09 19:59:53.126] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3220, PDU no. 5 in the frame, vt_a 3213, vt_s 3221, vt_ms 1164, Mac request: numberOfPdus 6, macPduSize 340, macHeaderSize 4, data to be ciphered:

| 0000 | 0E | 4A | 00 | D0 | A4 | 36 | 16 | C6 | C2 | D4 | 94 | 43 | A2 | 03 | 53 | 73 | '.J..6.....C..Ss' |
| 0010 | 16 | 53 | 46 | 46 | 13 | 63 | 26 | 23 | 06 | 13 | 03 | 13 | 93 | 23 | 93 | 63 | '.SFF.c&#.....#.c' |
| 0020 | 03 | 46 | 26 | 53 | 03 | 46 | 26 | 53 | 93 | 13 | 3D | | | | | | '.F&S.F&S..=' |

[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3221, PDU no. 0 in the frame, vt_a 3213, vt_s 3222, vt_ms 1164, Mac request: numberOfPdus 14, macPduSize 340, macHeaderSize 4, data to be ciphered:

| 0000 | 0E | 4A | 86 | 43 | 86 | 30 | D0 | A4 | 35 | 36 | 57 | 13 | A2 | 03 | 83 | 93 | '.J.C.0..56W.....' |
| 0010 | 13 | 73 | 03 | 53 | 42 | 04 | 94 | E5 | 64 | 95 | 44 | 50 | D0 | A4 | D6 | 17 | '.s.SB...d.DP....' |
| 0020 | 82 | D4 | 66 | F7 | 27 | 76 | 17 | 26 | 47 | 33 | AE | | | | | | '..f.'v.&G3.' |

[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3222, PDU no. 1 in the frame, vt_a 3213, vt_s 3223, vt_ms 1164, Mac request: numberOfPdus 14, macPduSize 340, macHeaderSize 4, data to be ciphered:

| 0000 | 0E | 4B | 02 | 03 | 63 | 90 | D0 | A4 | 36 | F6 | E7 | 46 | 56 | E7 | 42 | D4 | '.K..c...6..FV.B.' |
| 0010 | C6 | 56 | E6 | 77 | 46 | 83 | A2 | 03 | 23 | 93 | 00 | D0 | A5 | 66 | 96 | 13 | '.V.wF..#.....f..' |
| 0020 | A2 | 05 | 34 | 95 | 02 | F3 | 22 | E3 | 02 | F5 | 4D | | | | | | '..4..."...M' |

[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3223, PDU no. 2 in the frame, vt_a 3213, vt_s 3224, vt_ms 1164, Mac request: numberOfPdus 14, macPduSize 340, macHeaderSize 4, data to be ciphered:

| 0000 | 0E | 4B | 84 | 35 | 02 | 03 | 13 | 02 | E3 | 82 | E3 | 92 | E3 | 23 | 03 | 03 | '.K.5.........#..' |
| 0010 | A3 | 63 | 03 | 53 | 03 | B6 | 27 | 26 | 16 | E6 | 36 | 83 | D7 | A3 | 96 | 84 | '.c.S..'&..6.....' |
| 0020 | 73 | 46 | 24 | B6 | 83 | 36 | 66 | 62 | 23 | 0D | | | | | | | 'sFS.#.6fc#.' |

[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3224, PDU no. 3 in the frame, vt_a 3213, vt_s 3225, vt_ms 1164, Mac request: numberOfPdus 14, macPduSize 340, macHeaderSize 4, data to be ciphered:

| 0000 | 0E | 4C | 06 | 13 | 53 | 96 | 63 | 23 | 53 | 23 | 73 | 56 | 56 | 23 | 93 | 93 | '.L..S.c#S#sVV#..' |
| 0010 | 63 | 73 | 56 | 23 | 06 | 66 | 13 | 03 | 56 | 53 | 23 | 86 | A6 | 16 | 16 | 16 | 'csV#.f..VS#.....' |
| 0020 | 16 | 16 | 16 | 96 | 16 | 16 | 16 | 16 | 16 | 3E | | | | | | | '..........>' |

[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3225, PDU no. 4 in the frame, vt_a 3213, vt_s 3226, vt_ms 1164, Mac request: numberOfPdus 14, macPduSize 340, macHeaderSize 4, data to be ciphered:

| 0000 | 0E | 4C | 83 | 03 | 16 | 77 | 06 | 76 | 13 | 35 | A7 | 16 | B7 | 63 | 76 | 66 | '.L..w.v.5...cvf' |
| 0010 | D6 | D6 | D7 | 07 | 27 | 26 | 13 | 19 | E6 | 77 | 46 | 36 | 10 | D0 | A5 | 26 | '..3...'..wF6..&' |
| 0020 | 56 | 36 | F7 | 26 | 42 | D5 | 26 | F7 | 57 | 46 | 58 | | | | | | 'V6.&B.&.WFX' |

[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3226, PDU no. 5 in the frame, vt_a 3213, vt_s 3227, vt_ms 1164, Mac request: numberOfPdus 14, macPduSize 340, macHeaderSize 4, data to be ciphered:

| 0000 | 0E | 4D | 03 | A2 | 03 | C7 | 36 | 97 | 03 | A3 | 35 | A7 | 16 | B7 | 63 | 72 | '.M....6...5...cr' |
| 0010 | 53 | 04 | 26 | 17 | 17 | 16 | 74 | F6 | 26 | 56 | 36 | 23 | 97 | 97 | 36 | 97 | 'S.&...t.&V6#..6.' |
| 0020 | 02 | 53 | 34 | 13 | 13 | 93 | 73 | 23 | 63 | 73 | 53 | | | | | | '.S4...s#csS' |

[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3227, PDU no. 6 in the frame, vt_a 3213, vt_s 3228, vt_ms 1164, Mac request: numberOfPdus 14, macPduSize 340, macHeaderSize 4, data to be ciphered:

| 0000 | 0E | 4D | 83 | 13 | 93 | 43 | 62 | 53 | 43 | 07 | 36 | 17 | 47 | 57 | 26 | E2 | '.M...CbSC.6.GW&.' |
| 0010 | E6 | 36 | F6 | D4 | 07 | 06 | 37 | 36 | 36 | 62 | E7 | 36 | 17 | 47 | 57 | 26 | '.6....766b.6.GW&' |
| 0020 | E2 | E6 | 36 | F6 | D3 | A3 | 53 | 03 | 63 | 03 | B4 | | | | | | '..6...S.c.' |

[2007-10-09 19:59:53.133] 002000/sp2.lnh/DedicatedChModelPT(RLC_UP_DL_UE)

TABLE 1-continued

Sample layer 2 radio link control trace log dcsRlcTxHandler.cc:3018 BUS SEND:[ueRef 848, modId 0, rbId 16, rbType 7:14:7, instanceId 4]AcknowledgeMode, seqNo 3228, PDU no. 7 in the frame, vt_a 3213, vt_s 3229, vt_ms 1164, Mac request: numberOfPdus 14, macPduSize 340, macHeaderSize 4, data to be ciphered:

```
0000  0E  4E  06  D6  16  46  47  23  D3  13  02  E3  82  E3  92  E3    '.N...FG#........'
0010  23  03  03  B6  C7  23  E0  D0  A4  36  F6  E7  46  16  37  43    '#....#...6..F.7C'
0020  A2  03  C7  36  97  03  A7  97  35  74  AE                        '...6....5t.'
```
[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgeMode, seqNo 3229, PDU no. 8 in the frame, vt_a 3213, vt_s 3230, vt_ms 1164, Mac request: numberOfPdus 14, macPduSize 340, macHeaderSize 4, data to be ciphered:

```
0000  0E  4E  83  34  B5  94  D5  76  C5  97  26  C5  97  84  37  36    '.N.4...v..&...76'
0010  97  75  07  97  15  05  86  97  77  97  14  E5  74  A3  34  B5    '.u......w...t.4.'
0020  94  D7  32  E3  96  47  36  96  97  76  97                        '..2..G6..v.'
```
[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3230, PDU no. 9 in the frame, vt_a 3213, vt_s 3231, vt_ms 1164, Mac request: numberOfPdus 14, macPduSize 340, macHeaderSize 4, data to be ciphered:

```
0000  0E  4F  07  75  87  77  77  77  97  15  06  95  87  15  85  15    '.O.u.www........'
0010  15  14  06  D7  26  32  E7  36  17  47  57  26  E2  E6  36  F6    '....&2.6.GW&..6.'
0020  D3  B7  36  57  37  36  96  F6  E3  D3  13                        '..6W76.....'
```
[2007-10-09 19:59:53.133] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3231, PDU no. 10 in the frame, vt_a 3213, vt_s 3232, vt_ms 1164, Mac request: numberOfPdus 14, macPduSize 340, macHeaderSize 4, data to be ciphered:

```
0000  0E  4F  82  D3  13  E3  B2  B6  72  E7  06  F6  32  E7  46  16    '.O......r..2.F.'
0010  C6  B6  27  57  27  37  43  B6  97  36  66  F6  37  57  30  D0    '..'W'7C..6f.7W0.'
0020  A4  36  F6  E7  46  56  47  42  D5  47  90                        '.6..FV.B.G.'
```
[2007-10-09 19:59:53.134] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3232, PDU no. 11 in the frame, vt_a 3213, vt_s 3233, vt_ms 1164, Mac request: numberOfPdus 14, macPduSize 340, macHeaderSize 4, data to be ciphered:

```
0000  0E  50  07  06  53  A2  06  17  07  06  C6  96  36  17  46  96    '.P..S........6.F'
0010  F6  E2  F7  36  47  00  D0  A4  16  C6  C6  F7  73  A2  04  94    '...6G........s...'
0020  E4  64  F2  C2  05  24  54  64  55  22  CF                        '.d...$TdU".'
```
[2007-10-09 19:59:53.134] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3233, PDU no. 12 in the frame, vt_a 3213, vt_s 3234, vt_ms 1164, Mac request: numberOfPdus 14, macPduSize 340, macHeaderSize 4, data to be ciphered:

```
0000  0E  50  82  05  35  54  25  34  35  24  94  24  52  C2  05  55    'P..5T%45$.$R..U'
0010  04  44  15  44  52  C2  04  D4  55  35  14  74  52  C2  04        '.D.DR...U54.tR..'
0020  25  94  52  C2  04  F5  05  44  94  F4  E7                        '%.R....D...'
```
[2007-10-09 19:59:53.134] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3234, PDU no. 13 in the frame, vt_a 3213, vt_s 3235, vt_ms 1164, Mac request: numberOfPdus 14, macPduSize 340, macHeaderSize 4, data to be ciphered:

```
0000  0E  51  05  32  C2  04  34  14  E4  34  54  C2  C2  04  14  34    '.Q.2..4..4T....4'
0010  B2  C2  04  94  E5  64  95  44  50  D0  A4  16  C6  C6  F7  72    '.....d.DP......r'
0020  D4  57  66  56  E7  47  33  A2  06  36  F3                        '.WfV.G3..6.'
```
[2007-10-09 19:59:53.134] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3235, PDU no. 0 in the frame, vt_a 3213, vt_s 3236, vt_ms 1164, Mac request: numberOfPdus 14, macPduSize 340, macHeaderSize 4, data to be ciphered:

```
0000  0E  51  86  E6  66  57  26  56  E6  36  50  D0  A4  16  36  36    '.Q..fW&.V.6P...66'
0010  57  07  42  D4  36  F6  E7  46  16  37  43  A2  02  A3  B2  B6    'W.5.6..F.7C.....'
0020  72  E7  06  F6  32  E7  46  16  C6  B6  24                        'r...2.F...$'
```
[2007-10-09 19:59:53.134] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3236, PDU no. 1 in the frame, vt_a 3213, vt_s 3237, vt_ms 1164, Mac request: numberOfPdus 14, macPduSize 340, macHeaderSize 4, data to be ciphered:

```
0000  0E  52  07  57  27  37  43  B7  26  57  17  56  97  26  53  B6    '.R.W'7C.&W.V.&S.'
0010  57  87  06  C6  96  36  97  40  D0  A5  26  57  17  56  97  26    'W....6.@..&W.V.&'
0020  53  A2  06  16  E7  37  76  57  26  D6  F3                        'S....7vW&..'
```
[2007-10-09 19:59:53.134] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3237, PDU no. 2 in the frame, vt_a 3213, vt_s 3238, vt_ms 1164, Mac request: numberOfPdus 14, macPduSize 340, macHeaderSize 4, data to be ciphered:

```
0000  0E  52  86  46  50  D0  A5  37  57  07  06  F7  27  46  56  43    '.R.FP.7W...'FVC'
0010  A2  07  46  96  D6  57  22  C2  06  E6  F7  26  56  66  57  27    '..F..W"....&VfW"'
0020  37  56  20  D0  A5  02  D4  17  37  36  59                        '7V .....76Y'
```
[2007-10-09 19:59:53.134] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3238, PDU no. 3 in the frame, vt_a 3213, vt_s 3239, vt_ms 1164, Mac request: numberOfPdus 14, macPduSize 340, macHeaderSize 4, data to be ciphered:

```
0000  0E  53  07  27  46  56  42  D4  96  46  56  E7  46  97  47  93    '.S.'FVB..FV.F.G.'
0010  A2  02  23  13  93  23  62  22  03  C7  46  56  C3  A2  B3  13    '..#..#b"..FV....'
0020  93  73  23  63  73  53  13  93  23  63  EF                        '.s#csS..#c.'
```
[2007-10-09 19:59:53.134] 002000/sp2.lnh/DedicatedChModelPT(RLC_UP_DL_UE)

TABLE 1-continued

Sample layer 2 radio link control trace log

```
dcsRlcTxHandler.cc:3018 BUS SEND:[ueRef 848, modId 0, rbId 16, rbType 7:14:7, instanceId
4]AcknowledgedMode, seqNo 3239, PDU no. 4 in the frame, vt_a 3213, vt_s 3240, vt_ms 1164, Mac
request: numberOfPdus 14, macPduSize 340, macHeaderSize 4, data to be ciphered:
0000  0E  53  80  D0  A5  02  D4  17  37  36  57  27  46  56  42  D4  '.S......76W'FVB.'
0010  96  46  56  E7  46  97  47  93  A2  02  23  13  93  23  62  22  '.FV.F.G...#..#b"'
0020  03  C7  36  97  03  A3  13  93  73  23  68                      '..6.....s#h'
[2007-10-09 19:59:53.134] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3240, PDU no. 5 in the frame, vt_a 3213, vt_s 3241, vt_ms 1164, Mac
request: numberOfPdus 14, macPduSize 340, macHeaderSize 4, data to be ciphered:
0000  0E  54  03  73  53  13  93  23  64  07  36  17  47  57  26  E2  '.T.sS..#d.6.GW&.'
0010  E6  36  F6  D3  E0  D0  A5  26  56  66  57  27  26  56  42  D4  '.6.....&VfW'&VB.'
0020  27  93  A2  02  23  13  93  23  62  22  06                      ''...#..#b".'
[2007-10-09 19:59:53.134] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3241, PDU no. 6 in the frame, vt_a 3213, vt_s 3242, vt_ms 1164, Mac
request: numberOfPdus 14, macPduSize 340, macHeaderSize 4, data to be ciphered:
0000  0E  54  83  C7  46  56  C3  A2  B3  13  93  73  23  63  73  53  '.T..FV.....s#csS'
0010  13  93  23  63  D0  A4  D6  96  E2  D5  34  53  A2  03  63      '..#c.......4S..c'
0020  03  00  D0  A5  36  57  37  36  96  F6  E0                      '....6W76...'
[2007-10-09 19:59:53.134] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3242, PDU no. 7 in the frame, vt_a 3213, vt_s 3243, vt_ms 1164, Mac
request: numberOfPdus 14, macPduSize 340, macHeaderSize 4, data to be ciphered:
0000  0E  55  02  D4  57  87  06  97  26  57  33  A2  03  63  03  03  '.U..W...&W3..c..'
0010  B7  26  56  67  26  57  36  86  57  23  D7  56  17  30  D0  A5  '.&Vg&W6.W#.V.0..'
0020  57  36  57  22  D4  16  76  56  E7  43  A3                      'W6W"..vV.C.'
[2007-10-09 19:59:53.134] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3243, PDU no. 8 in the frame, vt_a 3213, vt_s 3244, vt_ms 1164, Mac
request: numberOfPdus 14, macPduSize 340, macHeaderSize 4, data to be ciphered:
0000  0E  55  82  05  06  F4  32  D7  36  57  27  62  F4  F4  D4  13  '.U....2.6W'b....'
0010  12  E3  02  04  57  26  96  37  37  36  F6  E2  D4  D5  24  64  '....W&.776....$d'
0020  32  F5  23  84  15  F3  15  F3  03  10  D6                      '2.#........'
[2007-10-09 19:59:53.135] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3244, PDU no. 9 in the frame, vt_a 3213, vt_s 3245, vt_ms 1164, Mac
request: numberOfPdus 14, macPduSize 340, macHeaderSize 4, data to be ciphered:
0000  0E  56  00  A5  02  D4  36  16  C6  C6  56  42  D5  06  17  27  '.V....6...VB..."
0010  47  92  D4  43  A2  03  C7  36  97  03  A3  13  93  73  23      'G...C...6.....s#'
0020  63  73  53  13  93  43  64  07  36  17  42                      'csS..Cd.6.B'
[2007-10-09 19:59:53.135] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3245, PDU no. 10 in the frame, vt_a 3213, vt_s 3246, vt_ms 1164, Mac
request: numberOfPdus 14, macPduSize 340, macHeaderSize 4, data to be ciphered:
0000  0E  56  87  57  26  E2  E6  36  F6  D3  E0  D0  A4  16  E7  37  '.V.W&..6.......7'
0010  76  57  22  D4  D6  F6  46  53  A2  04  17  57  46  F0  D0  A0  'vW"..FS...WF...'
0020  D0  A7  63  D3  00  D0  A6  F3  D7  57  36                      '..c......W6'
[2007-10-09 19:59:53.135] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3246, PDU no. 11 in the frame, vt_a 3213, vt_s 3247, vt_ms 1164, Mac
request: numberOfPdus 14, macPduSize 340, macHeaderSize 4, data to be ciphered:
0000  0E  57  06  57  25  04  62  03  13  13  93  13  93  53  93  93  '.W.W%.b......S..'
0010  93  82  03  13  13  93  13  93  53  93  93  82  04  94  E2      '........S......'
0020  04  95  03  42  03  13  02  E3  82  E3  8C                      '...B.......'
[2007-10-09 19:59:53.135] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3247, PDU no. 12 in the frame, vt_a 3213, vt_s 3248, vt_ms 1164, Mac
request: numberOfPdus 14, macPduSize 340, macHeaderSize 4, data to be ciphered:
0000  0E  57  82  E3  23  13  00  D0  A7  33  D5  34  95  02  05  36  '.W..#....3.4...6'
0010  57  37  36  96  F6  E0  D0  A6  33  D4  94  E2  04  95  03  42  'W76.....3.......B'
0020  03  13  02  E3  82  E3  82  E3  23  13  07                      '........#..'
[2007-10-09 19:59:53.135] 002000/sp2.lnh/DedicatedChModelPT(RLC__UP__DL__UE)
dcsRlcTxHandler.cc:3018 BUS SEND:[ueRef 848, modId 0, rbId 16, rbType 7:14:7, instanceId
4]AcknowledgedMode, seqNo 3248, PDU no. 13 in the frame, vt_a 3213, vt_s 3249, vt_ms 1164, Mac
request: numberOfPdus 14, macPduSize 340, macHeaderSize 4, data to be ciphered:
0000  0E  58  52  9F  E0  D0  A7  43  D3  02  03  00  D0  A6  D3  D6  '.XR....C........'
0010  17  56  46  96  F2  03  53  33  7C  B0  03  67  CC  B4  03  67  '.VF...S3|..g...g'
0020  CC  B8  03  67  CC  BC  03  67  CC  C0  03                      '...g....g...'
[2007-10-09 19:59:53.416] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId
4]AcknowledgedMode, Data pdu, seqNo 1567, vr_r 1567, vr_h 1567, vr_mr 2079, block 0, macPduSize
336, macHeaderSize 0, deciphered data:
0000  B0  F8  45  00  00  28  91  61  40  00  45  06  80  7A  AC  11  '..E..(.a@.E..z.'
0010  64  13  0A  08  09  C8  05  B8  BF  CD  05  DE  8C  5E  47  1B  'd............^G.'
0020  93  86  50  10  BF  40  9A  3B  00  00  B1                      '..P..@.;...'
[2007-10-09 19:59:53.416] 002000/sp2.lnh/DedicatedChModelPT(RLC__UP__UL__UE)
```

TABLE 1-continued

Sample layer 2 radio link control trace log dcsRlcRxHandler.cc:1423 BUS RECEIVE:[ueRef 848, modId 0, rbId 16, rbType 7:14:7, instanceId 4]AcknowledgedMode, Data pdu, seqNo 1568, vr_r 1568, vr_h 1568, vr_mr 2080, block 1, macPduSize 336, macHeaderSize 0, deciphered data:

```
0000  B1  05  01  FE  55  55  55  55  55  55  55  55  55  55  55  55   '....UUUUUUUUUUUU'
0010  55  55  55  55  55  55  55  55  55  55  55  55  55  55  55  55   'UUUUUUUUUUUUUUUU'
0020  55  55  55  55  55  55  55  32                                    'UUUUUUUU2'
```

[2007-10-09 19:59:53.424] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3249, PDU no. 0 in the frame, vt_a 3249, vt_s 3250, vt_ms 1200, Mac request: numberOfPdus 6, macPduSize 340, macHeaderSize 4, data to be ciphered:

```
0000  0E  58  84  50  00  0D  D5  37  24  00  03  B0  6C  7B  40  A0   '.X.P...7$...1(@.'
0010  80  9C  8A  C1  16  41  3B  FC  D0  5B  84  71  B9  38  60  5D   '.....A;..[.q.8 ]'
0020  E8  C5  E5  01  84  DD  0A  99  60  00  0D                        '........ ..'
```

[2007-10-09 19:59:53.424] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3250, PDU no. 1 in the frame, vt_a 3249, vt_s 3251, vt_ms 1200, Mac request: numberOfPdus 6, macPduSize 340, macHeaderSize 4, data to be ciphered:

```
0000  0E  59  03  03  02  05  25  45  02  F4  15  65  02  03  13  03   '.Y....%E...e....'
0010  90  D0  A6  13  D7  27  47  06  D0  A6  13  03  A3  13  03  92  04  '......G.........'
0020  14  D5  22  F3  83  03  03  00  D0  A6  1B                        '..".......'
```

[2007-10-09 19:59:53.424] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3251, PDU no. 2 in the frame, vt_a 3249, vt_s 3252, vt_ms 1200, Mac request: numberOfPdus 6, macPduSize 340, macHeaderSize 4, data to be ciphered:

```
0000  0E  59  83  D7  07  46  96  D6  53  A3  23  03  00  D0  A6  13   '.Y...F.S.#.....'
0010  D6  D6  17  87  07  46  96  D6  53  A3  43  03  00  D0  A6  13   '.....F.S.C.....'
0020  D6  66  D7  47  03  A3  13  03  92  06  F8                        '.f.G.......'
```

[2007-10-09 19:59:53.424] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3252, PDU no. 3 in the frame, vt_a 3249, vt_s 3253, vt_ms 1200, Mac request: numberOfPdus 6, macPduSize 340, macHeaderSize 4, data to be ciphered:

```
0000  0E  5A  06  37  46  57  42  D6  16  C6  96  76  E3  D3  13  B6   '.Z.7FWB....v....'
0010  D6  F6  46  52  D7  36  57  43  D3  10  D0  A6  13  D2  B6  72   '..FR.6WC.......r'
0020  E7  06  F6  32  E7  46  16  C6  B6  27  51                        '...2.F...'Q'
```

[2007-10-09 19:59:53.424] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3253, PDU no. 4 in the frame, vt_a 3249, vt_s 3254, vt_ms 1200, Mac request: numberOfPdus 6, macPduSize 340, macHeaderSize 4, data to be ciphered:

```
0000  0E  5A  87  27  37  40  D0  A6  13  D7  36  56  E6  47  26  56   '.Z.'7@....6V.G&V'
0010  37  60  D0  A6  13  D7  27  46  07  A3  53  33  73  03  10        '7'....'F7..S3s..'
0020  D0  A6  D3  D6  17  07  06  C6  96  36  1B                        '.........6.'
```

[2007-10-09 19:59:53.424] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3254, PDU no. 5 in the frame, vt_a 3249, vt_s 3255, vt_ms 1200, Mac request: numberOfPdus 6, macPduSize 340, macHeaderSize 4, data to be ciphered:

```
0000  0E  5B  52  BF  E7  46  96  F6  E2  03  53  33  73  03  12  07   '.[R..F....S3s...'
0010  56  47  02  05  44  24  35  00  D0  AB  2B  62  D1  B0  EE  00   'VG..D$5...+b....'
0020  57  6C  AA  57  A7  FA  BA  B4  C7  24  B3                        'W.l.W.....$.'
```

[2007-10-09 19:59:53.517] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1569, vr_r 1569, vr_h 1569, vr_mr 2081, block 0, macPduSize 336, macHeaderSize 0, deciphered data:

```
0000  B1  08  45  00  01  DC  91  62  40  00  45  06  7E  C5  AC  11   '..E....b@.E.~...'
0010  64  13  0A  08  09  C8  05  B8  BF  CD  05  DE  8C  5E  47  1B   'd............^G.'
0020  94  3B  50  18  BE  8B  38  14  00  00  B1                        '.;P...8....'
```

[2007-10-09 19:59:53.517] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1570, vr_r 1570, vr_h 1570, vr_mr 2082, block 1, macPduSize 336, macHeaderSize 0, deciphered data:

```
0000  B1  10  53  49  50  2F  32  2E  30  20  31  30  30  20  54  72   '..SIP/2.0 100 Tr'
0010  79  69  6E  67  0D  0A  76  3A  20  53  49  50  2F  32  2E  30   'ying..v: SIP/2.0'
0020  2F  54  43  50  20  31  30  2E  38  2E  B1                        '/TCP 10.8..'
```

[2007-10-09 19:59:53.517] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1571, vr_r 1571, vr_h 1571, vr_mr 2083, block 2, macPduSize 336, macHeaderSize 0, deciphered data:

```
0000  B1  18  39  2E  32  30  30  3A  36  30  35  30  3B  62  72  61   '..9.200:6050;bra'
0010  6E  63  68  3D  7A  39  68  47  34  62  4B  62  38  33  66  66   'nch=z9hG4bKb83ff'
0020  32  30  61  35  39  66  32  35  32  37  B1                        '20a59f2527.'
```

[2007-10-09 19:59:53.517] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1572, vr_r 1572, vr_h 1572, vr_mr 2084, block 3, macPduSize 336, macHeaderSize 0, deciphered data:

```
0000  B1  20  35  65  62  39  39  36  37  35  62  30  66  61  30  35   '. 5eb99675b0fa05'
0010  65  32  38  6A  61  61  61  61  61  69  61  61  61  61  61       'e28jaaaaaiaaaaa'
0020  61  63  30  31  67  70  67  61  33  5A  45                        'ac01gpga3ZE'
```

[2007-10-09 19:59:53.537] 002000/sp2.lnh/DedicatedChModelPT(RLC_UP_UL_UE)

TABLE 1-continued

Sample layer 2 radio link control trace log dcsRlcRxHandler.cc:1423 BUS RECEIVE:[ueRef 848, modId 0, rbId 16, rbType 7:14:7, instanceId 4]AcknowledgedMode, Data pdu, seqNo 1573, vr_r 1573, vr_h 1573, vr_mr 2085, block 0, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 28 | 71 | 6B | 76 | 37 | 66 | 6D | 6D | 63 | 30 | 70 | 79 | 72 | 71 | 6E | '.(qkv7fmmc0pyrqn' |
| 0010 | 67 | 74 | 63 | 61 | 0D | 0A | 74 | 3A | 20 | 22 | 31 | 39 | 34 | 36 | 22 | 20 | 'gtca..t: "1946" ' |
| 0020 | 3C | 73 | 69 | 70 | 3A | 31 | 39 | 37 | 32 | 36 | B1 | | | | | | '<sip:19726.' |

[2007-10-09 19:59:53.537] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1574, vr_r 1574, vr_h 1574, vr_mr 2086, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 30 | 37 | 35 | 31 | 39 | 34 | 36 | 40 | 73 | 61 | 74 | 75 | 72 | 6E | 2E | '.0751946@saturn.' |
| 0010 | 63 | 6F | 6D | 3E | 0D | 0A | 66 | 3A | 20 | 22 | 31 | 39 | 32 | 36 | 22 | 20 | 'com>..f: "1926" ' |
| 0020 | 3C | 73 | 69 | 70 | 3A | 31 | 39 | 37 | 32 | 36 | B1 | | | | | | '<sip:19726.' |

[2007-10-09 19:59:53.537] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1575, vr_r 1575, vr_h 1575, vr_mr 2087, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 38 | 37 | 35 | 31 | 39 | 32 | 36 | 40 | 73 | 61 | 74 | 75 | 72 | 6E | 2E | '.8751926@saturn.' |
| 0010 | 63 | 6F | 6D | 3E | 3B | 74 | 61 | 67 | 3D | 70 | 66 | 74 | 2B | 65 | 39 | 66 | 'com>;tag=pft+e9f' |
| 0020 | 37 | 30 | 39 | 30 | 35 | 64 | 34 | 62 | 63 | 32 | B1 | | | | | | '70905d4bc2.' |

[2007-10-09 19:59:53.537] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1576, vr_r 1576, vr_h 1576, vr_mr 2088, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 40 | 37 | 34 | 31 | 65 | 37 | 39 | 32 | 34 | 63 | 63 | 37 | 36 | 35 | 64 | '.@741e7924cc765d' |
| 0010 | 61 | 35 | 66 | 31 | 32 | 0D | 0A | 43 | 53 | 65 | 71 | 3A | 20 | 38 | 39 | 31 | 'a5f12..CSeq: 891' |
| 0020 | 37 | 30 | 35 | 34 | 20 | 49 | 4E | 56 | 49 | 54 | 1F | | | | | | '7054 INVIT.' |

[2007-10-09 19:59:53.557] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1577, vr_r 1577, vr_h 1577, vr_mr 2089, block 0, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 48 | 45 | 0D | 0A | 69 | 3A | 20 | 35 | 37 | 31 | 65 | 34 | 64 | 61 | 36 | '.HE..i: 571e4da6' |
| 0010 | 32 | 62 | 30 | 61 | 30 | 31 | 39 | 32 | 39 | 36 | 30 | 34 | 62 | 65 | 30 | 34 | '2b0a01929604be04' |
| 0020 | 62 | 65 | 39 | 31 | 33 | 64 | 38 | 63 | 0D | 0A | B1 | | | | | | 'be913d8c...' |

[2007-10-09 19:59:53.557] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1578, vr_r 1578, vr_h 1578, vr_mr 2090, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 50 | 53 | 65 | 72 | 76 | 65 | 72 | 3A | 20 | 50 | 6F | 43 | 2D | 63 | 6C | '.PServer: PoC-cl' |
| 0010 | 69 | 65 | 6E | 74 | 2F | 4F | 4D | 41 | 31 | 2E | 30 | 20 | 4F | 62 | 69 | 67 | 'ient/OMA1.0 Obig' |
| 0020 | 6F | 50 | 6F | 43 | 2F | 76 | 31 | 2E | 30 | 2E | B1 | | | | | | 'oPoC/v1.0..' |

[2007-10-09 19:59:53.557] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1579, vr_r 1579, vr_h 1579, vr_mr 2091, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 58 | 30 | 0D | 0A | 50 | 2D | 50 | 72 | 65 | 66 | 65 | 72 | 72 | 65 | 64 | '.X0..P-Preferred' |
| 0010 | 2D | 49 | 64 | 65 | 6E | 74 | 69 | 74 | 79 | 3A | 20 | 3C | 73 | 69 | 70 | 3A | '-Identity: <sip:' |
| 0020 | 31 | 39 | 37 | 32 | 36 | 37 | 35 | 31 | 39 | 34 | B1 | | | | | | '1972675194.' |

[2007-10-09 19:59:53.557] 002000/sp2.lnh/DedicatedChModelPT(RLC_UP_DL_UE)
dcsRlcRxHandler.cc:1423 BUS RECEIVE:[ueRef 848, modId 0, rbId 16, rbType 7:14:7, instanceid 4]AcknowledgedMode, Data pdu, seqNo 1580, vr_r 1580, vr_h 1580, vr_mr 2092, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 61 | 48 | 36 | 40 | 73 | 61 | 74 | 75 | 72 | 6E | 2E | 63 | 6F | 6D | 3E | '.aH6@saturn.com>' |
| 0010 | 0D | 0A | 43 | 6F | 6E | 74 | 65 | 6E | 74 | 2D | 4C | 65 | 6E | 67 | 74 | 68 | '..Content-Length' |
| 0020 | 3A | 20 | 30 | 0D | 0A | 0D | 0A | 45 | 00 | 03 | 1F | | | | | | ': 0....E...' |

[2007-10-09 19:59:53.568] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3255, PDU no. 0 in the frame, vt_a 3255, vt_s 3256, vt_ms 1206, Mac request: numberOfPdus 2, macPduSize 340, macHeaderSize 4, data to be ciphered:

| | | | | | | | | | | | | | | | | | |
|---|---|---|---|---|---|---|---|---|---|---|---|---|---|---|---|---|---|
| 0000 | 0E | 5B | 84 | 50 | 00 | 02 | 85 | 37 | B4 | 00 | 03 | B0 | 6C | 86 | 00 | A0 | '.[.P...7....l..' |
| 0010 | 80 | 9C | 8A | C1 | 16 | 41 | 3B | FC | D0 | 5B | 84 | 71 | B9 | 43 | B0 | 5D | '.....A;..[.q.C.]' |
| 0020 | E8 | E1 | 25 | 01 | 04 | DD | 00 | 94 | 30 | 00 | 09 | | | | | | '..%....0..' |

[2007-10-09 19:59:53.568] 002000/sp2.lnh/DedicatedChModelPT(RLC_UP_UL_UE)
dcsRlcTxHandler.cc:3018 BUS SEND:[ueRef 848, modId 0, rbId 16, rbType 7:14:7, instanceId 4]AcknowledgedMode, seqNo 3256, PDU no. 1 in the frame, vt_a 3255, vt_s 3257, vt_ms 1206, Mac request: numberOfPdus 2, macPduSize 340, macHeaderSize 4, data to be ciphered:

| | | | | | | | | | | | | | | | | | |
|---|---|---|---|---|---|---|---|---|---|---|---|---|---|---|---|---|---|
| 0000 | 0E | 5C | 50 | 1F | EB | B4 | EA | B4 | 3F | 3E | 9F | 34 | D5 | 64 | 10 | 60 | '.\P....?>.4.d.`' |
| 0010 | DE | EE | 16 | 40 | 02 | 4C | A9 | 74 | AA | 72 | D3 | FD | 1B | 33 | 7B | AC | '...@.L.t.r...3{.' |
| 0020 | 72 | 53 | 55 | C9 | 1A | 52 | 8A | 45 | AC | 81 | 9E | | | | | | 'rSU..R.E...' |

[2007-10-09 19:59:53.577] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1581, vr_r 1581, vr_h 1581, vr_mr 2093, block 0, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | 68 | 28 | 91 | 63 | 00 | 00 | 45 | 11 | BD | 6D | AC | 11 | 64 | 13 | 0A | '.h(.c..E..m..d..' |
| 0010 | 08 | 09 | C8 | 05 | B8 | 13 | C4 | 03 | 14 | 25 | D7 | 53 | 55 | 42 | 53 | 43 | '.........%.SUBSC' |
| 0020 | 52 | 49 | 42 | 45 | 20 | 73 | 69 | 70 | 3A | 79 | B1 | | | | | | 'RIBE sip:y.' |

[2007-10-09 19:59:53.577] 002000/sp2.lnh/DedicatedChModelPT(RLC_UP_UL_UE)

TABLE 1-continued

Sample layer 2 radio link control trace log dcsRlcRxHandler.cc:1423 BUS RECEIVE:[ueRef 848, modId 0, rbId 16, rbType 7:14:7, instanceId 4]AcknowledgedMode, Data pdu, seqNo 1582, vr_r 1582, vr_h 1582, vr_mr 2094, block 1, macPduSize 336, macHeaderSize 0, deciphered data:

```
0000  B1  70  73  57  4A  33  4B  59  4D  57  6C  59  72  6C  59  78    '.psWJ3KYMlYrlYx'
0010  43  73  69  77  50  79  71  50  58  69  77  79  71  4E  57  4A    'CsiwPyqPXiwyqNWJ'
0020  33  4B  59  4D  73  2E  39  64  73  69  B1                        '3KYMs.9dsi.'
```

[2007-10-09 19:59:53.577] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1583, vr_r 1583, vr_h 1583, vr_mr 2095, block 2, macPduSize 336, macHeaderSize 0, deciphered data:

```
0000  B1  78  69  77  69  77  58  77  77  77  79  71  50  69  58  71    '.xiwiwXwwwyqPiXq'
0010  58  51  51  51  40  6D  72  63  2E  73  61  74  75  72  6E  2E    'XQQQ@mrc.saturn.'
0020  63  6F  6D  3B  73  65  73  73  69  6F  B1                        'com;sessio.'
```

[2007-10-09 19:59:53.577] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1584, vr_r 1584, vr_h 1584, vr_mr 2096, block 3, macPduSize 336, macHeaderSize 0, deciphered data:

```
0000  B1  80  6E  3D  31  2D  31  20  53  49  50  2F  32  2E  30  0D    '..n=1-1 SIP/2.0.'
0010  0A  76  3A  20  53  49  50  2F  32  2E  30  2F  55  44  50  20    '.v: SIP/2.0/UDP '
0020  31  37  32  2E  31  37  2E  31  30  30  5D                        '172.17.100]'
```

[2007-10-09 19:59:53.597] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1585, vr_r 1585, vr_h 1585, vr_mr 2097, block 0, macPduSize 336, macHeaderSize 0, deciphered data:

```
0000  B1  88  2E  31  39  3A  30  31  34  36  34  3B  62  72  61  6E    '...19:01464;bran'
0010  63  68  3D  7A  39  68  47  34  62  4B  62  36  65  34  63  31    'ch=z9hG4bKb6e4c1'
0020  32  61  3B  72  70  6F  72  74  0D  0A  B1                        '2a;rport...'
```

[2007-10-09 19:59:53.597] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1586, vr_r 1586, vr_h 1586, vr_mr 2098, block 1, macPduSize 336, macHeaderSize 0, deciphered data:

```
0000  B1  90  74  3A  20  3C  73  69  70  3A  79  73  57  4A  33  4B    '..t: <sip:ysWJ3K'
0010  59  4D  57  6C  59  72  6C  59  78  43  73  69  77  50  79  71    'YMWlYrlYxCsiwPyq'
0020  50  58  69  77  79  71  4E  57  4A  33  B1                        'PXiwyqNWJ3.'
```

[2007-10-09 19:59:53.597] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1587, vr_r 1587, vr_h 1587, vr_mr 2099, block 2, macPduSize 336, macHeaderSize 0, deciphered data:

```
0000  B1  98  4B  59  4D  73  2E  39  64  73  69  69  77  69  77  58    '..KYMs.9dsiiwiwX'
0010  77  77  77  79  71  50  69  58  71  58  51  51  51  40  6D  72    'wwwyqPiXqXQQQ@mr'
0020  63  2E  73  61  74  75  72  6E  2E  63  B1                        'c.saturn.c.'
```

[2007-10-09 19:59:53.597] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1588, vr_r 1588, vr_h 1588, vr_mr 2100, block 3, macPduSize 336, macHeaderSize 0, deciphered data:

```
0000  B1  A0  6F  6D  3B  73  65  73  73  69  6F  6E  3D  31  2D  31    '..om;session=l-1'
0010  3E  0D  0A  66  3A  20  3C  73  69  70  3A  31  39  37  32  36    '>..f: <sip:19726'
0020  37  35  31  39  34  36  40  73  61  74  1F                        '751946@sat.'
```

[2007-10-09 19:59:53.617] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1589, vr_r 1589, vr_h 1589, vr_mr 2101, block 0, macPduSize 336, macHeaderSize 0, deciphered data:

```
0000  B1  A8  75  72  6E  2E  63  6F  6D  3E  3B  74  61  67  3D  33    '..urn.com>;tag=3'
0010  37  39  30  31  0D  0A  43  53  65  71  3A  20  32  30  39  30    '7901..CSeq: 2090'
0020  37  20  53  55  42  53  43  52  49  42  B1                        '7 SUBSCRIB.'
```

[2007-10-09 19:59:53.617] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1590, vr_r 1590, vr_h 1590, vr_mr 2102, block 1, macPduSize 336, macHeaderSize 0, deciphered data:

```
0000  B1  B0  45  0D  0A  69  3A  20  66  34  62  37  65  39  35  38    '..E..i: f4b7e958'
0010  62  39  33  39  0D  0A  4D  61  78  2D  46  6F  72  77  61  72    'b939..Max-Forwar'
0020  64  73  3A  20  37  30  0D  0A  6D  3A  B1                        'ds: 70..m:.'
```

[2007-10-09 19:59:53.617] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1591, vr_r 1591, vr_h 1591, vr_mr 2103, block 2, macPduSize 336, macHeaderSize 0, deciphered data:

```
0000  B1  B8  20  22  31  39  34  36  22  20  3C  73  69  70  3A  31    '.. "1946" <sip:1'
0010  39  34  36  40  31  37  32  2E  31  37  2E  31  30  30  2E  31    '946@172.17.100.1'
0020  39  3A  31  34  36  34  3E  0D  0A  53  B1                        '9:1464>..S.'
```

[2007-10-09 19:59:53.617] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1592, vr_r 1592, vr_h 1592, vr_mr 2104, block 3, macPduSize 336, macHeaderSize 0, deciphered data:

```
0000  B1  C0  75  70  70  6F  72  74  65  64  3A  20  74  69  6D  65    '..upported: time'
0010  72  0D  0A  55  73  65  72  2D  41  67  65  6E  74  3A  20  50    'r..User-Agent: P'
0020  6F  43  2D  63  6C  69  65  6E  74  2F  32                        'oC-client/2'
```

[2007-10-09 19:59:53.637] 002000/sp2.lnh/DedicatedChModelPT(RLC_UP_UL_UE)

TABLE 1-continued

Sample layer 2 radio link control trace log dcsRlcRxHandler.cc:1423 BUS RECEIVE:[ueRef 848, modId 0, rbId 16, rbType 7:14:7, instanceId 4]AcknowledgedMode, Data pdu, seqNo 1593, vr_r 1593, vr_h 1593, vr_mr 2105, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | C8 | 4F | 4D | 41 | 31 | 2E | 30 | 20 | 4F | 62 | 69 | 67 | 6F | 50 | 6F | '..OMA1.0 ObigoPo' |
| 0010 | 43 | 2F | 76 | 31 | 2E | 30 | 2E | 30 | 0D | 0A | 41 | 63 | 63 | 65 | 70 | 74 | 'C/v1.0.0..Accept' |
| 0020 | 2D | 43 | 6F | 6E | 74 | 61 | 63 | 74 | 3A | 20 | B1 | | | | | | '-Contact: .' |

[2007-10-09 19:59:53.637] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1594, vr_r 1594, vr_h 1594, vr_mr 2106, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | D0 | 2A | 3B | 2B | 67 | 2E | 70 | 6F | 63 | 2E | 74 | 61 | 6C | 6B | 62 | '..*;+g.poc.talkb' |
| 0010 | 75 | 72 | 73 | 74 | 3B | 72 | 65 | 71 | 75 | 69 | 72 | 65 | 3B | 65 | 78 | 70 | 'urst;require;exp' |
| 0020 | 6C | 69 | 63 | 69 | 74 | 0D | 0A | 45 | 76 | 65 | B1 | | | | | | 'licit..Eve.' |

[2007-10-09 19:59:53.637] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1595, vr_r 1595, vr_h 1595, vr_mr 2107, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | D8 | 6E | 74 | 3A | 20 | 63 | 6F | 6E | 66 | 65 | 72 | 65 | 6E | 63 | 65 | '..nt: conference' |
| 0010 | 0D | 0A | 41 | 63 | 63 | 65 | 70 | 74 | 3A | 20 | 61 | 70 | 70 | 6C | 69 | 63 | '..Accept: applic' |
| 0020 | 61 | 74 | 69 | 6F | 6E | 2F | 63 | 6F | 6E | 66 | 4F | | | | | | 'ation/confO' |

[2007-10-09 19:59:53.657] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1596, vr_r 1596, vr_h 1596, vr_mr 2108, block 0, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | E0 | 65 | 72 | 65 | 6E | 63 | 65 | 2D | 69 | 6E | 66 | 6F | 2B | 78 | 6D | '..erence-info + xm' |
| 0010 | 6C | 0D | 0A | 45 | 78 | 70 | 69 | 72 | 65 | 73 | 3A | 20 | 33 | 36 | 30 | 30 | 'l..Expires: 3600' |
| 0020 | 0D | 0A | 41 | 6C | 6C | 6F | 77 | 3A | 20 | 49 | B1 | | | | | | '..ALLOW: I.' |

[2007-10-09 19:59:53.657] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1597 vr_r 1597, vr_h 1597, vr_mr 2109, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | E8 | 4E | 56 | 49 | 54 | 45 | 2C | 20 | 41 | 43 | 4B | 2C | 20 | 42 | 59 | '..NVITE, ACK, BY' |
| 0010 | 45 | 2C | 20 | 43 | 41 | 4E | 43 | 45 | 4C | 2C | 20 | 55 | 50 | 44 | 41 | 54 | 'E, CANCEL, UPDAT' |
| 0020 | 45 | 2C | 20 | 4E | 4F | 54 | 49 | 46 | 59 | 2C | B1 | | | | | | 'E, NOTIFY,.' |

[2007-10-09 19:59:53.657] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1598, vr_r 1598, vr_h 1598, vr_mr 2110, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | F0 | 20 | 4D | 45 | 53 | 53 | 41 | 47 | 45 | 2C | 20 | 4F | 50 | 54 | 49 | '.. MESSAGE, OPTI' |
| 0010 | 4F | 4E | 53 | 0D | 0A | 50 | 2D | 50 | 72 | 65 | 66 | 65 | 72 | 72 | 65 | 64 | 'ONS..P-Preferred' |
| 0020 | 2D | 49 | 64 | 65 | 6E | 74 | 69 | 74 | 79 | 3A | B1 | | | | | | '-Identity:.' |

[2007-10-09 19:59:53.657] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1599, vr_r 1599, vr_h 1599, vr_mr 2111, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B1 | F8 | 20 | 3C | 73 | 69 | 70 | 3A | 31 | 39 | 37 | 32 | 36 | 37 | 35 | 31 | '.. <sip:19726751' |
| 0010 | 39 | 34 | 36 | 40 | 73 | 61 | 74 | 75 | 72 | 6E | 2E | 63 | 6F | 6D | 3E | 0D | '946@saturn.com>.' |
| 0020 | 0A | 52 | 6F | 75 | 74 | 65 | 3A | 20 | 3C | 73 | 58 | | | | | | '.Route: <sX' |

[2007-10-09 19:59:53.656] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1600, vr_r 1600, vr_h 1600, vr_mr 2112, block 0, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B2 | 00 | 69 | 70 | 3A | 31 | 30 | 2E | 38 | 2E | 39 | 2E | 32 | 30 | 30 | 3A | '..ip:10.8.9.200:' |
| 0010 | 35 | 30 | 36 | 30 | 3B | 6C | 72 | 3E | 0D | 0A | 43 | 6F | 6E | 74 | 65 | 6E | '5060;lr>..Conten' |
| 0020 | 74 | 2D | 4C | 65 | 6E | 67 | 74 | 68 | 3A | 20 | B2 | | | | | | 't-Length: .' |

[2007-10-09 19:59:53.677] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1601, vr_r 1601, vr_h 1601, vr_mr 2113, block 1, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B2 | 09 | 0A | 30 | 0D | 0A | 0D | 0A | 45 | 00 | 04 | 87 | 91 | 64 | 40 | 00 | '...0....E....d@.' |
| 0010 | 45 | 06 | 7C | 18 | AC | 11 | 64 | 0A | 09 | C8 | 05 | B8 | BF | CD | | | 'E.|..d.........' |
| 0020 | 05 | DE | 8E | 12 | 47 | 1B | 94 | 3B | 50 | 18 | B2 | | | | | | '....G..;P..' |

[2007-10-09 19:59:53.677] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1602, vr_r 1602, vr_h 1602, vr_mr 2114, block 2, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B2 | 10 | BE | 8B | 60 | 36 | 00 | 00 | 53 | 49 | 50 | 2F | 32 | 2E | 30 | 20 | '....`6..SIP/2.0 ' |
| 0010 | 32 | 30 | 30 | 20 | 4F | 4B | 0D | 0A | 76 | 3A | 20 | 53 | 49 | 50 | 2F | 32 | '200 OK..v: SIP/2' |
| 0020 | 2E | 30 | 2F | 54 | 43 | 50 | 20 | 31 | 30 | 2E | B2 | | | | | | '.0/TCP 10..' |

[2007-10-09 19:59:53.677] 002000/sp2.lnh/DedicatedChModelPT(RLC__UP__UL__UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1603, vr_r 1603, vr_h 1603, vr_mr 2115, block 3, macPduSize 336, macHeaderSize 0, deciphered data:

| | | | | | | | | | | | | | | | | | |
|---|---|---|---|---|---|---|---|---|---|---|---|---|---|---|---|---|---|
| 0000 | B2 | 18 | 38 | 2E | 39 | 2E | 32 | 30 | 30 | 3A | 36 | 30 | 35 | 30 | 3B | 62 | '..8.9.200:6050;b' |
| 0010 | 72 | 61 | 6E | 63 | 68 | 3D | 7A | 39 | 68 | 47 | 34 | 62 | 4B | 62 | 38 | 33 | 'ranch=z9hG4bKb83' |
| 0020 | 66 | 66 | 32 | 30 | 61 | 35 | 39 | 66 | 32 | 35 | 3C | | | | | | 'ff20a59f25<' |

[2007-10-09 19:59:53.737] 002000/sp2.lnh/DedicatedChModelPT(RLC__UP__UL__UE)

TABLE 1-continued

Sample layer 2 radio link control trace log dcsRlcRxHandler.cc:1423 BUS RECEIVE:[ueRef 848, modId 0, rbId 16, rbType 7:14:7, instanceId 4]AcknowledgedMode, Data pdu, seqNo 1612, vr_r 1604, vr_h 1604, vr_mr 2116, block 0, macPduSize 336, macHeaderSize 0, deciphered data:

| 0000 | B2 | 60 | 70 | 61 | 64 | 0D | 0A | 53 | 65 | 72 | 76 | 65 | 72 | 3A | 20 | 50 | '.`pad..Server: P' |
| 0010 | 6F | 43 | 2D | 63 | 6C | 69 | 65 | 6E | 74 | 2F | 4F | 4D | 41 | 31 | 2E | 30 | 'oC-Client/OMA1.0' |
| 0020 | 20 | 4F | 62 | 69 | 67 | 6F | 50 | 6F | 43 | 2F | B2 | | | | | | 'ObigoPoC/.' |

[2007-10-09 19:59:53.737] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1613, vr_r 1604, vr_h 1613, vr_mr 2116, block 1, macPduSize 336, macHeaderSize 0, deciphered data:

| 0000 | B2 | 68 | 76 | 31 | 2E | 30 | 2E | 30 | 0D | 0A | 52 | 65 | 63 | 6F | 72 | 64 | '.hv1.0.0..Record' |
| 0010 | 2D | 52 | 6F | 75 | 74 | 65 | 3A | 20 | 3C | 73 | 69 | 70 | 3A | 33 | 5A | 71 | '-Route: <sip:3zq' |
| 0020 | 6B | 76 | 37 | 25 | 30 | 42 | 61 | 71 | 71 | 67 | B2 | | | | | | 'kv7%0Baqqg.' |

[2007-10-09 19:59:53.737] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1614, vr_r 1604, vr_h 1614, vr_mr 2116, block 2, macPduSize 336, macHeaderSize 0, deciphered data:

| 0000 | B2 | 70 | 4F | 62 | 65 | 63 | 62 | 39 | 79 | 73 | 69 | 70 | 25 | 33 | 41 | 31 | '.pObecb9ysip%3A1' |
| 0010 | 39 | 37 | 32 | 36 | 37 | 35 | 31 | 39 | 34 | 36 | 25 | 34 | 30 | 73 | 61 | 74 | '9726751946%40sat' |
| 0020 | 75 | 72 | 6E | 2E | 63 | 6F | 6D | 40 | 70 | 63 | B2 | | | | | | 'urn.com@pc.' |

[2007-10-09 19:59:53.737] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1615, vr_r 1604, vr_h 1615, vr_mr 2116, block 3, macPduSize 336, macHeaderSize 0, deciphered data:

| 0000 | B2 | 78 | 73 | 63 | 66 | 2E | 73 | 61 | 74 | 75 | 72 | 6E | 2E | 63 | 6F | 6D | '.xscf.saturn.com' |
| 0010 | 3A | 35 | 30 | 36 | 30 | 3B | 6D | 61 | 64 | 64 | 72 | 3D | 31 | 30 | 2E | 38 | ':5060;maddr=10.8' |
| 0020 | 2E | 39 | 2E | 32 | 30 | 30 | 3B | 6C | 72 | 3E | 32 | | | | | | '.9.200;lr>2' |

[2007-10-09 19:59:53.757] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1616, vr_r 1604, vr_h 1616, vr_mr 2116, block 0, macPduSize 336, macHeaderSize 0, deciphered data:

| 0000 | B2 | 80 | 0D | 0A | 41 | 6C | 6C | 6F | 77 | 3A | 20 | 49 | 4E | 56 | 49 | 54 | '....Allow: INVIT' |
| 0010 | 45 | 2C | 20 | 41 | 43 | 4B | 2C | 20 | 42 | 59 | 45 | 2C | 20 | 43 | 41 | 4E | 'E, ACK, BYE, CAN' |
| 0020 | 43 | 45 | 4C | 2C | 20 | 55 | 50 | 44 | 41 | 54 | B2 | | | | | | 'CEL, UPDAT.' |

[2007-10-09 19:59:53.757] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1617, vr_r 1604, vr_h 1617, vr_mr 2116, block 1, macPduSize 336, macHeaderSize 0, deciphered data:

| 0000 | B2 | 88 | 45 | 2C | 20 | 4E | 4F | 54 | 49 | 46 | 59 | 2C | 20 | 4D | 45 | 53 | '..E, NOTIFY, MES' |
| 0010 | 53 | 41 | 47 | 45 | 2C | 20 | 4F | 50 | 54 | 49 | 4F | 4E | 53 | 0D | 0A | 50 | 'SAGE, OPTIONS..P' |
| 0020 | 2D | 50 | 72 | 65 | 66 | 65 | 72 | 72 | 65 | 64 | B2 | | | | | | '-Preferred.' |

[2007-10-09 19:59:53.757] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1618, vr_r 1604, vr_h 1618, vr_mr 2116, block 2, macPduSize 336, macHeaderSize 0, deciphered data:

| 0000 | B2 | 90 | 2D | 49 | 64 | 65 | 6E | 74 | 69 | 74 | 79 | 3A | 20 | 3C | 73 | 69 | '..-Identity: <si' |
| 0010 | 70 | 3A | 31 | 39 | 37 | 32 | 36 | 37 | 35 | 31 | 39 | 34 | 36 | 40 | 73 | 61 | 'p:19726751946@sa' |
| 0020 | 74 | 75 | 72 | 6E | 2E | 63 | 6F | 6D | 3E | 0D | B2 | | | | | | 'turn.com>..' |

[2007-10-09 19:59:53.757] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1619, vr_r 1604, vr_h 1619, vr_mr 2116, block 3, macPduSize 336, macHeaderSize 0, deciphered data:

| 0000 | B2 | 98 | 0A | 52 | 65 | 71 | 75 | 69 | 72 | 65 | 3A | 20 | 74 | 69 | 6D | 65 | '...Require: time' |
| 0010 | 72 | 0D | 0A | 53 | 65 | 73 | 73 | 69 | 6F | 6E | 2D | 45 | 78 | 70 | 69 | 72 | 'r..Session-Expir' |
| 0020 | 65 | 73 | 3A | 20 | 36 | 30 | 30 | 3B | 72 | 65 | 3C | | | | | | 'es: 600;re<' |

[2007-10-09 19:59:53.774] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3257, PDU no. 0 in the frame, vt_a 3257, vt_s 3258, vt_ms 1208, Mac request: numberOfPdus 7, macPduSize 340, macHeaderSize 4, data to be ciphered:

| 0000 | 0E | 5C | 84 | 50 | 00 | 30 | 55 | 38 | C0 | 00 | 03 | A1 | 10 | 66 | 80 | A0 | '.α.P.0U8.....f..' |
| 0010 | 80 | 9C | 8A | C1 | 16 | 41 | 31 | 3C | 40 | 5B | 80 | 2F | 18 | 67 | 05 | 34 | '......A1<@[./.g.4' |
| 0020 | 95 | 02 | F3 | 22 | E3 | 02 | 03 | 23 | 03 | 02 | 09 | | | | | | '..."..#...' |

[2007-10-09 19:59:53.774] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3258, PDU no. 1 in the frame, vt_a 3257, vt_s 3259, vt_ms 1208, Mac request: numberOfPdus 7, macPduSize 340, macHeaderSize 4, data to be ciphered:

| 0000 | 0E | 5D | 04 | F4 | B0 | D0 | A5 | 46 | F3 | A2 | 03 | C7 | 36 | 97 | 03 | A7 | '.]......F...6..' |
| 0010 | 97 | 35 | 74 | A3 | 34 | B5 | 94 | D5 | 76 | C5 | 97 | 26 | C5 | 97 | 84 | 37 | '.5t.4...v..&...7' |
| 0020 | 36 | 97 | 75 | 07 | 97 | 15 | 05 | 86 | 97 | 77 | 96 | | | | | | '6.u......w.' |

[2007-10-09 19:59:53.774] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3259, PDU no. 2 in the frame, vt_a 3257, vt_s 3260, vt_ms 1208, Mac request: numberOfPdus 7, macPduSize 340, macHeaderSize 4, data to be ciphered:

| 0000 | 0E | 5D | 87 | 14 | E5 | 74 | A3 | 34 | B5 | 94 | D7 | 32 | E3 | 96 | 47 | 36 | '.]..t.4...2..G6' |
| 0010 | 96 | 97 | 76 | 97 | 75 | 87 | 77 | 77 | 77 | 97 | 15 | 06 | 95 | 87 | 15 | 85 | '..v.u.www.......' |
| 0020 | 15 | 15 | 14 | 06 | D7 | 26 | 32 | E7 | 36 | 17 | 4C | | | | | | '.....&2.6.L' |

[2007-10-09 19:59:53.774] 002000/sp2.lnh/DedicatedChModelPT(RLC_UP_DL_UE)

TABLE 1-continued

Sample layer 2 radio link control trace log dcsRlcTxHandler.cc:3018 BUS SEND:[ueRef 848, mcdId 0, rbId 16, rbType 7:14:7, instanceId 4]AcknowledgedMode, seqNo 3260, PDU no. 3 in the frame, vt_a 3257, vt_s 3261, vt_ms 1206, Mac request: numberOfPdus 7, macPduSize 340, macHeaderSize 4, data to be ciphered:

```
0000  0E  5E  07  57  26  E2  E6  36  F6  D3  B7  36  57  37  36  96   '.^.W&..6...6W76.'
0010  F6  E3  D3  12  D3  13  E3  B7  46  16  73  D6  16  46  43  06   '........F.s..FC.'
0020  26  43  53  96  13  93  53  66  23  23  5E                       '&CS...Sfc#^'
```
[2007-10-09 19:59:53.774] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3261, PDU no. 4 in the frame, vt_a 3257, vt_s 3262, vt_ms 1208, Mac request: numberOfPdus 7, macPduSize 340, macHeaderSize 4, data to be ciphered:

```
0000  0E  5E  83  76  23  23  63  83  23  73  33  26  23  46  23  23   '.^.v##c.#s3&#F##'
0010  73  03  83  20  D0  A4  67  26  F6  D3  A2  03  C7  36  97  03   's.. ..g&......6..'
0020  A3  13  93  73  23  63  73  53  13  93  4D                       '...s#csS..M'
```
[2007-10-09 19:59:53.774] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3262, PDU no. 5 in the frame, vt_a 3257, vt_s 3263, vt_ms 1208, Mac request: numberOfPdus 7, macPduSize 340, macHeaderSize 4, data to be ciphered:

```
0000  0E  5F  03  64  07  36  17  47  57  26  E2  E6  36  F6  D3  E3   '._.d.6.GW&..6...'
0010  B7  46  16  73  33  33  73  93  03  10  A4  36  16  C6  C2  73   '.F.s3.3s......6..'
0020  D4  94  43  A2  06  63  46  23  76  53  9E                       '..C..cF#vS.'
```
[2007-10-09 19:59:53.774] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3263, PDU no. 6 in the frame, vt_a 3257, vt_s 3264, vt_ms 1208, Mac request: numberOfPdus 7, macPduSize 340, macHeaderSize 4, data to be ciphered:

```
0000  0E  5F  83  53  86  23  93  33  90  D0  A4  35  36  57  13  A2   '._.S.#.3...56W..'
0010  03  23  03  93  03  72  05  35  54  25  34  35  24  94  24  50   '.#...r.5T%45S.SP'
0020  D0  A4  36  F6  E7  46  56  E7  42  D4  C4                       '..6..FV.B..'
```
[2007-10-09 19:59:53.777] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1620, vr_r 1604, vr_h 1620, vr_mr 2116, block 0, macPduSize 336, macHeaderSize 0, deciphered data:

```
0000  B2  A0  66  72  65  73  68  65  72  3D  75  61  73  0D  0A  63   '..fresher=uas..c'
0010  3A  20  61  70  70  6C  69  63  61  74  69  6F  6E  2F  73  64   ': application/sd'
0020  70  0D  0A  43  6F  6E  74  65  6E  74  B2                       'p..Content.'
```
[2007-10-09 19:59:53.777] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1621, vr_r 1604, vr_h 1621, vr_mr 2116, block 1, macPduSize 336, macHeaderSize 0, deciphered data:

```
0000  B2  A8  2D  4C  65  6E  67  74  68  3A  20  33  34  39  0D  0A   '..-Length: 349..'
0010  0D  0A  76  3D  30  0D  0A  6F  3D  75  73  65  72  6E  61  6D   '..v=0..o=usernam'
0020  65  20  31  31  39  31  39  34  31  39  B2                       'e 11919419.'
```
[2007-10-09 19:59:53.777] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1622, vr_r 1604, vr_h 1622, vr_mr 2116, block 2, macPduSize 336, macHeaderSize 0, deciphered data:

```
0000  B2  B0  35  34  20  31  31  39  31  39  34  31  39  35  34  20   '..54 1191941954 '
0010  49  4E  20  49  50  34  20  31  37  32  2E  31  37  2E  31  30   'IN IP4 172.17.10'
0020  30  2E  31  39  0D  0A  73  3D  73  65  B2                       '0.19..s=se.'
```
[2007-10-09 19:59:53.777] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1623, vr_r 1604, vr_h 1623, vr_mr 2116, block 3, macPduSize 336, macHeaderSize 0, deciphered data:

```
0000  B2  B8  73  73  69  6F  6E  0D  0A  63  3D  49  4E  20  49  50   '..ssion..c=IN IP'
0010  34  20  31  37  32  2E  31  37  2E  31  30  30  2E  31  39  0D   '4 172.17.100.19.'
0020  0A  74  3D  30  20  30  0D  0A  6D  3D  32                       '.t=0 0..m=2'
```
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3264, PDU no. 0 in the frame, vt_a 3257, vt_s 3265, vt_ms 1208, Mac request: numberOfPdus 13, macPduSize 340, macHeaderSize 4, data to be ciphered:

```
0000  0E  60  06  56  E6  77  46  83  A2  03  00  D0  A5  66  96  13   '.`.V.wF......f..'
0010  A2  05  34  95  02  F3  22  E3  02  F5  54  45  02  03  13  73   '..4..."...TE...s'
0020  22  E3  13  72  E3  13  03  02  E3  13  98                       '"..r.......'
```
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3265, PDU no. 1 in the frame, vt_a 3257, vt_s 3266, vt_ms 1208, Mac request: numberOfPdus 13, macPduSize 340, macHeaderSize 4, data to be ciphered:

```
0000  0E  60  83  A3  03  13  43  63  43  B6  27  26  16  E6  36  83   '.`....CcC.'&..6.'
0010  D7  A3  96  84  73  46  24  B6  23  66  53  46  33  13  26  13   '....sF$.#sF3.&.'
0020  B7  27  06  F7  27  40  D0  A5  26  56  37                       '.'..'@..&V7'
```
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3266, PDU no. 2 in the frame, vt_a 3257, vt_s 3267, vt_ms 1208, Mac request: numberOfPdus 13, macPduSize 340, macHeaderSize 4, data to be ciphered:

```
0000  0E  61  06  F7  26  42  D5  26  F7  57  46  53  A2  03  C7  36   '.a..&B.&.WFS...6'
0010  97  03  A3  35  A7  16  B7  63  72  53  04  16  17  16  16  74   '...5...crS.....t'
0020  76  16  16  B6  E7  77  36  97  02  53  3B                       'v...w6...S;'
```
[2007-10-09 19:59:53.781] 002000/sp2.lnh/DedicatedChModelPT(RLC_UP_DL_UE)

TABLE 1-continued

Sample layer 2 radio link control trace log

```
dcsRlcTxHandler.cc:3018 BUS SEND:[ueRef 848, modId 0, rbId 16, rbType 7:14:7, instanceId
4]AcknowledgedMode, seqNo 3267, PDU no. 3 in the frame, vt_a 3257, vt_s 3268, vt_ms 1208, Mac
request: numberOfPdus 13, macPduSize 340, macHeaderSize 4, data to be ciphered:
0000  0E  61  84  13  13  93  73  23  63  73  53  13  93  43  62  53   '.a....s#csS..CbS'
0010  43  07  36  17  47  57  26  E2  E6  36  F6  D4  07  06  37  36   'C.6.GW&..6....76'
0020  36  62  E7  36  17  47  57  26  E2  E6  36                       '6b.6.GW&..6'
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3268, PDU no. 4 in the frame, vt_a 3257, vt_s 3269, vt_ms 1208, Mac
request: numberOfPdus 13, macPduSize 340, macHeaderSize 4, data to be ciphered:
0000  0E  62  06  F6  D3  A3  53  03  63  03  B6  D6  16  46  47  23   '.b..S.c....FG#'
0010  D3  13  02  E3  82  E3  92  E3  23  03  03  B6  C7  23  E0  D0   '........#....#..'
0020  A4  36  F6  E7  46  16  37  43  A2  03  C1                       '.6..F.7C...'
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3269, PDU no. 5 in the frame, vt_a 3257, vt_s 3270, vt_ms 1208, Mac
request: numberOfPdus 13, macPduSize 340, macHeaderSize 4, data to be ciphered:
0000  0E  62  87  36  97  03  A7  97  35  74  A3  34  B5  94  D5  76   '.b.6....St.4...v'
0010  C5  97  26  C5  97  84  37  36  97  07  97  15  05  86  97       '..&...76.u......'
0020  77  97  14  E5  74  A3  34  B5  94  D7  34                       'w...t.4...4'
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3270, PDU no. 6 in the frame, vt_a 3257, vt_s 3271, vt_ms 1208, Mac
request: numberOfPdus 13, macPduSize 340, macHeaderSize 4, data to be ciphered:
0000  0E  63  02  E3  96  47  36  96  97  76  97  75  87  77  77  77   '.c...G6..v.u.www'
0010  97  15  06  95  87  15  85  15  15  14  06  D7  26  32  E7  36   '............&2.6'
0020  17  47  57  26  E2  E6  36  F6  D3  E3  BE                       '.GW&..6....'
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3271, PDU no. 7 in the frame, vt_a 3257, vt_s 3272, vt_ms 1208, Mac
request: numberOfPdus 13, macPduSize 340, macHeaderSize 4, data to be ciphered:
0000  0E  63  82  B6  72  E7  06  F6  32  E7  46  16  C6  B6  27  57   '.c..r...2.F..'W'
0010  27  37  43  B6  97  36  66  F6  37  57  30  D0  A5  37  57  07   ''7C..6f.7W0..7W.'
0020  06  F7  27  46  56  43  A2  06  E6  F7  2D                       '..'FVC....-'
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3272, PDU no. 8 in the frame, vt_a 3257, vt_s 3273, vt_ms 1208, Mac
request: numberOfPdus 13, macPduSize 340, macHeaderSize 4, data to be ciphered:
0000  0E  64  06  56  66  57  27  37  56  20  D0  A5  02  D4  17  37   '.d.VfW'7V .....7'
0010  36  57  27  46  56  42  D4  96  46  56  E7  46  97  47  93  A2   '6W'FVB..F.V.F.G..'
0020  03  C7  36  97  03  A7  97  35  74  A3  37                       '..6....5t.7'
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3273, PDU no. 9 in the frame, vt_a 3257, vt_s 3274, vt_ms 1208, Mac
request: numberOfPdus 13, macPduSize 340, macHeaderSize 4, data to be ciphered:
0000  0E  64  84  B5  94  D5  76  C5  97  26  C5  97  84  37  36  97   '.d....v..&...76.'
0010  75  07  97  15  05  86  97  77  97  14  E5  74  A3  34  B5  94   'u......w...t.4..'
0020  D7  32  E3  96  47  36  96  97  76  97  73                       '.2..G6..v.s'
[2007-10-09 19:59:53.781] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3274, PDU no. 10 in the frame, vt_a 3257, vt_s 3275, vt_ms 1208, Mac
request: numberOfPdus 13, macPduSize 340, macHeaderSize 4, data to be ciphered:
0000  0E  65  05  87  77  77  77  97  15  06  95  B7  15  85  15  15   '.e..www.........'
0010  14  06  D7  26  32  E7  36  17  47  57  26  E2  E6  36  F6  D3   '...&2.6.GW&..6..'
0020  B7  36  57  37  36  96  F6  E3  D3  12  D0                       '.6W76......'
[2007-10-09 19:59:53.782] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3275, PDU no. 11 in the frame, vt_a 3257, vt_s 3276, vt_ms 1208, Mac
request: numberOfPdus 13, macPduSize 340, macHeaderSize 4, data to be ciphered:
0000  0E  65  83  13  E0  D0  A4  57  87  06  97  26  57  33  A2  03   '.e.....W...&W3..'
0010  33  63  03  00  D0  A5  36  57  27  66  57  23  A2  04  57  26   '3c....6W'fW#..W&'
0020  96  37  37  36  F6  E2  D4  D5  24  64  39                       '.776....$d9'
[2007-10-09 19:59:53.782] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3276, PDU no. 12 in the frame, vt_a 3257, vt_s 3277, vt_ms 1208, Mac
request: numberOfPdus 13, macPduSize 340, macHeaderSize 4, data to be ciphered:
0000  0E  66  51  BF  E2  F5  23  84  15  F3  15  F3  03  10  D0  A0   '.fQ...#.........'
0010  D0  A3  67  F9  80  03  67  F9  84  03  67  F9  88  03  67  F9   '..g...g...g...g.'
0020  8C  03  67  F9  90  03  67  F9  94  03  67                       '..g...g...g'
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId
4]AcknowledgedMode, seqNo 3277, PDU no. 0 in the frame, vt_a 3257, vt_s 3278, vt_ms 1208, Mac
request: numberOfPdus 14, macPduSize 340, macHeaderSize 4, data to be ciphered:
0000  0E  66  84  50  00  4B  05  38  D0  00  03  B1  10  3B  C0  A0   '.f.P.K.8.....;..'
0010  80  9C  8A  C1  16  41  31  7A  20  5B  80  49  C4  D5  C4  E4   '.....A1z [.I....'
0020  F5  44  94  65  92  07  36  97  03  A3  17                       '.D.e..6....'
[2007-10-09 19:59:53.794] 002000/sp2.lnh/DedicatedChModelPT(RLC_UP_DL_UE)
```

TABLE 1-continued

Sample layer 2 radio link control trace log dcsRlcTxHandler.cc:3018 BUS SEND:[ueRef 848, modId 0, rbId 16, rbType 7:14:7, instanceId 4]AcknowledgedMode, seqNo 3278, PDU no. 1 in the frame, vt_a 3257, vt_s 3279, vt_ms 1208, Mac request: numberOfPdus 14, macPduSize 340, macHeaderSize 4, data to be ciphered:

```
0000  0E  67  03  93  43  64  03  13  73  22  E3  13  72  E3  13  03   '.g..Cd..s"..r..'
0010  02  E3  13  93  A3  13  43  63  42  05  34  95  02  F3  22  E3   '......CcB.4..."..'
0020  00  D0  A5  46  F3  A2  03  C7  36  97  0B                       '...F....6..'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3279, PDU no. 2 in the frame, vt_a 3257, vt_s 3280, vt_ms 1208, Mac request: numberOfPdus 14, macPduSize 340, macHeaderSize 4, data to be ciphered:
```
0000  0E  67  83  A3  13  93  73  23  63  73  53  13  93  43  64  07   '.g....s#csS..Cd.'
0010  36  17  47  57  26  E2  E6  36  F6  D3  E3  B7  46  16  73  D3   '6.GW&..6....F.s.'
0020  33  73  93  03  10  D0  A4  67  26  F6  DF                       '3s.....g&..'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3280, PDU no. 3 in the frame, vt_a 3257, vt_s 3281, vt_ms 1208, Mac request: numberOfPdus 14, macPduSize 340, macHeaderSize 4, data to be ciphered:
```
0000  0E  68  03  A2  03  C7  36  97  03  A7  97  35  74  A3  34  B5   '.h...6....5t.4.'
0010  94  D5  76  C5  97  26  C5  97  84  37  36  97  75  07  97  15   '..v..&...76.u...'
0020  05  86  97  77  97  14  E5  74  A3  34  B4                       '...w...t.4.'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3281, PDU no. 4 in the frame, vt_a 3257, vt_s 3282, vt_ms 1208, Mac request: numberOfPdus 14, macPduSize 340, macHeaderSize 4, data to be ciphered:
```
0000  0E  68  85  94  D7  32  E3  96  47  36  96  97  76  97  75  87   '.h..2..G6..v.u.'
0010  77  77  77  97  15  06  95  87  15  85  15  15  14  06  D7  26   'www............&'
0020  32  E7  36  17  47  57  26  E2  E6  36  FC                       '2.6.GW&..6.'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3282, PDU no. 5 in the frame, vt_a 3257, vt_s 3283, vt_ms 1208, Mac request: numberOfPdus 14, macPduSize 340, macHeaderSize 4, data to be ciphered:
```
0000  0E  69  06  D3  B7  36  57  37  36  96  F6  E3  D3  12  D3  13   '.i...6W76.......'
0010  E3  B7  46  16  73  D6  16  46  43  06  26  43  53  96  13  93   '..F.s..FC.&CS...'
0020  53  66  63  23  53  76  23  23  63  83  25                       'Sfc#Sv##c.%'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3283, PDU no. 6 in the frame, vt_a 3257, vt_s 3284, vt_ms 1208, Mac request: numberOfPdus 14, macPduSize 340, macHeaderSize 4, data to be ciphered:
```
0000  0E  69  83  73  33  26  23  46  23  23  73  03  83  20  D0  A4   '.i.s3&#F##s.. ..'
0010  36  16  C6  C2  D4  94  43  A2  06  46  23  76  53  93  53       '6.....C..cF#vS.S'
0020  86  23  93  33  90  D0  A4  35  36  57  1E                       '.#.3...56W.'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3284, PDU no. 7 in the frame, vt_a 3257, vt_s 3285, vt_ms 1208, Mac request: numberOfPdus 14, macPduSize 340, macHeaderSize 4, data to be ciphered:
```
0000  0E  6A  03  A2  03  83  93  13  73  03  53  32  04  E4  F5  44   '.j......s.S2...D'
0010  94  65  90  D0  A4  D6  17  82  D4  66  F7  27  76  17  26  47   '.e.......f.'v.&G'
0020  33  A2  03  63  90  D0  A4  36  F6  E7  44                       '3..c...6..D'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3285, PDU no. 8 in the frame, vt_a 3257, vt_s 3286, vt_ms 1208, Mac request: numberOfPdus 14, macPduSize 340, macHeaderSize 4, data to be ciphered:
```
0000  0E  6A  86  56  E7  42  D4  C6  56  E6  77  46  83  A2  03  33   '.j.V.B..V.wF...3'
0010  83  00  D0  A5  66  96  13  A2  05  34  95  02  F3  22  E3  02   '....f...4..."..'
0020  F5  54  45  02  03  13  02  E3  82  E3  97                       '.TE........'
```
[2007-10-09 19:59:53.794] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3286, PDU no. 9 in the frame, vt_a 3257, vt_s 3287, vt_ms 1208, Mac request: numberOfPdus 14, macPduSize 340, macHeaderSize 4, data to be ciphered:
```
0000  0E  6B  02  E3  23  03  03  A3  63  03  53  03  B6  27  26  16   '.k.#...c.S..'&.'
0010  E6  36  83  D7  A3  96  84  73  46  B6  13  46  43  63  16       '.6.....sF$..FCc.'
0020  46  26  16  33  13  63  76  26  36  23  43                       'F&.3.cv&6#C'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3287, PDU no. 10 in the frame, vt_a 3257, vt_s 3288, vt_ms 1208, Mac request: numberOfPdus 14, macPduSize 340, macHeaderSize 4, data to be ciphered:
```
0000  0E  6B  83  23  43  56  53  13  13  76  63  86  63  33  66  26   '.k.#CVS..vc.c3f&'
0010  53  76  36  A6  16  16  16  16  16  16  96  16  16  16  16  16   'Sv6............'
0020  16  63  17  96  D7  26  87  13  35  A7  10                       '.c...&...5..'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3288, PDU no. 11 in the frame, vt_a 3257, vt_s 3289, vt_ms 1208, Mac request: numberOfPdus 14, macPduSize 340, macHeaderSize 4, data to be ciphered:
```
0000  0E  6C  06  B7  63  76  86  B3  26  E7  36  86  B6  17  76  77   '.l.cv..&..6...vw'
0010  17  76  86  10  D0  A5  26  56  36  F7  26  42  D5  26  F7  57   '.v....&V6.&B.&.W'
0020  46  53  A2  03  C7  36  97  03  A3  35  AF                       'FS...6...5.'
```
[2007-10-09 19:59:53.795] 002000/sp2.lnh/DedicatedChModelPT(RLC_UP_DL_UE)

TABLE 1-continued

Sample layer 2 radio link control trace log dcsRlcTxHandler.cc:3018 BUS SEND:[ueRef 848, modId 0, rbId 16, rbType 7:14:7, instanceId 4]AcknowledgedMode, seqNo 3289, PDU no. 12 in the frame, vt_a 3257, vt_s 3290, vt_ms 1208, Mac request: numberOfPdus 14, macPduSize 340, macHeaderSize 4, data to be ciphered:

```
0000  0E  6C  87  16  B7  63  72  53  04  16  17  16  16  74  F6  26   '.l...crS.....t.&'
0010  56  36  23  67  36  97  02  53  34  13  13  93  73  23  63  73   'V6#g6..S4...s#cs'
0020  53  13  93  43  62  53  43  07  36  17  47                       'S..CbSC.6.G'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3290, PDU no. 13 in the frame, vt_a 3257, vt_s 3291, vt_ms 1208, Mac request: numberOfPdus 14, macPduSize 340, macHeaderSize 4, data to be ciphered:

```
0000  0E  6D  07  57  26  E2  E6  36  F6  D4  07  06  37  36  36  62   '.m.W&..6....766b'
0010  E7  36  17  47  57  26  E2  E6  36  F6  D3  A3  53  03  63  03   '.6.GW&..6...S.c.'
0020  B6  D6  16  46  47  23  D3  13  02  E3  83                       '...FG#.....'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3291, PDU no. 0 in the frame, vt_a 3257, vt_s 3292, vt_ms 1208, Mac request: numberOfPdus 14, macPduSize 340, macHeaderSize 4, data to be ciphered:

```
0000  0E  6D  82  E3  92  E3  23  03  03  B6  C7  23  E0  D0  A4  36   '.m....#....#...6'
0010  F6  E7  46  16  37  43  A2  03  C7  36  F6  03  A7  97  35  74   '..F.7C...6....5t'
0020  A3  34  B5  94  D5  76  C5  97  26  C5  91                       '.4...v..&..'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3292, PDU no. 1 in the frame, vt_a 3257, vt_s 3293, vt_ms 1208, Mac request: numberOfPdus 14, macPduSize 340, macHeaderSize 4, data to be ciphered:

```
0000  0E  6E  07  84  37  36  97  75  07  97  15  05  86  97  77  97   '.n..76.u......w.'
0010  14  E5  74  A3  34  B5  94  D7  32  E3  96  47  36  96  97  76   '..t.4..2..G6..v'
0020  97  75  87  77  77  97  15  06  95  8B                           '.u.www.....'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3293, PDU no. 2 in the frame, vt_a 3257, vt_s 3294, vt_ms 1208, Mac request: numberOfPdus 14, macPduSize 340, macHeaderSize 4, data to be ciphered:

```
0000  0E  6E  87  15  85  15  15  14  06  D7  26  32  E7  36  17  47   '.n........&2.6.G'
0010  57  26  E2  E6  36  F6  D3  E3  B2  B6  72  E7  06  F6  32  E7   'W&..6.....r..2.'
0020  46  16  C6  B6  27  57  27  37  43  B6  9D                       'F...'W'7C..'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3294, PDU no. 3 in the frame, vt_a 3257, vt_s 3295, vt_ms 1208, Mac request: numberOfPdus 14, macPduSize 340, macHeaderSize 4, data to be ciphered:

```
0000  0E  6F  07  36  66  F6  37  57  30  D0  A4  36  F6  E7  46  56   '.o.6f.7W0..6..FV'
0010  E7  42  D5  47  97  06  53  A2  10  17  07  06  C6  96  36  17   '.B.G..S........6.'
0020  46  96  F6  E2  F6  36  F6  E6  66  57  24                       'F....6..fW$'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3295, PDU no. 4 in the frame, vt_a 3257, vt_s 3296, vt_ms 1208, Mac request: numberOfPdus 14, macPduSize 340, macHeaderSize 4, data to be ciphered:

```
0000  0E  6F  86  56  E6  36  52  D6  96  E6  66  F2  B7  86  D6  C0   '.o.V.6R...f.....'
0010  D0  A4  57  66  56  E7  43  A2  06  36  F6  E6  66  57  26  56   '..WfV.C..6..fW&V'
0020  E6  36  50  D0  A5  37  56  27  36  27  2B                       '.6P..7V'67+'
```
[2007-10-09 19:59:53.795] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3296, PDU no. 5 in the frame, vt_a 3257, vt_s 3297, vt_ms 1208, Mac request: numberOfPdus 14, macPduSize 340, macHeaderSize 4, data to be ciphered:

```
0000  0E  70  06  97  07  46  96  F6  E2  D5  37  46  17  46  53  A2   '.p...F....7F.FS.'
0010  06  16  37  46  97  66  50  D0  A5  57  36  57  22  D4  16  76   '..7F.fP..W6W"..v'
0020  56  E7  43  A2  04  57  26  96  37  37  33                       'V.C..W&.773'
```
[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3297, PDU no. 6 in the frame, vt_a 3257, vt_s 3298, vt_ms 1208, Mac request: numberOfPdus 14, macPduSize 340, macHeaderSize 4, data to be ciphered:

```
0000  0E  70  86  F6  E2  D4  D5  24  64  32  F5  23  84  15  F3  15   '.p.....$d2.#....'
0010  F3  03  10  D0  A0  D0  A3  C3  F7  86  D6  C2  07  66  57  27   '.............fW"'
0020  36  96  F6  E3  D2  23  12  E3  02  22  04                       '6....#..."."
```
[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3298, PDU no. 7 in the frame, vt_a 3257, vt_s 3299, vt_ms 1208, Mac request: numberOfPdus 14, macPduSize 340, macHeaderSize 4, data to be ciphered:

```
0000  0E  71  06  56  E6  36  F6  46  96  E6  73  D2  25  55  44  62   '.q.V.6.F..s.%UDb'
0010  D3  82  23  F3  E0  A3  C6  36  F6  E6  66  57  26  56  E6  36   '..#....6..fW&V.6'
0020  52  D6  96  E6  66  F2  07  66  57  27  31                       'R...f..fW'1'
```
[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3299, PDU no. 8 in the frame, vt_a 3257, vt_s 3300, vt_ms 1208, Mac request: numberOfPdus 14, macPduSize 340, macHeaderSize 4, data to be ciphered:

```
0000  0E  71  86  96  F6  E3  D2  23  02  22  07  37  46  17  46  53   '.q....#."..7F.FS'
0010  D2  26  67  56  C6  C2  22  06  56  E7  46  97  47  93  D2  27   '.&gV."..V.F.G.."'
0020  36  97  03  A7  97  35  74  A3  34  B5  98                       '6....5t.4..'
```
[2007-10-09 19:59:53.796] 002000/sp2.lnh/DedicatedChModelPT(RLC_UP_DL_UE)

TABLE 1-continued

Sample layer 2 radio link control trace log dcsRlcTxHandler.cc:3018 BUS SEND:[ueRef 848, modId 0, rbId 16, rbType 7:14:7, instanceId 4]AcknowledgedMode, seqNo 3300, PDU no. 9 in the frame, vt_a 3257, vt_s 3301, vt_ms 1208, Mac request: numberOfPdus 14, macPduSize 340, macHeaderSize 4, data to be ciphered:

| 0000 | 0E | 72 | 04 | D5 | 76 | C5 | 97 | 26 | C5 | 97 | 84 | 37 | 36 | 97 | 75 | 07 | '.r.v..&...76.u.' |
|------|----|----|----|----|----|----|----|----|----|----|----|----|----|----|----|----|-------------------|
| 0010 | 97 | 15 | 05 | 86 | 97 | 77 | 97 | 14 | E5 | 74 | A3 | 34 | B5 | 94 | D7 | 32 | '.....w...t.4...2' |
| 0020 | E3 | 96 | 47 | 36 | 96 | 97 | 76 | 97 | 75 | 87 | 73 |    |    |    |    |    | '..G6..v.u.s' |

[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3301, PDU no. 10 in the frame, vt_a 3257, vt_s 3302, vt_ms 1208, Mac request: numberOfPdus 14, macPduSize 340, macHeaderSize 4, data to be ciphered:

| 0000 | 0E | 72 | 87 | 77 | 77 | 97 | 15 | 06 | 95 | 87 | 15 | 85 | 15 | 15 | 14 | 06 | '.r.ww...........' |
|------|----|----|----|----|----|----|----|----|----|----|----|----|----|----|----|----|--------------------|
| 0010 | D7 | 26 | 32 | E7 | 36 | 17 | 47 | 57 | 26 | E2 | E6 | 36 | F6 | D3 | B7 | 36 | '.&2.6.GW&..6..6' |
| 0020 | 57 | 37 | 36 | 96 | F6 | E3 | D3 | 12 | D3 | 12 | 20 |    |    |    |    |    | 'W76....... ' |

[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3302, PDU no. 11 in the frame, vt_a 3257, vt_s 3303, vt_ms 1208, Mac request: numberOfPdus 14, macPduSize 340, macHeaderSize 4, data to be ciphered:

| 0000 | 0E | 73 | 03 | E0 | A3 | C7 | 57 | 36 | 57 | 27 | 33 | E0 | A3 | C7 | 57 | 36 | '.s....W6W'3...W6' |
|------|----|----|----|----|----|----|----|----|----|----|----|----|----|----|----|----|---------------------|
| 0010 | 57 | 22 | 06 | 56 | E7 | 46 | 97 | 47 | 93 | D2 | 27 | 46 | 56 | C3 | A2 | B3 | 'W".V.F.G..'FV...' |
| 0020 | 13 | 93 | 73 | 23 | 63 | 73 | 53 | 13 | 93 | 23 | 62 |    |    |    |    |    | '..s#csS..#b' |

[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3303, PDU no. 12 in the frame, vt_a 3257, vt_s 3304, vt_ms 1208, Mac request: numberOfPdus 14, macPduSize 340, macHeaderSize 4, data to be ciphered:

| 0000 | 0E | 73 | 82 | 23 | E0 | A3 | C6 | 46 | 97 | 37 | 06 | C6 | 17 | 92 | D7 | 46 | '.s.#...F.7.....F' |
|------|----|----|----|----|----|----|----|----|----|----|----|----|----|----|----|----|---------------------|
| 0010 | 57 | 87 | 43 | E3 | 13 | 93 | 23 | 63 | C2 | F6 | 46 | 97 | 37 | 06 | C6 | 17 | 'W.C...#c..F.7...' |
| 0020 | 92 | D7 | 46 | 57 | 87 | 43 | E0 | A3 | C6 | 56 | E8 |    |    |    |    |    | '..FW.C...V.' |

[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3304, PDU no. 13 in the frame, vt_a 3257, vt_s 3305, vt_ms 1208, Mac request: numberOfPdus 14, macPduSize 340, macHeaderSize 4, data to be ciphered:

| 0000 | 0E | 74 | 06 | 47 | 06 | F6 | 96 | E7 | 42 | 06 | 56 | E7 | 46 | 97 | 47 | 93 | '.t.G....B.V.F.G.' |
|------|----|----|----|----|----|----|----|----|----|----|----|----|----|----|----|----|---------------------|
| 0010 | D2 | 27 | 36 | 97 | 03 | A3 | 13 | 93 | 23 | 64 | 03 | 13 | 73 | 22 | E3 | 13 | '.'6.....#d..s"..' |
| 0020 | 72 | E3 | 13 | 03 | 02 | E3 | 13 | 83 | A3 | 13 | 43 |    |    |    |    |    | 'r.........C' |

[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3305, PDU no. 0 in the frame, vt_a 3257, vt_s 3306, vt_ms 1208, Mac request: numberOfPdus 3, macPduSize 340, macHeaderSize 4, data to be ciphered:

| 0000 | 0E | 74 | 83 | 33 | 92 | 23 | E0 | A3 | C7 | 37 | 46 | 17 | 47 | 57 | 33 | E6 | '.t.3.#....7F.GW3.' |
|------|----|----|----|----|----|----|----|----|----|----|----|----|----|----|----|----|----------------------|
| 0010 | 36 | F6 | E6 | 56 | 37 | 46 | 56 | 43 | C2 | F7 | 37 | 46 | 17 | 47 | 57 |    | '6...V7FVC..7F.GW' |
| 0020 | 33 | E0 | A3 | C2 | F6 | 56 | E6 | 47 | 06 | F6 | 9F |    |    |    |    |    | '3....V.G...' |

[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3306, PDU no. 1 in the frame, vt_a 3257, vt_s 3307, vt_ms 1208, Mac request: numberOfPdus 3, macPduSize 340, macHeaderSize 4, data to be ciphered:

| 0000 | 0E | 75 | 06 | E7 | 43 | E0 | A3 | C2 | F7 | 57 | 36 | 57 | 23 | E0 | A3 | C2 | '.u..C....W6W#...' |
|------|----|----|----|----|----|----|----|----|----|----|----|----|----|----|----|----|---------------------|
| 0010 | F7 | 57 | 36 | 57 | 27 | 33 | E0 | A3 | C2 | F6 | 36 | F6 | E6 | 66 | 57 | 26 | '.W6W'3....6..fW&' |
| 0020 | 56 | E6 | 36 | 52 | D6 | 96 | E6 | 66 | F3 | E0 | A2 |    |    |    |    |    | 'V.6R...f...' |

[2007-10-09 19:59:53.796] 002000/sp2.lnh/DedicatedChModelPT(RLC_UP_DL_UE)
dcsRlcTxHandler.cc:3018 BUS SEND:[ueRef 848, modId 0, rbId 16, rbType 7:14:7, instanceId 4]AcknowledgedMode, seqNo 3307, PDU no. 2 in the frame, vt_a 3257, vt_s 3308, vt_ms 1208, Mac request: numberOfPdus 3, macPduSize 340, macHeaderSize 4, data to be ciphered:

| 0000 | 0E | 75 | D0 | 1F | E9 | 12 | 15 | D5 | 06 | 21 | FA | 45 | 42 | 9D | EA | 55 | '.u.......!.EB..U' |
|------|----|----|----|----|----|----|----|----|----|----|----|----|----|----|----|----|---------------------|
| 0010 | 93 | E9 | 57 | A4 | 1C | B5 | 66 | A2 | E2 | A8 | 85 | D1 | 04 | 24 | 6F | 7D | '..W...f......So)' |
| 0020 | 01 | A0 | 01 | 8D | 0C | 92 | E4 | 65 | 93 | AD | F6 |    |    |    |    |    | '.......e...' |

[2007-10-09 19:59:53.797] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1604, vr_r 1604, vr_h 1624, vr_mr 2116, block 0, macPduSize 336, macHeaderSize 0, deciphered data:

| 0000 | B2 | 20 | 32 | 37 | 35 | 65 | 62 | 39 | 39 | 36 | 37 | 35 | 62 | 30 | 66 | 61 | '. 275eb99675b0fa' |
|------|----|----|----|----|----|----|----|----|----|----|----|----|----|----|----|----|---------------------|
| 0010 | 30 | 35 | 65 | 32 | 38 | 6A | 61 | 61 | 61 | 61 | 61 | 61 | 69 | 61 | 51 | 61 | '05e28jaaaaaaiaaa' |
| 0020 | 61 | 61 | 61 | 63 | 30 | 31 | 67 | 70 | 67 | 61 | B2 |    |    |    |    |    | 'aaac01gpga.' |

[2007-10-09 19:59:53.797] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1605, vr_r 1605, vr_h 1624, vr_mr 2117, block 1, macPduSize 336, macHeaderSize 0, deciphered data:

| 0000 | B2 | 28 | 33 | 5A | 71 | 6B | 76 | 37 | 66 | 6D | 6D | 63 | 30 | 70 | 79 | 72 | '.(3zqkv7fmmc0pyr' |
|------|----|----|----|----|----|----|----|----|----|----|----|----|----|----|----|----|----------------------|
| 0010 | 71 | 6E | 67 | 74 | 63 | 61 | 0D | 0A | 74 | 3A | 20 | 22 | 31 | 39 | 34 | 36 | 'qngtca..t: "1946' |
| 0020 | 22 | 20 | 3C | 73 | 69 | 70 | 3A | 31 | 39 | 37 | B2 |    |    |    |    |    | '" <sip:197.' |

[2007-10-09 19:59:53.797] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1606, vr_r 1606, vr_h 1624, vr_mr 2118, block 2, macPduSize 336, macHeaderSize 0, deciphered data:

| 0000 | B2 | 30 | 32 | 36 | 37 | 35 | 31 | 39 | 34 | 36 | 40 | 73 | 61 | 74 | 75 | 72 | '.026751946@satur' |
|------|----|----|----|----|----|----|----|----|----|----|----|----|----|----|----|----|---------------------|
| 0010 | 6E | 2E | 63 | 6F | 6D | 3E | 3B | 74 | 61 | 67 | 3D | 35 | 38 | 38 | 36 | 38 | 'n.com>;tag=58868' |
| 0020 | 0D | 0A | 66 | 3A | 20 | 22 | 31 | 39 | 32 | 36 | B2 |    |    |    |    |    | '..f: "1926.' |

[2007-10-09 19:59:53.797] 002000/sp2.lnh/DedicatedChModelPT(RLC_UP_UL_UE)

TABLE 1-continued

Sample layer 2 radio link control trace log dcsRlcRxHandler.cc:1423 BUS RECEIVE:[ueRef 848, modId 0, rbId 16, rbType 7:14:7, instanceId 4]AcknowledgedMode, Data pdu, seqNo 1607, vr_r 1607, vr_h 1624, vr_mr 2119, block 3, macPduSize 336, macHeaderSize 0, deciphered data:

```
0000  B2  38  22  20  3C  73  69  70  3A  31  39  37  32  36  37  35   '.8" <sip:1972675'
0010  31  39  32  36  40  73  61  74  75  72  6E  2E  63  6F  6D  3E   '1926@saturn.com>'
0020  3B  74  61  67  3D  70  66  74  2B  65  4F                       ';tag=pft+eO'
```
[2007-10-09 19:59:53.817] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1608, vr_r 1608, vr_h 1624, vr_mr 2120, block 0, macPduSize 336, macHeaderSize 0, deciphered data:

```
0000  B2  40  39  66  37  30  39  30  35  64  34  62  63  32  37  34   '.@9f70905d4bc274'
0010  31  65  37  39  32  34  63  63  37  36  35  64  61  35  66  31   '1e7924cc765da5f1'
0020  32  0D  0A  43  53  65  71  3A  20  38  B2                       '2..CSeq: 8.'
```
[2007-10-09 19:59:53.817] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1609, vr_r 1609, vr_h 1624, vr_mr 2121, block 1, macPduSize 336, macHeaderSize 0, deciphered data:

```
0000  B2  48  39  31  37  30  35  34  20  49  4E  56  49  54  45  0D   '.H917054 INVITE.'
0010  0A  69  3A  20  35  37  31  65  34  64  61  36  32  62  30  61   '.i: 571e4da62b0a'
0020  30  31  39  32  39  36  30  34  62  65  B2                       '01929604be.'
```
[2007-10-09 19:59:53.817] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1610, vr_r 1610, vr_h 1624, vr_mr 2122, block 2, macPduSize 336, macHeaderSize 0, deciphered data:

```
0000  B2  50  30  34  62  65  39  31  33  64  38  63  0D  0A  6D  3A   '.P04be913d8c..m:'
0010  20  22  31  39  34  36  22  20  3C  73  69  70  3A  31  39  34   ' "1946" <sip:194'
0020  36  40  31  37  32  2E  31  37  2E  31  B2                       '6@172.17.1.'
```
[2007-10-09 19:59:53.817] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1611, vr_r 1611, vr_h 1624, vr_mr 2123, block 3, macPduSize 336, macHeaderSize 0, deciphered data:

```
0000  B2  5C  30  30  2E  31  39  3A  31  34  36  34  3E  3B  2B  67   '.\00.19:1464>;+g'
0010  2E  70  6F  63  2E  74  61  6C  6B  62  75  72  73  74  3B  2B   '.poc.talkburst;+'
0020  67  2E  70  6F  63  2E  67  72  6F  75  3C                       'g.poc.grou<'
```
[2007-10-09 19:59:53.837] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1624, vr_r 1624, vr_h 1624, vr_mr 2136, block 0, macPduSize 336, macHeaderSize 0, deciphered data:

```
0000  B2  C0  61  75  64  69  6F  20  35  39  30  31  30  20  52  54   '..audio 59010 RT'
0010  50  2F  41  56  50  20  31  30  39  0D  0A  61  3D  72  74  70   'P/AVP 109..a=rtp'
0020  6D  61  70  3A  31  30  39  20  41  4D  B2                       'map:109 AM.'
```
[2007-10-09 19:59:53.837] 002000/sp2.lnh/DedicatedChModelPT(RLC_UP_UL_UE)
dcsRlcRxHandler.cc:1423 BUS RECEIVE:[ueRef 848, nodId 0, rbId 16, rbType 7:14:7, instanceId 4]AcknowledgedMode, Data pdu, seqNo 1625, vr_r 1625, vr_h 1625, vr_mr 2137, block 1, macPduSize 336, macHeaderSize 0, deciphered data:

```
0000  B2  C8  52  2F  38  30  30  30  2F  31  0D  0A  61  3D  70  74   '..R/8000/1..a=pt'
0010  69  6D  65  3A  32  30  30  0D  0A  61  3D  6D  61  78  70  74   'ime:200..a=maxpt'
0020  69  6D  65  3A  34  30  30  0D  0A  61  B2                       'ime:400..a.'
```
[2007-10-09 19:59:53.837] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1626, vr_r 1626, vr_h 1626, vr_mr 2138, block 2, macPduSize 336, macHeaderSize 0, deciphered data:

```
0000  B2  D0  3D  66  6D  74  70  3A  31  30  39  20  6D  6F  64  65   '..=fmtp:109 mode'
0010  2D  73  65  74  3D  31  3B  6F  63  74  65  74  2D  61  6C  69   '-set=1;octet-ali'
0020  67  6E  3D  31  0D  0A  61  3D  2B  67  B2                       'gn=1..a=+g.'
```
[2007-10-09 19:59:53.837] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1627, vr_r 1627, vr_h 1627, vr_mr 2139, block 3, macPduSize 336, macHeaderSize 0, deciphered data:

```
0000  B2  D8  2E  70  6F  63  2E  74  61  6C  6B  62  75  72  73  74   '...poc.talkburst'
0010  0D  0A  6D  3D  61  70  70  6C  69  63  61  74  69  6F  6E  20   '..m=application'
0020  35  39  30  31  31  20  75  64  70  20  32                       '59011 udp 2'
```
[2007-10-09 19:59:53.857] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1628, vr_r 1628, vr_h 1628, vr_mr 2140, block 1, macPduSize 336, macHeaderSize 0, deciphered data:

```
0000  B2  E0  54  42  43  50  0D  0A  61  3D  66  6D  74  70  3A  54   '..TBCP..a=fmtp:T'
0010  42  43  50  20  71  75  65  75  69  6E  67  3D  30  3B  74  69   'BCP queuing=0;ti'
0020  6D  65  73  74  61  6D  70  3D  30  3B  B2                       'mestamp=0;.'
```
[2007-10-09 19:59:53.857] 002000/sp2.lnh/DedicatedChModelPT(RLC_UP_UL_UE)
dcsRlcRxHandler.cc:1423 BUS RECEIVE:[ueRef 848, modId 0, rbId 16, rbType 7:14:7, instanceId 4]AcknowledgedMode, Data pdu, seqNo 1629, vr_r 1629, vr_h 1629, vr_mr 2141, block 2, macPduSize 336, macHeaderSize 0, deciphered data:

```
0000  B2  E8  74  62  5F  67  72  61  6E  74  65  64  3D  30  3B  70   '..tb_granted=0;p'
0010  6F  63  5F  73  65  73  73  5F  70  72  69  6F  72  69  74  79   'oc_sess_priority'
0020  3D  31  3B  70  6F  63  5F  6C  6F  63  3C                       '=1;poc_loc<'
```
[2007-10-09 19:59:53.876] 002000/sp2.lnh/DedicatedChModelPT(RLC_UP_UL_UE)

TABLE 1-continued

Sample layer 2 radio link control trace log

```
dcsRlcRxHandler.cc:1423 BUS RECEIVE:[ueRef 848, modId 0, rbId 16, rbType 7:14:7, instanceId
4]AcknowledgedMode, Data pdu, seqNo 1630, vr__r 1630, vr__h 1630, vr__mr 2142, block 0, macPduSize
336, macHeaderSize 0, deciphered data:
0000  B2  F1  0A  6B  3D  30  0D  0A  45  00  02  63  91  65  00  00   '...k=0..E..c.e..'
0010  45  11  BE  30  AC  11  64  13  0A  08  09  C8  05  B8  13  C4   'E..0..d..........'
0020  02  4F  37  1D  53  49  50  2F  32  2E  3C                       '.O7.SIP/2.<'
```

The layer-3 result of processing the layer-2 data given in Table 1 is reassembled packet data, written in PCAP format. Table 2 lists the output obtained from the performance monitor being used to analyze the reassembled Layer 3 packet contents contained in this PCAP file. The entire contents of the PCAP file is given in tabular text format in Table 2.

TABLE 2

Tabular text version of the PCAP file resulting from processing the layer 2 data given in Table 1

| No. | Time | Source | SrcPort | Destination | DstPort | Protocol | Info | Size |
|---|---|---|---|---|---|---|---|---|
| 1 | 14:59:52.213000 | 0.0.0.0 | | 0.0.0.0 | | ICMP | Timestamp request | 54 |
| 2 | 14:59:52.213000 | 172.17.100.18 | 37354 | 10.8.9.200 | 5060 | TCP | 37354 > 5060 [SYN] Seq = 0 Len = 0 MSS = 1360 TSV = 3747762846 TSER = 0 WS = 0 | 78 |
| 3 | 14:59:52.222000 | 0.0.0.0 | | 0.0.0.0 | | ICMP | Timestamp request | 54 |
| 4 | 14:59:52.222000 | 10.8.9.200 | 5060 | 172.17.100.18 | 37354 | TCP | 5060 > 37354 [SYN, ACK] Seq = 0 Ack = 1 Win = 19456 Len = 0 MSS = 9960 | 58 |
| 5 | 14:59:52.313000 | 0.0.0.0 | | 0.0.0.0 | | ICMP | Timestamp request | 54 |
| 6 | 14:59:52.313000 | 172.17.100.18 | 37354 | 10.8.9.200 | 5060 | TCP | 37354 > 5060 [ACK] Seq = 1 Ack = 1 Win = 48960 Len = 0 | 54 |
| 7 | 14:59:52.333000 | 0.0.0.0 | | 0.0.0.0 | | ICMP | Timestamp request | 54 |
| 8 | 14:59:52.493000 | 172.17.100.18 | 37354 | 10.8.9.200 | 5060 | SIP/SDP | Request: INVITE sip:ad-hoc@saturn.com, with session description | 1414 |
| 9 | 14:59:52.493000 | 0.0.0.0 | | 0.0.0.0 | | ICMP | Timestamp request | 54 |
| 10 | 14:59:52.513000 | 172.17.100.18 | 37354 | 10.8.9.200 | 5060 | TCP | 37354 > 5060 [PSH, ACK] Seq = 1361 Ack = 1 Win = 48960 Len = 140 | 194 |
| 11 | 14:59:52.514000 | 0.0.0.0 | | 0.0.0.0 | | ICMP | Timestamp request | 54 |
| 12 | 14:59:52.514000 | 10.8.9.200 | 5060 | 172.17.100.18 | 37354 | TCP | 5060 > 37354 [ACK] Seq = 1 Ack = 1361 Win = 19456 Len = 0 | 54 |
| 13 | 14:59:52.551000 | 0.0.0.0 | | 0.0.0.0 | | ICMP | Timestamp request | 54 |
| 14 | 14:59:52.551000 | 10.8.9.200 | 5060 | 172.17.100.18 | 37354 | SIP | Status: 100 Trying | 287 |
| 15 | 14:59:52.833000 | 0.0.0.0 | | 0.0.0.0 | | ICMP | Timestamp request | 54 |
| 16 | 14:59:52.833000 | 172.17.100.18 | 37354 | 10.8.9.200 | 5060 | TCP | 37354 > 5060 [ACK] Seq = 1501 Ack = 234 Win = 48727 Len = 0 | 54 |
| 17 | 14:59:53.040000 | 0.0.0.0 | | 0.0.0.0 | | ICMP | Timestamp request | 54 |
| 18 | 14:59:53.040000 | 10.8.9.200 | 49101 | 172.17.100.19 | 1464 | TCP | 49101 > 1464 [SYN] Seq = 0 Len = 0 MSS = 9960 | 58 |
| 19 | 14:59:53.116000 | 0.0.0.0 | | 0.0.0.0 | | ICMP | Timestamp request | 54 |
| 20 | 14:59:53.117000 | 172.17.100.19 | 1464 | 10.8.9.200 | 49101 | TCP | 1464 > 49101 [SYN, ACK] Seq = 0 Ack = 1 Win = 48960 Len = 0 MSS = 1360 | 58 |
| 21 | 14:59:53.123000 | 0.0.0.0 | | 0.0.0.0 | | ICMP | Timestamp request | 54 |
| 22 | 14:59:53.123000 | 10.8.9.200 | 49101 | 172.17.100.19 | 1464 | TCP | 49101 > 1464 [ACK] Seq = 1 Ack = 1 Win = 19920 Len = 0 | 54 |
| 23 | 14:59:53.126000 | 0.0.0.0 | | 0.0.0.0 | | ICMP | Timestamp request | 54 |
| 24 | 14:59:53.135000 | 10.8.9.200 | 49101 | 172.17.100.19 | 1464 | TCP | [TCP segment of a reassembled PDU] | 1354 |
| 25 | 14:59:53.416000 | 0.0.0.0 | | 0.0.0.0 | | ICMP | Timestamp request | 54 |
| 26 | 14:59:53.416000 | 172.17.100.19 | 1464 | 10.8.9.200 | 49101 | TCP | 1464 > 49101 [ACK] Seq = 1 Ack = 1301 Win = 48960 Len = 0 | 54 |
| 27 | 14:59:53.424000 | 0.0.0.0 | | 0.0.0.0 | | ICMP | Timestamp request | 54 |
| 28 | 14:59:53.424000 | 10.8.9.200 | 49101 | 172.17.100.19 | 1464 | SIP/SDP | Request: INVITE sip:1946@172.17.100.19:1464, with session description | 235 |
| 29 | 14:59:53.517000 | 0.0.0.0 | | 0.0.0.0 | | ICMP | Timestamp request | 54 |
| 30 | 14:59:53.557000 | 172.17.100.19 | 1464 | 10.8.9.200 | 49101 | SIP | Status: 100 Trying | 490 |
| 31 | 14:59:53.568000 | 0.0.0.0 | | 0.0.0.0 | | ICMP | Timestamp request | 54 |
| 32 | 14:59:53.568000 | 10.8.9.200 | 49101 | 172.17.100.19 | 1464 | TCP | 49101 > 1464 [ACK] Seq = 1482 Ack = 437 Win = 19920 Len = 0 | 54 |
| 33 | 14:59:53.577000 | 0.0.0.0 | | 0.0.0.0 | | ICMP | Timestamp request | 54 |
| 34 | 14:59:53.677000 | 172.17.100.19 | 1464 | 10.8.9.200 | 5060 | SIP | Request: SUBSCRIBE sip:ysWJ3KYMWlYrlYxCsiwPyqPXiwyqNW-J3KYMs.9dsiiwiwXwwwyqPiXqXQQQ@mrc.-saturn.com;session=1-1 | 822 |
| 35 | 14:59:53.677000 | 0.0.0.0 | | 0.0.0.0 | | ICMP | Timestamp request | 54 |
| 36 | 14:59:53.774000 | 0.0.0.0 | | 0.0.0.0 | | ICMP | Timestamp request | 54 |
| 37 | 14:59:53.782000 | 10.8.9.200 | 5060 | 172.17.100.19 | 1464 | SIP | Status: 200 OK | 787 |
| 38 | 14:59:53.794000 | 0.0.0.0 | | 0.0.0.0 | | ICMP | Timestamp request | 54 |
| 39 | 14:59:53.796000 | 10.8.9.200 | 6050 | 172.17.100.19 | 1464 | SIP | Request: NOTIFY sip:1946@172.17.100.19:1464 | 1214 |
| 40 | 14:59:53.876000 | 172.17.100.19 | 1464 | 10.8.9.200 | 49101 | SIP/SDP | Status: 200 OK, with session description | 1173 |

TABLE 2-continued

Tabular text version of the PCAP file resulting from
processing the layer 2 data given in Table 1

| No. | |
|---|---|
| 1 | Frame 1 (54 bytes on wire, 54 bytes captured)<br>Ethernet II, Src: 03:4f:00:00:00:00 (03:4f:00:00:00:00), Dst: LexmarkI__00:00:00 (00:04:00:00:00:00)<br>Internet Protocol, Src: 0.0.0.0 (0.0.0.0), Dst: 0.0.0.0 (0.0.0.0)<br>Internet Control Message Protocol |
| 2 | Frame 2 (78 bytes on wire, 78 bytes captured)<br>Ethernet II, Src: 03:4f:00:00:00:00 (03:4f:00:00:00:00), Dst: LexmarkI__00:00:00 (00:04:00:00:00:00)<br>Internet Protocol, Src: 172.17.100.18 (172.17.100.18), Dst: 10.8.9.200 (10.8.9.200)<br>Transmission Control Protocol, Src Port: 37354 (37354), Dst Port: 5060 (5060), Seq: 0, Len: 0 |
| 3 | Frame 3 (54 bytes on wire, 54 bytes captured)<br>Ethernet II, Src: OsakiEle__00:00:00 (00:04:01:00:00:00), Dst: 03:4f:01:00:00:00 (03:4f:01:00:00:00)<br>Internet Protocol, Src: 0.0.0.0 (0.0.0.0), Dst: 0.0.0.0 (0.0.0.0)<br>Internet Control Message Protocol |
| 4 | Frame 4 (58 bytes on wire, 58 bytes captured)<br>Ethernet II, Src: OsakiEle__00:00:00 (00:04:01:00:00:00), Dst: 03:4f:01:00:00:00 (03:4f:01:00:00:00)<br>Internet Protocol, Src: 10.8.9.200 (10.8.9.200), Dst: 172.17.100.18 (172.17.100.18)<br>Transmission Control Protocol, Src Port: 5060 (5060), Dst Port: 37354 (37354), Seq: 0, Ack: 1, Len: 0 |
| 5 | Frame 5 (54 bytes on wire, 54 bytes captured)<br>Ethernet II, Src: 03:4f:00:00:00:00 (03:4f:00:00:00:00), Dst: LexmarkI__00:00:00 (00:04:00:00:00:00)<br>Internet Protocol, Src: 0.0.0.0 (0.0.0.0), Dst: 0.0.0.0 (0.0.0.0)<br>Internet Control Message Protocol |
| 6 | Frame 6 (54 bytes on wire, 54 bytes captured)<br>Ethernet II, Src: 03:4f:00:00:00:00 (03:4f:00:00:00:00), Dst: LexmarkI__00:00:00 (00:04:00:00:00:00)<br>Internet Protocol, Src: 172.17.100.18 (172.17.100.18), Dst: 10.8.9.200 (10.8.9.200)<br>Transmission Control Protocol, Src Port: 37354 (37354), Dst Port: 5060 (5060), Seq: 1, Ack: 1, Len: 0 |
| 7 | Frame 7 (54 bytes on wire, 54 bytes captured)<br>Ethernet II, Src: 03:4f:00:00:00:00 (03:4f:00:00:00:00), Dst: LexmarkI__00:00:00 (00:04:00:00:00:00)<br>Internet Protocol, Src: 0.0.0.0 (0.0.0.0), Dst: 0.0.0.0 (0.0.0.0)<br>Internet Control Message Protocol |
| 8 | Frame 8 (1414 bytes on wire, 1414 bytes captured)<br>Ethernet II, Src: 03:4f:00:00:00:00 (03:4f:00:00:00:00), Dst: LexmarkI__00:00:00 (00:04:00:00:00:00)<br>Internet Protocol, Src: 172.17.100.18 (172.17.100.18), Dst: 10.8.9.200 (10.8.9.200)<br>Transmission Control Protocol, Src Port: 37354 (37354), Dst Port: 5060 (5060), Seq: 1, Ack: 1, Len: 1360<br>Session Initiation Protocol<br>Session Initiation Protocol (SIP as raw text)<br>INVITE sip:ad-hoc@saturn.com SIP/2.0\r\n<br>v: SIP/2.0/TCP 172.17.100.18:37354;branch=z9hG4bKf21d920f;rport\r\n<br>t: <sip:ad-hoc@saturn.com>\r\n<br>f: "1926" <sip:19726751926@saturn.com>;tag=18130\r\n<br>CSeq: 12819 INVITE\r\n<br>i: 766b5d4ee844\r\n<br>Max-Forwards: 70\r\n<br>m: "1926" <sip:1926@172.17.100.18:1439>; +g.poc.talkburst;+g.poc.groupad\r\n<br>Supported: timer, answermode\r\n<br>User-Agent: PoC-client/OMA1.0 ObigoPoC/v1.0.0\r\n<br>Accept-Contact: *;+g.poc.talkburst;require:explicit\r\n<br>Session-Expires: 3600;refresher=uac\r\n<br>Allow: INVITE, ACK, BYE, CANCEL, UPDATE, NOTIFY, MESSAGE, OPTIONS\r\n<br>P-Preferred-Identity: <sip:19726751926@saturn.com>\r\n<br>Route: <sip:10.8.9.200:5060;lr>\r\n<br>c: multipart/mixed;boundary="ce0c58ae7fb2d717"\r\n<br>Content-Length: 801\r\n<br>\r\n<br>--ce0c58ae7fb2d717\r\n<br>Content-Type: application/sdp\r\n<br>Content-Length: 346\r\n<br>\r\n<br>v=0\r\n<br>o=username 1191941996 1191941996 IN IP4 172.17.100.18\r\n<br>s=session\r\n<br>c=IN IP4 172.17.100.18\r\n<br>t=0 0\r\n<br>m=audio 59010 RTP/AVP 96\r\n<br>a=rtpmap:96 AMR/8000/1\r\n<br>a=ptime:200\r\n |

TABLE 2-continued

Tabular text version of the PCAP file resulting from
processing the layer 2 data given in Table 1

|   |   |
|---|---|
|   | a=maxptime:400\r\n |
|   | a=fmtp:96 mode-set=1;octet-align=1\r\n |
|   | a=+g.poc.talkburst\r\n |
|   | m=application 59011 udp TBCP\r\n |
|   | a=fmtp:TBCP queuing=0;timestamp=0;tb_granted=0;poc_sess_priority=1;poc_lock=0\r\n |
|   | \r\n |
|   | --ce0c58ae7fb2d717\r\n |
|   | Content-Type: application/resource-lists+xml\r\n |
|   | Content-Disposition: recipient-list\r\n |
|   | Content-Length: 229\r\n |
|   | \r\n |
|   | <?xml version="1.0" encoding="UTF-8"?>\r\n |
|   | <resource-lists xmlns="urn:ietf:params:xml:ns:resource-lists" xmlns:xsi=" |
| 9 | Frame 9 (54 bytes on wire, 54 bytes captured) |
|   | Ethernet II, Src: 03:4f:00:00:00:00 (03:4f:00:00:00:00), Dst: LexmarkI_00:00:00 (00:04:00:00:00:00) |
|   | Internet Protocol, Src: 0.0.0.0 (0.0.0.0), Dst: 0.0.0.0 (0.0.0.0) |
|   | Internet Control Message Protocol |
| 10 | Frame 10 (194 bytes on wire, 194 bytes captured) |
|   | Ethernet II, Src: 03:4f:00:00:00:00 (03:4f:00:00:00:00), Dst: LexmarkI_00:00:00 (00:04:00:00:00:00) |
|   | Internet Protocol, Src: 172.17.100.18 (172.17.100.18), Dst: 10.8.9.200 (10.8.9.200) |
|   | Transmission Control Protocol, Src Port: 37354 (37354), Dst Port: 5060 (5060), Seq: 1361, Ack: 1, Len: 140 |
|   | Data (140 bytes) |
|   | 0000  68 74 74 70 3a 2f 2f 77 77 77 2e 77 33 63 2e 6f   http://www.w3c.o |
|   | 0010  72 67 2f 32 30 30 31 2f 58 4d 4c 53 63 68 55 6d   rg/2001/XMLSchem |
|   | 0020  61 2d 69 6e 73 74 61 6e 63 65 22 3e 0d 0a 3c 6c   a-instance">..<l |
|   | 0030  69 73 74 3e 0d 0a 3c 65 6e 74 72 79 20 75 72 69   ist>..<entry uri |
|   | 0040  3d 22 74 65 6c 3a 2b 31 39 37 32 36 37 35 31 39   ="tel:+197267519 |
|   | 0050  34 36 22 20 2f 3e 0d 0a 3c 2f 6c 69 73 74 3e 0d   46" />..</list>. |
|   | 0060  0a 3c 2f 72 65 73 6f 75 72 63 65 2d 6c 69 73 74   .</resource-list |
|   | 0070  73 3e 0d 0a 0d 0a 2d 2d 63 65 30 63 35 38 61 65   s>....--ce0c58ae |
|   | 0080  37 66 62 32 64 37 31 37 2d 2d 0d 0a               7fb2d717--.. |
| 11 | Frame 11 (54 bytes on wire, 54 bytes captured) |
|   | Ethernet II, Src: OsakiEle_00:00:00 (00:04:01:00:00:00), Dst: 03:4f:01:00:00:00 (03:4f:01:00:00:00) |
|   | Internet Protocol, Src: 0.0.0.0 (0.0.0.0), Dst: 0.0.0.0 (0.0.0.0) |
|   | Internet Control Message Protocol |
| 12 | Frame 12 (54 bytes on wire, 54 bytes captured) |
|   | Ethernet II, Src: OsakiEle_00:00:00 (00:04:01:00:00:00), Dst: 03:4f:01:00:00:00 (03:4f:01:00:00:00) |
|   | Internet Protocol, Src: 10.8.9.200 (10.8.9.200), Dst: 172.17.100.18 (172.17.100.18) |
|   | Transmission Control Protocol, Src Port: 5060 (5060), Dst Port: 37354 (37354), Seq: 1, Ack: 1361, Len: 0 |
| 13 | Frame 13 (54 bytes on wire, 54 bytes captured) |
|   | Ethernet II, Src: OsakiEle_00:00:00 (00:04:01:00:00:00), Dst: 03:4f:01:00:00:00 (03:4f:01:00:00:00) |
|   | Internet Protocol, Src: 0.0.0.0 (0.0.0.0), Dst: 0.0.0.0 (0.0.0.0) |
|   | Internet Control Message Protocol |
| 14 | Frame 14 (287 bytes on wire, 287 bytes captured) |
|   | Ethernet II, Src: OsakiEle_00:00:00 (00:04:01:00:00:00), Dst: 03:4f:01:00:00:00 (03:4f:01:00:00:00) |
|   | Internet Protocol, Src: 10.8.9.200 (10.8.9.200), Dst: 172.17.100.18 (172.17.100.18) |
|   | Transmission Control Protocol, Src Port: 5060 (5060), Dst Port: 37354 (37354), Seq: 1, Ack: 1501, Len: 233 |
|   | Session Initiation Protocol |
|   | Session Initiation Protocol (SIP as raw text) |
|   | SIP/2.0 100 Trying\r\n |
|   | To: <sip:ad-hoc@saturn.com>\r\n |
|   | From: "1926" <sip:19726751926@saturn.com>;tag=18130\r\n |
|   | Call-ID: 766b5d4ee844\r\n |
|   | CSeq: 12819 INVITE\r\n |
|   | Content-Length: 0\r\n |
|   | Via: SIP/2.0/TCP 172.17.100.18:37354;branch=z9hG4bKf21d920f;rport\r\n |
|   | \r\n |
| 15 | Frame 15 (54 bytes on wire, 54 bytes captured) |
|   | Ethernet II, Src: 03:4f:00:00:00:00 (03:4f:00:00:00:00), Dst: LexmarkI_00:00:00 (00:04:00:00:00:00) |
|   | Internet Protocol, Src: 0.0.0.0 (0.0.0.0), Dst: 0.0.0.0 (0.0.0.0) |
|   | Internet Control Message Protocol |
| 16 | Frame 16 (54 bytes on wire, 54 bytes captured) |
|   | Ethernet II, Src: 03:4f:00:00:00:00 (03:4f:00:00:00:00), Dst: LexmarkI_00:00:00 (00:04:00:00:00:00) |
|   | Internet Protocol, Src: 172.17.100.18 (172.17.100.18), Dst: 10.8.9.200 (10.8.9.200) |
|   | Transmission Control Protocol, Src Port: 37354 (37354), Dst Port: 5060 (5060), Seq: 1501, Ack: 234, Len: 0 |

TABLE 2-continued

Tabular text version of the PCAP file resulting from
processing the layer 2 data given in Table 1

| | |
|---|---|
| 17 | Frame 17 (54 bytes on wire, 54 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 0.0.0.0 (0.0.0.0), Dst: 0.0.0.0 (0.0.0.0)<br>Internet Control Message Protocol |
| 18 | Frame 18 (58 bytes on wire, 58 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 10.8.9.200 (10.8.9.200), Dst: 172.17.100.19 (172.17.100.19)<br>Transmission Control Protocol, Src Port: 49101 (49101), Dst Port: 1464 (1464), Seq: 0, Len: 0 |
| 19 | Frame 19 (54 bytes on wire, 54 bytes captured)<br>Ethernet II, Src: 03:50:00:00:00:00 (03:50:00:00:00:00), Dst: LexmarkI_00:00:00 (00:04:00:00:00:00)<br>Internet Protocol, Src: 0.0.0.0 (0.0.0.0), Dst: 0.0.0.0 (0.0.0.0)<br>Internet Control Message Protocol |
| 20 | Frame 20 (58 bytes on wire, 58 bytes captured)<br>Ethernet II, Src: 03:50:00:00:00:00 (03:50:00:00:00:00), Dst: LexmarkI_00:00:00 (00:04:00:00:00:00)<br>Internet Protocol, Src: 172.17.100.19 (172.17.100.19), Dst: 10.8.9.200 (10.8.9.200)<br>Transmission Control Protocol, Src Port: 1464 (1464), Dst Port: 49101 (49101), Seq: 0, Ack: 1, Len: 0 |
| 21 | Frame 21 (54 bytes on wire, 54 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 0.0.0.0 (0.0.0.0), Dst: 0.0.0.0 (0.0.0.0)<br>Internet Control Message Protocol |
| 22 | Frame 22 (54 bytes on wire, 54 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 10.8.9.200 (10.8.9.200), Dst: 172.17.100.19 (172.17.100.19)<br>Transmisson Control Protocol, Src Port: 49101 (49101), Dst Port: 1464 (1464), Seq: 1, Ack: 1, Len: 0 |
| 23 | Frame 23 (54 bytes on wire, 54 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 0.0.0.0 (0.0.0.0), Dst: 0.0.0.0 (0.0.0.0)<br>Internet Control Message Protocol |
| 24 | Frame 24 (1354 bytes on wire, 1354 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 10.8.9.200 (10.8.9.200), Dst: 172.17.100.19 (172.17.100.19)<br>Transmission Control Protocol, Src Port: 49101 (49101), Dst Port: 1464 (1464), Seq: 1, Ack: 1, Len: 1300 |
| 25 | Frame 25 (54 bytes on wire, 54 bytes captured)<br>Ethernet II, Src: 03:50:00:00:00:00 (03:50:00:00:00:00), Dst: LexmarkI_00:00:00 (00:04:00:00:00:00)<br>Internet Protocol, Src: 0.0.0.0 (0.0.0.0), Dst: 0.0.0.0 (0.0.0.0)<br>Internet Control Message Protocol |
| 26 | Frame 26 (54 bytes on wire, 54 bytes captured)<br>Ethernet II, Src: 03:50:00:00:00:00 (03:50:00:00:00:00), Dst: LexmarkI_00:00:00 (00:04:00:00:00:00)<br>Internet Protocol, Src: 172.17.100.19 (172.17.100.19), Dst: 10.8.9.200 (10.8.9.200)<br>Transmission Control Protocol, Src Port: 1464 (1464), Dst Port: 49101 (49101), Seq: 1, Ack: 1301, Len: 0 |
| 27 | Frame 27 (54 bytes on wire, 54 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 0.0.0.0 (0.0.0.0), Dst: 0.0.0.0 (0.0.0.0)<br>Internet Control Message Protocol |
| 28 | Frame 28 (235 bytes on wire, 235 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 10.8.9.200 (10.8.9.200), Dst: 172.17.100.19 (172.17.100.19)<br>Transmission Control Protocol, Src Port: 49101 (49101), Dst Port: 1464 (1464), Seq: 1301, Ack: 1, Len: 181<br>[Reassembled TCP Segments (1481 bytes): #24(1300), #28(181)]<br>Session Initiation Protocol<br>Session Initiation Protocol (SIP as raw text)<br>INVITE sip:1946@172.17.100.19:1464 SIP/2.0\r\n<br>To: <sip:19726751946@saturn.com>\r\n<br>From: "1926" <sip:19726751926@saturn.com>;tag=pft+e9f70905d4bc2741e7924cc765da5f12\r\n<br>Call-ID: 571e4da62b0a01929604be04be913d8c\r\n<br>CSeq: 8917054 INVITE\r\n<br>Max-Forwards: 69\r\n<br>Content-Length: 290\r\n<br>Via: SIP/2.0/TCP<br>10.8.9.200:6050;branch=z9hG4bKb83ff20a59f25275eb99675b0fa05e28jaaaaaaiaaaaaac01gpga3Zqkv7fmmc0py |

TABLE 2-continued

Tabular text version of the PCAP file resulting from
processing the layer 2 data given in Table 1

|   |   |
|---|---|
|   | rqngtca\r\n<br>Record-Route:<br><sip:3Zqkv7%0BaqqgObecb9ysip%3A19726751946%40saturn.com@pcscf.saturn.com:5060;maddr=10.8.9.200;1r>\r\n<br>Contact:<br><sip:ysWJ3KYMWlYrlYxCsiwPyqPXiwyqNWJ3KYMs.9dsiiwiwXwwwyqPiXqXQQQ@mrc.saturn.com;session=1-1>;+g.poc.talkburst;isfocus\r\n<br>Content-Type: application/sdp\r\n<br>Allow: INFO, REFER, SUBSCRIBE, UPDATE, MESSAGE, BYE, OPTIONS, CANCEL, ACK, INVITE\r\n<br>Allow-Events: conference\r\n<br>Accept-Contact: ';+g.poc.talkburst:require;explicit\r\n<br>Require: answermode\r\n<br>Supported: timer, norefersub\r\n<br>P-Asserted-Identity: "1926" <tel:+19726751926>\r\n<br>P-Asserted-Identity: "1926" <sip:19726751926@saturn.com>\r\n<br>Referred-By: "1926" <tel:+19726751926>\r\n<br>Min-SE: 600\r\n<br>Session-Expires: 600;refresher=uas\r\n<br>User-Agent: PoC-serv/OMA1.0 Ericsson-MRFC/R8A__1__01\r\n<br>P-Called-Party-ID: <sip:19726751946@saturn.com>\r\n<br>Answer-Mode: Auto\r\n<br>\r \n<br>v=0\r\n<br>o=userPF 1191959998 1191959998 IN IP4 10.8.8.210\r\n<br>s=SIP Session\r\n<br>c=IN IP4 10.8.8.210\r\n<br>t=0 0\r\n<br>m=audio 53700 RTP/AVP 109\r\n<br>a=rtpmap:109 AMR/8000\r\n<br>a=ptime:200\r\n<br>a=maxptime:400\r\n<br>a=fmtp:109 octet-align=1;mode-set=1\r\n<br>a=+g.poc.talkburst\r\n<br>a=sendrecv\r\n<br>a=rtcp:53701\r\n<br>in=application 53701 udp TBCP\r\n |
| 29 | Frame 29 (54 bytes on wire, 54 bytes captured)<br>Ethernet II, Src: 03:50:00:00:00:00 (03:50:00:00:00:00), Dst: LexmarkI__00:00:00 (00:04:00:00:00:00)<br>Internet Protocol, Src: 0.0.0.0 (0.0.0.0), Dst: 0.0.0.0 (0.0.0.0)<br>Internet Control Message Protocol |
| 30 | Frame 30 (490 bytes on wire, 490 bytes captured)<br>Ethernet II, Src: 03:50:00:00:00:00 (03:50:00:00:00:00), Dst: LexmarkI__00:00:00 (00:04:00:00:00:00)<br>Internet Protocol, Src: 172.17.100.19 (172.17.100.19), Dst: 10.8.9.200 (10.8.9.200)<br>Transmission Control Protocol, Src Port: 1464 (1464), Dst Port: 49101 (49101), Seq: 1, Ack: 1482, Len: 436<br>Session Initiation Protocol<br>Session Initiation Protocol (SIP as raw text)<br>SIP/2.0 100 Trying\r\n<br>v: SIP/2.0/TCP 10.8.9.200:6050;branch=z9hG4bKb83ff20a59f25275eb99675b0fa05e28jaaaaaaiaaaaaac01gpga3Zqkv7fmmc0pyrqngtca\r\n<br>t: "1946" <sip:19726751946@saturn.com>\r\n<br>f: "1926" <sip:19726751926@saturn.com>;tag=pft+e9f70905d4bc2741e7924cc765da5f12\r\n<br>CSeq: 8917054 INVITE\r\n<br>i: 571e4da62b0a01929604be04be913d8c\r\n<br>Server: PoC-client/OMA1.0 ObigoPoC/v1.0.0\r\n<br>P-Preferred-Identity: <sip:19726751946@saturn.com>\r\n<br>Content-Length: 0\r\n<br>\r\n |
| 31 | Frame 31 (54 bytes on wire, 54 bytes captured)<br>Ethernet II, Src: OsakiEle__00:00:00 (00:04:01:00:00:00), Dst: 03:50:01:00:00:00 (03:50:01:00:00:00)<br>Internet Protocol, Src: 0.0.0.0 (0.0.0.0), Dst: 0.0.0.0 (0.0.0.0)<br>Internet Control Message Protocol |
| 32 | Frame 32 (54 bytes on wire, 54 bytes captured)<br>Ethernet II, Src: OsakiEle__00:00:00 (00:04:01:00:00:00), Dst: 03:50:01:00:00:00 (03:50:01:00:00:00)<br>Internet Protocol, Src: 10.8.9.200 (10.8.9.200), Dst: 172.17.100.19 (172.17.100.19)<br>Transmission Control Protocol, Src Port: 49101 (49101), Dst Port: 1464 (1464), Seq: 1482, Ack: 437, Len: 0 |
| 33 | Frame 33 (54 bytes on wire, 54 bytes captured)<br>Ethernet II, Src: 03:50:00:00:00:00 (03:50:00:00:00:00), Dst: LexmarkI__00:00:00 (00:04:00:00:00:00)<br>Internet Protocol, Src: 0.0.0.0 (0.0.0.0), Dst: 0.0.0.0 (0.0.0.0)<br>Internet Control Message Protocol |

TABLE 2-continued

Tabular text version of the PCAP file resulting from
processing the layer 2 data given in Table 1

| | |
|---|---|
| 34 | Frame 34 (822 bytes on wire, 822 bytes captured)<br>Ethernet II, Src: 03:50:00:00:00:00 (03:50:00:00:00:00), Dst: LexmarkI_00:00:00 (00:04:00:00:00:00)<br>Internet Protocol, Src: 172.17.100.19 (172.17.100.19), Dst: 10.8.9.200 (10.8.9.200)<br>User Datagram Protocol, Src Port: 1464 (1464), Dst Port: 5060 (5060)<br>Session Initiation Protocol<br>Session Initiation Protocol (SIP as raw text)<br>SUBSCRIBE sip:ysWJ3KYMWlYrlYxCsiwPyqPXiwyqNWJ3KYMs.9dsiiwiwXwwwyqPiXqXQQQ@mrc.saturn.com;session=1-1 SIP/2.0\r\n<br>v: SIP/2.0/UDP 172.17.100.19:01464;branch=z9hG4bKb6e4c12a;rport\r\n<br>t: <sip:ysWJ3KYMWlYrlYxCsiwPyqPXiwyqNWJ3KYMs.9dsiiwiwXwwwyqPiXqXQQQ@mrc.saturn.com;session=1-1>\r\n<br>f: <sip:19726751946@saturn.com>;tag=37901\r\n<br>CSeq: 20907 SUBSCRIBE\r\n<br>i: f4b7e958b939\r\n<br>Max-Forwards: 70\r\n<br>m: "1946" <sip:1946@172.17.100.19:1464>\r\n<br>Supported: timer\r\n<br>User-Agent: PoC-client/OMA1.0 ObigoPoC/v1.0.0\r\n<br>Accept-Contact: *;+g.poc.talkburst;require;explicit\r\n<br>Event: conference\r\n<br>Accept: application/conference-info+xml\r\n<br>Expires: 3600\r\n<br>Allow: INVITE, ACK, BYE, CANCEL, UPDATE, NOTIFY, MESSAGE, OPTIONS\r\n<br>P-Preferred-Identity: <sip:19726751946@saturn.com>\r\n<br>Route: <sip:10.8.9.200:5060;lr>\r\n<br>Content-Length: 0\r\n<br>\r\n |
| 35 | Frame 35 (54 bytes on wire, 54 bytes captured)<br>Ethernet II, Src: 03:50:00:00:00:00 (03:50:00:00:00:00), Dst: LexmarkI_00:00:00 (00:04:00:00:00:00)<br>Internet Protocol, Src: 0.0.0.0 (0.0.0.0), Dst: 0.0.0.0 (0.0.0.0)<br>Internet Control Message Protocol |
| 36 | Frame 36 (54 bytes on wire, 54 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 0.0.0.0 (0.0.0.0), Dst: 0.0.0.0 (0.0.0.0)<br>Internet Control Message Protocol |
| 37 | Frame 37 (787 bytes on wire, 787 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 10.8.9.200 (10.8.9.200), Dst: 172.17.100.19 (172.17.100.19)<br>User Datagram Protocol, Src Port: 5060 (5060), Dst Port: 1464 (1464)<br>Session Initiation Protocol<br>Session Initiation Protocol (SIP as raw text)<br>SIP/2.0 200 OK\r\n<br>To: <sip:ysWJ3KYMWlYrlYxCsiwPyqPXiwyqNWJ3KYMs.9dsiiwiwXwwwyqPiXqXQQQ@mrc.saturn.com;session=1-1>;tag=add0bd59a956f257b2682732b4b27082\r\n<br>From: <sip:19726751946@saturn.com>;tag=37901\r\n<br>Call-ID: f4b7e958b939\r\n<br>CSeq: 20907 SUBSCRIBE\r\n<br>Content-Length: 0\r\n<br>Via: SIP/2.0/UDP 172.17.100.19:01464;branch=z9hG4bKb6e4c12a;rport\r\n<br>Record-Route: <sip:3Zqkv7%0AaqagGaaknwsip%3A19726751946%40saturn.com@pcscf.saturn.com:5060;maddr=10.8.9.200:lr>\r\n<br>Contact: <sip:ysWJ3KYMWlYrlYxCsiwPyqPXiwyqNWJ3KYMs.9dsiiwiwXwwwyqPiXqXQQQ@mrc.saturn.com>;+g.poc.talkburst;isfocus\r\n<br>Supported: norefersub\r\n<br>P-Asserted-Identity: <sip:ysWJ3KYMWlYrlYxCsiwPyqPXiwyqNWJ3KYMs.9dsiiwiwXwwwyqPiXqXQQQ@mrc.saturn.com;session=1-1>\r\n<br>Expires: 3600\r\n<br>Server: Ericsson-MRFC/RBA_1_01\r\n<br>\r\n |
| 38 | Frame 38 (54 bytes on wire, 54 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 0.0.0.0 (0.0.0.0), Dst: 0.0.0.0 (0.0.0.0)<br>Internet Control Message Protocol |
| 39 | Frame 39 (1214 bytes on wire, 1214 bytes captured)<br>Ethernet II, Src: OsakiEle_00:00:00 (00:04:01:00:00:00), Dst: 03:50:01:00:00:00 (03:50:01:00:00:00)<br>Internet Protocol, Src: 10.8.9.200 (10.8.9.200), Dst: 172.17.100.19 (172.17.100.19)<br>User Datagram Protocol, Src Port: 6050 (6050), Dst Port: 1464 (1464) |

TABLE 2-continued

Tabular text version of the PCAP file resulting from
processing the layer 2 data given in Table 1

| | |
|---|---|
| | Session Initiation Protocol<br>Session Initiation Protocol (SIP as raw text)<br>NOTIFY sip:1946@172.17.100.19:1464 SIP/2.0\r\n<br>To: <sip:19726751946@saturn.com>;tag=37901\r\n<br>From:<br><sip:ysWJ3KYMWlYrlYxCsiwPyqPXiwyqNWJ3KYMs.9dsiiwiwXwwwyqPiXqXQQQ@mrc.saturn.com;session=1-<br>1>;tag=add0bd59a956f257b2682732b4b27082\r\n<br>Call-ID: f4b7e958b939\r\n<br>CSeq: 8917053 NOTIFY\r\n<br>Max-Forwards: 69\r\n<br>Content-Length: 380\r\n<br>Via: SIP/2.0/UDP<br>10.8.9.200:6050;branch=z9hG4bKa4d6ldbacl67bcb4245e117f8f36be7cjaaaaaaiaaaaaaflymrhq3Zqkv7hk2nshk<br>awgqwha\r\n<br>Record-Route:<br><sip:3Zqkv7%0AaqagObecb6sip%3A19726751946%40saturn.com@pcscf.saturn.com:5060;maddr=10.8.9.200;lr<br>>\r\n<br>Contact:<br><sip:ysWJ3KYMWlYrlYxCsiwPyqPXiwyqNWJ3KYMs.9dsiiwiwXwwwyqPiXqXQQQ@mrc.saturn.com>;+g.poc.talkburst;<br>isfocus\r\n<br>Content-Type: application/conference-info+xml\r\n<br>Event: conference\r\n<br>Subscription-State: active\r\n<br>User-Agent: Ericsson-MRFC/R8A__1__01\r\n<br>\r\n<br><?xml version="1.0" encoding="UTF-8"?>\n<br><conference-info version="0" state="full"<br>entity="sip:ysWJ3KYMWlYrlYxCsiwPyqPXiwyqNWJ3KYMs.9dsiiwiwXwwwyqPiXqXQQQ@mrc.saturn.com;session=1<br>-1">\n<br><users>\n<br><user entity="tel:+19726751926">\n<br><display-text>1926</display-text>\n<br><endpoint entity="sip:1926@172.17.100.18:1439">\n<br><status>connected</status>\n<br></endpoint>\n<br></user>\n<br></users>\n<br></conference-info>\n |
| 40 | Frame 40 (1173 bytes on wire, 1173 bytes captured;<br>Ethernet II, Src: 03:50:00:00:00:00 (03:50:00:00:00:00), Dst: LexmarkI__00:00:00<br>(00:04:00:00:00:00)<br>Internet Protocol, Src: 172.17.100.19 (172.17.100.19), Dst: 10.8.9.200 (10.8.9.200)<br>Transmission Control Protocol, Src Port: 1464 (1464), Dst Port: 49101 (49101), Seq: 437, Ack:<br>1482, Len: 1119<br>Session Initiation Protocol<br>Session Initiation Protocol (SIP as raw text)<br>SIP/2.0 200 OK\r\n<br>v: SIP/2.0/TCP<br>10.8.9.200:6050;branch=z9hG4bKb83ff20a59f25275eb99675b0fa05e28jaaaaaaiaaaaaac01gpga3Zqkv7fmmc0py<br>rqngtca\r\n<br>t: "1946" <sip:19726751946@saturn.com>;tag=58868\r\n<br>f: "1926" <sip:19726751926@saturn.com>;tag=pft+e9f70905d4bc2741e7924cc765da5f12\r\n<br>CSeq: 8917054 INVITE\r\n<br>i: 571e4da62b0a01929604be04be913d8c\r\n<br>m: "1946" <sip:1946@172.17.100.19:1464>;+g.poc.talkburst;+g.poc.groupad\r\n<br>Server: PoC-client/OMA1.0 ObigoPoC/v1.0.0\r\n<br>Record-Route:<br><sip:3Zqkv7%0BaqqgObecb9ysip%3A19726751946%40saturn.com@pcscf.saturn.com:5060;maddr=10.8.9.200;l<br>r>\r\n<br>Allow: INVITE, ACK, BYE, CANCEL, UPDATE, NOTIFY, MESSAGE, OPTIONS\r\n<br>P-Preferred-Identity: <sip:19726751946@saturn.com>\r\n<br>Require: timer\r\n<br>Session-Expires: 600;refresher=uas\r\n<br>c: application/sdp\r\n<br>Content-Length: 349\r\n<br>\r\n<br>v=0\r\n<br>o=username 1191941954 1191941954 IN IP4 172.17.100.19\r\n<br>s=session\r\n |

TABLE 2-continued

Tabular text version of the PCAP file resulting from
processing the layer 2 data given in Table 1

```
c=IN IP4 172.17.100.19\r\n
t=0 0\r\n
m=audio 59010 RTP/AVP 109\r\n
a=rtpmap:109 AMR/8000/1\r\n
a=ptime:200\r\n
a=maxptime:400\r\n
a=fmtp:109 mode-set=1;octet-align=1\r\n
a=+g.poc.talkburst\r\n
m=application 59011 udp TBCP\r\n
a=fmtp:TBCP queuing=0;timestamp=0;tb_granted=0;poc_sess_priority=1;poc_lock=0\r\n
```

The reassembled layer 3 packets constitute the communication between two terminals. This communication has a structure at higher layers, which can also be viewed in the performance monitor in ways unique for the higher layer protocols, greatly enhancing the efficiency of the performance evaluation process of the communication service involving these higher layer protocols. Table 3 depicts the communication flow between two terminals at layer 4 and above, with time elapsing between each step, as displayed by the performance monitor.

TABLE 3

The message flow diagram between nodes and terminals,
with timing and higher layer protocol information in text
format

```
|Time       | 0.0.0.0         |172.17.100.18          |10.8.9.200        |172.17.100.19
|0.000      |           Timestamp request              |                  |              |ICMP:
Timestamp request
|           |(0)         ------------------>   (0)     |                  |              |
|0.000      |           |          37354 > 5060 [SYN]  |                  |              |TCP:
37354 > 5060 [SYN] Seq = 0 Len = 0 MSS = 1360 TSV = 3747762846 TSER = 0 WS = 0
|           |           |(37354)     ------------------>     (5060)       |              |
|0.009      |           Timestamp request              |                  |              |ICMP:
Timestamp request
|           |(0)         ------------------>   (0)     |                  |              |
|0.009      |           |          5060 > 37354 SYN,   |                  |              |TCP:
5060 > 37354 [SYN, ACK] Seq = 0 Ack = 1 Win = 19456 Len = 0 MSS = 9960
|           |           |(37354)     <------------------     (5060)       |              |
|0.100      |           Timestamp request              |                  |              |ICMP:
Timestamp request
|           |(0)         ------------------>   (0)     |                  |              |
|0.100      |           |          37354 > 5060 [ACK]  |                  |              |TCP:
37354 > 5060 [ACK] Seq = 1 Ack = 1 Win = 48960 Len = 0
|           |           |(37354)     ------------------>     (5060)       |              |
|0.120      |           Timestamp request              |                  |              |ICMP:
Timestamp request
|           |(0)         ------------------>   (0)     |                  |              |
|0.280      |           |         Request: INVITE sip  |                  |              |
|SIP/SDP: Request: INVITE sip:ad-hoc@saturn.com, with session description
|           |           |(37354)     ------------------>     (5060)       |              |
|0.280      |           Timestamp request              |                  |              |ICMP:
Timestamp request
|           |(0)         ------------------>   (0)     |                  |              |
|0.300      |           |          37354 > 5060 [PSH,  |                  |              |TCP:
37354 > 5060 [PSH, ACK] Seq = 1361 Ack = 1 Win = 48960 Lens = 140
|           |           |(37354)     ------------------>     (5060)       |              |
|0.301      |           Timestamp request              |                  |              |ICMP:
Timestamp request
|           |(0)         ------------------>   (0)     |                  |              |
|0.301      |           |          5060 > 37354 [ACK]  |                  |              |TCP:
5060 > 37354 [ACK] Seq = 1 Ack = 1361 Win = 19456 Len = 0
|           |           |(37354)     <------------------     (5060)       |              |
|0.338      |           Timestamp request              |                  |              |ICMP:
Timestamp request
|           |(0)         ------------------>   (0)     |                  |              |
|0.338      |           |           Status: 100 Trying |                  |              |SiP:
Status: 100 Trying
|           |           |(37354)     <------------------     (5060)       |              |
|0.620      |           Timestamp request              |                  |              |ICMP:
Timestamp request
|           |(0)         ------------------>   (0)     |                  |              |
|0.620      |           |          37354  > 5060 [ACK] |                  |              |TCP:
37354 > 5060 [ACK] Seq = 1501 Ack = 234 Win = 48727 Len = 0
|           |           |(37354)     ------------------>     (5060)       |              |
```

TABLE 3-continued

The message flow diagram between nodes and terminals, with timing and higher layer protocol information in text format

```
|0.827    |    Timestamp request    |              |           |ICMP:
Timestamp request
|        |(0)  ----------------->  (0)  |          |           |
|0.827    |                         |    49101 > 1464 [SYN]    |TCP:
49101 > 1464 [SYN] Seq = 0 Len = 0 MSS = 9960
|        |                         |(49101) ----------------> (1464) |
|0.903    |    Timestamp request    |              |           |ICMP:
Timestamp request
|        |(0)  ----------------->  (0)  |          |           |
|0.904    |                         |    |   1464 > 49101 [SYN, |TCP:
1464 > 49101 [SYN, ACK] Seq = 0 Ack = 1 Win = 48960 Len = 0 MSS = 1360
|        |                         |(49101) <---------------- (1464) |
|0.910    |    Timestamp request    |              |           |ICMP:
Timestamp request
|        |(0)  ----------------->  (0)  |          |           |
|0.910    |                         |    49101 > 1464 [ACK]    |TCP:
49101 > 1464 [ACK] Seq = 1 Ack = 1 Win = 19920 Len = 0
|        |                         |(49101) ----------------> (1464) |
|0.913    |    Timestamp request    |              |           |ICMP:
Timestamp request
|        |(0)  ----------------->  (0)  |          |           |
|0.922    |                         |    [TCP segment of a r   |TCP:
[TCP segment of a reassembled PDU]
|        |                         |(49101) ----------------> (1464) |
|1.203    |    Timestamp request    |              |           |ICMP:
Timestamp request
|        |(0)  ----------------->  (0)  |          |           |
|1.203    |                         |    1464 > 49101 [ACK]    |TCP:
1464 > 49101 [ACK] Seq = 1 Ack = 1301 Win = 48960 Len = 0
|        |                         |(49101) <---------------- (1464) |
|1.211    |    Timestamp request    |              |           |ICMP:
Timestamp request
|        |(0)  ----------------->  (0)  |          |           |
|1.211    |                         |    Request: INVITE sip   |
|SIP/SDP: Request: INVITE sip:1946$$172.17.100.19:1464, with session description
|        |                         |(49101) ----------------> (1464) |
|1.304    |    Timestamp request    |              |           |ICMP:
Timestamp request
|        |(0)  ----------------->  (0)  |          |           |
|1.344    |                         |    Status: 100 Trying    |SIP:
Status: 100 Trying
|        |                         |(49101) <---------------- (1464) |
|1.355    |    Timestamp request    |              |           |ICMP:
Timestamp request
|        |(0)  ----------------->  (0)  |          |           |
|1.355    |                         |    49101 > 1464 [ACK]    |TCP:
49101 > 1464 [ACK] Seq = 1482 Ack = 437 Win = 19920 Len = 0
|        |                         |(49101) ----------------> (1464) |
|1.364    |    Timestamp request    |              |           |ICMP:
Timestamp request
|        |(0)  ----------------->  (0)  |          |           |
|1.464    |                         |    Request: SUBSCRIBE    |SIP:
Request: SUBSCRIBE
sip:ysWJ3KYMWlYrlYxCsiwPyqPXiwyqNWJ3KYMs.9dsiiwiwXwwwyqPiXqXQQQ@mrc.saturn.com;session=1-1
|        |                         |(5060) <----------------- (1464) |
|1.464    |    Timestamp request    |              |           |ICMP:
Timestamp request
|        |(0)  ----------------->  (0)  |          |           |
|1.561    |    Timestamp request    |              |           |ICMP:
Timestamp request
|        |(0)  ----------------->  (0)  |          |           |
|1.569    |                         |    Status: 200 OK        |SIP:
Status: 200 OK
|        |                         |(5060) -----------------> (1464) |
|1.581    |    Timestamp request    |              |           |ICMP:
Timestamp request
|        |(0)  ----------------->  (0)  |          |           |
|1.583    |                         |    Request: NOTIFY sip   |SIP:
Request: NOTIFY sip:1946@172.17.100.19:1464
|        |                         |(6050) -----------------> (1464) |
|1.663    |                         |    Status: 200 OK, wit   |
|SIP/SDP: Status: 200 OK, with session description
|        |                         |(49101) <---------------- (1464) |
```

Lastly but not least, a "debug" printout can be requested during the reassembly process. The debug output contains information about how each data frame logging unit is handled and the decoded form of the data in the frame. A skipped frame sequence number, unexpected frame number, erroneous frame, or redundant transmission will be marked with a letter. When a packet reassembly is complete and ready to be written, frame numbers and the packet size are shown. At the end of the layer 2 log flow, a list is printed of the terminal (UE) identifiers and channel identifiers encountered in the flow. Table 4 lists the verbose debug printout.

TABLE 4

Debug (verbose) printout detailing the decisions and data encountered during the reassembly procedure of the saple layer 2 log

```
bash-3.2$ /bin/gawk -f ~/bin/rlc2pcap.awk BEGTIME=1 VERB=1 VERBDATA=1 < sample-rnc-layer2-
condensed.log > sample-rnc-layer2-condensed.log.pcap
$Id: rlc2pcap.awk,v 1.48 2008/02/27 00:45:38 eusmus Exp eusmus $
fileHeader, TZSEC=0
s####h++ yyyy-mm-dd hh:mm:ss.ddd ue###DpMi:seq# "................ SDU data ................." h
11 12 +## e## (# out) p## (# out)
                    New Channel: 00847>p00:2906
s0000h+! 2007-10-09 19:59:52.213 00847>p00:2906 "..E..@..@.E.....d............ .......@f...." 0
+40 140 ship-40
s0000h++ 2007-10-09 19:59:52.213 00847>p00:2907 "..1....P.....bR.............UUUUUUUUUUUUUUUE" 1
24 127 e01 +24 p15 { 2906 2907.0 ship-64 }
                    New Channel: 00847<p00:2102
s0000h+! 2007-10-09 19:59:52.222 00847<p00:2102 "..E..,R.@.:..4......d.........).... .L......P" 0
+40 140 ship-40
s0000h++ 2007-10-09 19:59:52.222 00847<p00:2103 ".......&...6.+..;@.U....<x.Y.a..v.....[n......" 1
4 127 e01 +04 p35 { 2102 2103.0 ship-44 }
s0000h++ 2007-10-09 19:59:52.313 00847>p00:2908 "..E..(..@.E.....d................*P..@e...." 0
+40 140 ship-40
s0000h++ 2007-10-09 19:59:52.313 00847>p00:2909 "...E...x..@.E.....d................'P..@.v.2" 1
0 e01 +00 +39 139 { 2908 2909.0 ship-40 }
s0000h++ 2007-10-09 19:59:52.333 00847>p00:2910 "...INVITE sip:ad-hoc@saturn.com SIP/2.0..v." 0
+40 140 ship-40
s0000h++ 2007-10-09 19:59:52.333 00847>p00:2911 "..: SIP/2.0/TCP 172.17.100.18:37354;branch." 0
+40 140
s0000h++ 2007-10-09 19:59:52.333 00847>p00:2912 "..=z9hG4bKf21d920f;rport..t: <sip:ad-hoc@s." 0
+40 140
s0000h++ 2007-10-09 19:59:52.333 00847>p00:2913 "..aturn.com>..f: "1926" <sip:19726751926@s." 0
+40 140
s0000h++ 2007-10-09 19:59:52.353 00847>p00:2914 "..aturn.com>;tag=18130..CSeq: 12819 INVITE." 0
+40 140
s0000h++ 2007-10-09 19:59:52.353 00847>p00:2915 "....i: 766b5d4ee844..Max-Forwards: 70..m: ." 0
+40 140
s0000h++ 2007-10-09 19:59:52.353 00847>p00:2916 ". "1926" <sip:1926@172.17.100.18:1439>;+g.." 0
+40 140
s0000h++ 2007-10-09 19:59:52.353 00847>p00:2917 ".(poc.talkburst;+g.poc.groupad..Supported:<" 0
+40 140
s0000h++ 2007-10-09 19:59:52.373 00847>p00:2918 ".0 timer, answermode..User-Agent: PoC-clie." 0
+40 140
s0000h++ 2007-10-09 19:59:52.373 00847>p00:2919 ".8nt/OMA1.0 ObigoPoC/v1.0.0..Accept-Contac." 0
+40 140
s0000h++ 2007-10-09 19:59:52.373 00847>p00:2920 ".@t: *;+g.poc.talkburst;require;explicit..." 0
+40 140
s0000h++ 2007-10-09 19:59:52.373 00847>p00:2921 ".HSession-Expires: 3600;refresher=uac..AllO" 0
+40 140
s0000h++ 2007-10-09 19:59:52.393 00847>p00:2922 ".Pow: INVITE, ACK, BYE, CANCEL, UPDATE, NO." 0
+40 140
s0000h++ 2007-10-09 19:59:52.393 00847>p00:2923 ".XTIFY, MESSAGE, OPTIONS..P-Preferred-Iden." 0
+40 140
s0000h++ 2007-10-09 19:59:52.393 00847>p00:2924 ". tity: <sip:19726751926@saturn.com>..Rout." 0
+40 140
s0000h++ 2007-10-09 19:59:52.393 00847>p00:2925 ".he: <sip:10.8.9.200:5060;lr>..c: multipar." 0
+40 140
s0000h++ 2007-10-09 19:59:52.413 00847>p00:2926 ".pt/mixed;boundary="ce0c58ae7fb2d717"..Con." 0
+40 140
s0000h++ 2007-10-09 19:59:52.413 00847>p00:2927 ".xtent-Length: 801....--ce0c58ae7fb2d717..." 0
+40 140
s0000h++ 2007-10-09 19:59:52.413 00847>p00:2928 "..Content-Type: application/sdp..Content-L." 0
+40 140
s0000h++ 2007-10-09 19:59:52.413 00847>p00:2929 "..ength: 346....v=0..o=username 1191941996E" 0
+40 140
s0000h++ 2007-10-09 19:59:52.433 00847>p00:2930 ".. 1191941996 IN IP4 172.17.100.18..s=sess." 0
+40 140
s0000h++ 2007-10-09 19:59:52.433 00847>p00:2931 "..ion..c=IN IP4 172.17.100.18..t=0 0..m=au." 0
+40 140
s0000h++ 2007-10-09 19:59:52.433 00847>p00:2932 "..dio 59010 RTP/AVP 96..a=rtpmap:96 AMR/80." 0
+40 140
s0000h++ 2007-10-09 19:59:52.433 00847>p00:2933 "..00/1..a=ptime:200..a=maxptime:400..a=fmt2" 0
+40 140
```

TABLE 4-continued

Debug (verbose) printout detailing the decisions and data
encountered during the reassembly procedure of the saple
layer 2 log s0000h++ 2007-10-09 19:59:52.453 00847>p00:2934 "..p:96 mode-set=1;octet-align=1..a=+g.poc.." 0 +40 140
s0000h++ 2007-10-09 19:59:52.453 00847>p00:2935 "..talkburst..m=application 59011 udp TBCP.." 0 +40 140
s0000h++ 2007-10-09 19:59:52.453 00847>p00:2936 "...a=fmtp:TBCP queuing=0;timestamp=0;tb__gr." 0 +40 140
s0000h++ 2007-10-09 19:59:52.453 00847>p00:2937 "..anted=0;poc__sess__priority=1;poc__lock=0..<" 0 +40 140
s0000h++ 2007-10-09 19:59:52.473 00847>p00:2938 "....--ce0c58ae7fb2d717..Content-Type: appl.." 0 +40 140
s0000h++ 2007-10-09 19:59:52.473 00847>p00:2939 "..ication/resource-lists+xml..Content-Disp." 0 +40 140
s0000h++ 2007-10-09 19:59:52.473 00847>p00:2940 "..osition: recipient-list..Content-Length:." 0 +40 140
s0000h++ 2007-10-09 19:59:52.473 00847>p00:2941 ".. 229....<?xml version="1.0" encoding="UT." 0 +40 140
s0000h++ 2007-10-09 19:59:52.493 00847>p00:2942 "..F-8"?>..<resource-lists xmlns="urn:ietf:." 0 +40 140
s0000h++ 2007-10-09 19:59:52.493 00847>p00:2943 "..params:xml:ns:resource-lists" xmlns:xsi=." 0 +40 140
s0000h++ 2007-10-09 19:59:52.493 00847>p00:2944 "..."E.....@.E..h..d................'P..@y.." 1
1 e01 +01 +38 138 { 2910 2911 2912 2913 2914 2915 2916 2917 2918 2919 2920 2921 2922 2923 2924
2925 2926 2927 2928 2929 2930 2931 2932 2933 2934 2935 2936 2937 2938 2939 2940 2941 2942 2943
2944.0 ship-1400 }
s0000h++ 2007-10-09 19:59:52.493 00847>p00:2945 "....http://www.w3c.org/2001/XMLSchema-inst." 0 +40 140 ship-40
s0000h++ 2007-10-09 19:59:52.513 00847>p00:2946 "..ance">..<list>..entry uri="tel:+1972675." 0 +40 140
s0000h++ 2007-10-09 19:59:52.513 00847>p00:2947 "..1946" />..</list>..</resource-lists>....." 0 +40 140
s0000h++ 2007-10-09 19:59:52.513 00847>p00:2948 ".%-.--ce0c58ae7fb2d717--..UUUUUUUUUUUUUUUU." 1
22 127 e01 +22 p17 { 2945 2946 2947 2948.0 ship-180 }
s0000h++ 2007-10-09 19:59:52.514 00847<p00:2104 "..E..(R.@.:..4......d........'....P.L......" 0 +40 140 ship-40
s0000h++ 2007-10-09 19:59:52.514 00847<p00:2105 "......9......w.%..t.|.....;...)3.da...W\.H." 1
0 127 e01 +00 p39 { 2104 2105.0 ship-40 }
s0000h++ 2007-10-09 19:59:52.551 00847<p00:2106 "..E...R.@.:..J......d........'...[P.L.|$.."" 0 +40 140 ship-40
s0000h++ 2007-10-09 19:59:52.551 00847<p00:2107 "..SIP/2.0 100 Trying..To: <sip:ad-hoc@satu." 0 +40 140
s0000h++ 2007-10-09 19:59:52.551 00847<p00:2108 "..rn.com>..From: "1926" <sip:19726751926@s." 0 +40 140
s0000h++ 2007-10-09 19:59:52.551 00847<p00:2109 "..aturn.com>;tag=18130..Call-ID: 766b5d4ee." 0 +40 140
s0000h++ 2007-10-09 19:59:52.551 00847<p00:2110 "..844..CSeq: 12819 INVITE..Content-Length:0" 0 +40 140
s0000h++ 2007-10-09 19:59:52.551 00847<p00:2111 ".. 0..Via: SIP/2.0/TCP 172.17.100.18:37354." 0 +40 140
s0000h++ 2007-10-09 19:59:52.551 00847<p00:2112 "..C.;branch=z9hG4bKf21d920f;rport.....a...P" 1
33 127 e01 +33 p06 { 2106 2107 2108 2109 2110 2111 2112.0 ship-273 }
s0000h++ 2007-10-09 19:59:52.833 00847>p00:2949 ".(E..{..@.E......d............[....P..W_...." 0 +40 140 ship-40
s0000h++ 2007-10-09 19:59:52.833 00847>p00:2950 ".5..UUUUUUUUUUUUUUUUUUUUUUUUUUUUUUUUUUUUUU." 1
0 127 e01 +00 p39 { 2949 2950.0 ship-40 }
            New Channel: 00848<p00:3211
s0000h+! 2007-10-09 19:59:53.040 00848<p00:3211 ".XE..,Si@.;..n......d.....G..q....'.L.k..."" 0 +40 140 ship-40
s0000h++ 2007-10-09 19:59:53.040 00848<p00:3212 ".e....&.1.3..&FG\b...Y......ar....1.6...iG." 1
4 127 e01 +04 p35 { 3211 3212.0 ship-44 }
            New Channel: 00848>p00:1565
s0000h+! 2007-10-09 19:59:53.116 00848>p00:1565 "..E..,.`@.E..w..d............]G..r'..@......" 0 +40 140 ship-40
s0000h++ 2007-10-09 19:59:53.117 00848>p00:1566 ".......PUUUUUUUUUUUUUUUUUUUUUUUUUUUUUUUUUU." 1
4 127 e01 +04 p35 { 1565 1566.0 ship-44 }
s0000h++ 2007-10-09 19:59:53.123 00848<p00:3213 "..hE..(Sk@.;..p......d.....G..r..^P.M......" 0 +40 140 ship-40
s0000h++ 2007-10-09 19:59:53.123 00848<p00:3214 "..u..s..A.C%..7.@p.K6..J.p8.u.....\..Og..D." 1
0 127 e01 +00 p39 { 3213 3214.0 ship-40 }
s0000h++ 2007-10-09 19:59:53.126 00848<p00:3215 ".xE..<Sm@.;..z......d.....G..r..^P.M..=..@" 0 +40 140 ship-40
s0000h++ 2007-10-09 19:59:53.126 00848<p00:3216 "..INVITE sip:1946@172.17.100.19:1464 SIP/2." 0 +40 140
s0000h++ 2007-10-09 19:59:53.126 00848<p00:3217 "...0..To: <sip:19726751946@saturn.com>..Fr0" 0 +40 140
s0000h++ 2007-10-09 19:59:53.126 00848<p00:3218 "..om: "1926" <sip:19726751926@saturn.com>;." 0 +40 140

TABLE 4-continued

Debug (verbose) printout detailing the decisions and data
encountered during the reassembly procedure of the saple
layer 2 log s0000h++ 2007-10-09 19:59:53.126 00848<p00:3219 "..tag=pft+e9f70905d4bc2741e7924cc765da5f12." 0 +40 140
s0000h++ 2007-10-09 19:59:53.126 00848<p00:3220 "....Call-ID: 571e4da62b0a01929604be04be913." 0 +40 140
s0000h++ 2007-10-09 19:59:53.133 00848<p00:3221 "..d8c..CSeq: 8917054 INVITE..Max-Forwards:." 0 +40 140
s0000h++ 2007-10-09 19:59:53.133 00848<p00:3222 ".. 69..Content-Length: 290..Via: SIP/2.0/T." 0 +40 140
s0000h++ 2007-10-09 19:59:53.133 00848<p00:3223 "..CP 10.8.9.200:6050;branch=z9hG4bKb83ff20." 0 +40 140
s0000h++ 2007-10-09 19:59:53.133 00848<p00:3224 "..a59f25275eb99675b0fa05e28jaaaaaaiaaaaaac." 0 +40 140
s0000h++ 2007-10-09 19:59:53.133 00848<p00:3225 "..01gpga3Zqkv7fmmc0pyrqngtca..Record-Route." 0 +40 140
s0000h++ 2007-10-09 19:59:53.133 00848<p00:3226 "..: <sip:3Zqkv7%0BaqqgObecb9ysip%3A19726750" 0 +40 140
s0000h++ 2007-10-09 19:59:53.133 00848<p00:3227 "..1946%40saturn.com@pcscf.saturn.com:5060;@" 0 +40 140
s0000h++ 2007-10-09 19:59:53.133 00848<p00:3228 "..maddr=10.8.9.200;lr>..Contact: <sip:ysWJ." 0 +40 140
s0000h++ 2007-10-09 19:59:53.133 00848<p00:3229 "..3KYMW1Yr1YxCsiwPyqPXiwyqNWJ3KYMs.9dsiiwip" 0 +40 140
s0000h++ 2007-10-09 19:59:53.133 00848<p00:3230 "..wXwwwyqPiXqXQQQ@mrc.saturn.com;session=10" 0 +40 140
s0000h++ 2007-10-09 19:59:53.133 00848<p00:3231 "..–1>;+g.poc.talkburst;isfocus..Content-Ty." 0 +40 140
s0000h++ 2007-10-09 19:59:53.134 00848<p00:3232 "..pe: application/sdp..Allow: INFO, REFER,." 0 +40 140
s0000h++ 2007-10-09 19:59:53.134 00848<p00:3233 ".. SUBSCRIBE, UPDATE, MESSAGE, BYE, OPTIONp" 0 +40 140
s0000h++ 2007-10-09 19:59:53.134 00848<p00:3234 "..S, CANCEL, ACK, INVITE..Allow-Events: co0" 0 +40 140
s0000h++ 2007-10-09 19:59:53.134 00848<p00:3235 "..nference..Accept-Contact: ";+g.poc.talkb@" 0 +40 140
s0000h++ 2007-10-09 19:59:53.134 00848<p00:3236 ". urst;require;explicit..Require: answermo0" 0 +40 140
s0000h++ 2007-10-09 19:59:53.134 00848<p00:3237 ".(de..Supported: timer, norefersub..P-Asse." 0 +40 140
s0000h++ 2007-10-09 19:59:53.134 00848<p00:3238 ".Orted-Identity: "1926" <tel:+19726751926>." 0 +40 140
s0000h++ 2007-10-09 19:59:53.134 00848<p00:3239 "..8..P-Asserted-Identity: "1926" <sip:19726." 0 +40 140
s0000h++ 2007-10-09 19:59:53.134 00848<p00:3240 ".@751926@saturn.com>..Referred-By: "1926" " 0 +40 140
s0000h++ 2007-10-09 19:59:53.134 00848<p00:3241 ".H<tel:+19726751926>..Min-SE: 600..Session." 0 +40 140
s0000h++ 2007-10-09 19:59:53.134 00848<p00:3242 ".P-Expires: 600;refresher=uas..User-Agent:0" 0 +40 140
s0000h++ 2007-10-09 19:59:53.134 00848<p00:3243 ".X PoC-serv/OMA1.0 Ericsson-MRFC/R8A_1_01. " 0 +40 140
s0000h++ 2007-10-09 19:59:53.135 00848<p00:3244 ".'.P-Called-Party-ID: <sip:19726751946@sat " 0 +40 140
s0000h++ 2007-10-09 19:59:53.135 00848<p00:3245 ".hurn.com>..Answer-Mode: Auto....v=0..o=us " 0 +40 140
s0000h++ 2007-10-09 19:59:53.135 00848<p00:3246 ".perPF 1191959998 1191959998 IN IP4 10.8.8." 0 +40 140
s0000h++ 2007-10-09 19:59:53.135 00848<p00:3247 ".x.210..s=SIP Session..c=IN IP4 10.8.8.210p" 0 +40 140
s0000h++ 2007-10-09 19:59:53.135 00848<p00:3248 "..)...t=0 0..m=audio 537..6|..@6|..6|..6|..0" 1 20 127 e01 +20 p19 { 3215 3216 3217 3218 3219 3220 3221 3222 3223 3224 3225 3226 3227 3228 3229 3230 3231 3232 3233 3234 3235 3236 3237 3238 3239 3240 3241 3242 3243 3244 3245 3246 3247 3248.0 ship-1340 }
s0000h++ 2007-10-09 19:59:53.416 00848>p00:1567 "..E..(.a@.E..z..d............^G...P..@.;.." 0 +40 140 ship-40
s0000h++ 2007-10-09 19:59:53.416 00848>p00:1568 "....UUUUUUUUUUUUUUUUUUUUUUUUUUUUUUUUUUUUUUU2" 1 0 127 e01 +00 p39 { 1567 1568.0 ship-40 }
s0000h++ 2007-10-09 19:59:53.424 00848<p00:3249 "..E...Sr@.;.........d.....G......^P..M......" 0 +40 140 ship-40
s0000h++ 2007-10-09 19:59:53.424 00848<p00:3250 "..00 RTP/AVP 109..a=rtpmap:109 AMR/8000...a." 0 +40 140
s0000h++ 2007-10-09 19:59:53.424 00848<p00:3251 "..=ptime:200..a=maxptime:400..a=fmtp:109 o." 0 +40 140
s0000h++ 2007-10-09 19:59:53.424 00848<p00:3252 "..ctet-align=1;mode-set=1..a=+g.poc.talkbu." 0 +40 140
s0000h++ 2007-10-09 19:59:53.424 00848<p00:3253 "..rst..a=sendrecv..a=rtcp:53701..m=applica." 0 +40 140

TABLE 4-continued

Debug (verbose) printout detailing the decisions and data
encountered during the reassembly procedure of the saple
layer 2 log s0000h++ 2007-10-09 19:59:53.424 00848<p00:3254 "..+.tion 53701 udp TBCP....-....v..z...LrK0" 1
21 127 e01 +21 p18 { 3249 3250 3251 3252 3253 3254.0 ship-221 }
s0000h++ 2007-10-09 19:59:53.517 00848>p00:1569 "..E....b@.E.~...d............ G..;P...8...." 0
+40 140 ship-40
s0000h++ 2007-10-09 19:59:53.517 00848>p00:1570 "..SIP/2.0 100 Trying..v: SIP/2.0/TCP 10.8.." 0
+40 140
s0000h++ 2007-10-09 19:59:53.517 00848>p00:1571 "..9.200:6050;branch=z9hG4bKb83ff20a59f2527." 0
+40 140
s0000h++ 2007-10-09 19:59:53.517 00848>p00:1572 ". 5eb99675b0fa05e28jaaaaaaiaaaaaac01gpga3ZE" 0
+40 140
s0000h++ 2007-10-09 19:59:53.537 00848>p00:1573 ".(qkv7fmmc0pyrqngtca..t: "1946" <sip:19726." 0
+40 140
s0000h++ 2007-10-09 19:59:53.537 00848>p00:1574 ".0751946@saturn.com>..f: "1926" <sip:19726." 0
+40 140
s0000h++ 2007-10-09 19:59:53.537 00848>p00:1575 ".8751926@saturn.com>;tag=pft+e9f70905d4bc2." 0
+40 140
s0000h++ 2007-10-09 19:59:53.537 00848>p00:1576 ".@741e7924cc765da5f12..CSeq: 8917054 INVIT." 0
+40 140
s0000h++ 2007-10-09 19:59:53.557 00848>p00:1577 ".HE..i: 571e4da62b0a01929604be04be913d8c..." 0
+40 140
s0000h++ 2007-10-09 19:59:53.557 00848>p00:1578 ".PServer: PoC-client/OMA1.0 ObigoPoC/v1.0.." 0
+40 140
s0000h++ 2007-10-09 19:59:53.557 00848>p00:1579 ".X0..P-Preferred-Identity: <sip:1972675194." 0
+40 140
s0000h++ 2007-10-09 19:59:53.557 00848>p00:1580 ".aH6@saturn.com>..Content-Length: 0....E..." 1
36 e01 +36 +03 13 { 1569 1570 1571 1572 1573 1574 1575 1576 1577 1578 1579 1580.0 ship-476 }
s0000h++ 2007-10-09 19:59:53.568 00848<p00:3255 "..E..(S{@.;.. `......d.....G..;....P.M..C..." 0
+40 140 ship-40
s0000h++ 2007-10-09 19:59:53.568 00848<p00:3256 ".....N.C...MVA....d.S..J.-?..7..%5\..(.Z..." 1
0 127 e01 +00 p39 { 3255 3256.0 ship-40 }
s0000h++ 2007-10-09 19:59:53.577 00848>p00:1581 ".h(.c..E..m..d...........%.SUBSCRIBE sip:y." 0
+40 140 ship-40
s0000h++ 2007-10-09 19:59:53.577 00848>P00:1582 ".psWJ3KYMWlYrlYxCsiwPyqPXiwyqNWJ3KYMs.9dsi." 0
+40 140
s0000h++ 2007-10-09 19:59:53.577 00848>p00:1583 ".xiwiwXwwwyqPiXqXQQQ@mrc.saturn.com;sessio." 0
+40 140
s0000h++ 2007-10-09 19:59:53.577 00848>p00:1584 "..n=1-1 SIP/2.0..v: SIP/2.0/UDP 172.17.100]" 0
+40 140
s0000h++ 2007-10-09 19:59:53.597 00848>p00:1585 "...19:01464;branch=z9hG4bKb6e4c12a;rport..." 0
+40 140
s0000h++ 2007-10-09 19:59:53.597 00848>p00:1586 "..t: <sip:ysWJ3KYMWlYrlYxCsiwPyqPXiwyqNWJ3." 0
+40 140
s0000h++ 2007-10-09 19:59:53.597 00848>p00:1587 "..KYMs.9dsiiwiwXwwwyqPiXqXQQQ@mrc.saturn.c." 0
+40 140
s0000h++ 2007-10-09 19:59:53.597 00848>p00:1588 "..om;session=1-1>..f: <sip:19726751946@sat." 0
+40 140
s0000h++ 2007-10-09 19:59:53.617 00848>p00:1589 "..urn.com>;tag=37901..CSeq: 20907 SUBSCRIB." 0
+40 140
s0000h++ 2007-10-09 19:59:53.617 00848>p00:1590 "..E..i: f4b7e958b939..Max-Forwards: 70..m:." 0
+40 140
s0000h++ 2007-10-09 19:59:53.617 00848>p00:1591 ".. "1946" <sip:1946@172.17.100.19:1464>..S." 0
+40 140
s0000h++ 2007-10-09 19:59:53.617 00848>p00:1592 "..upported: timer..User-Agent: PoC-client/2" 0
+40 140
s0000h++ 2007-10-09 19:59:53.637 00848>p00:1593 "..OMA1.0 ObigoPoC/v1.0.0..Accept-Contact: ." 0
+40 140
s0000h++ 2007-10-09 19:59:53.637 00848>p00:1594 "..*;+g.poc.talkburst;require;explicir..Eve." 0
+40 140
s0000h++ 2007-10-09 19:59:53.637 00848>p00:1595 "...nt: conference..Accept: application/conf0" 0
+40 140
s0000h++ 2007-10-09 19:59:53.657 00848>p00:1596 "..erence-info+xml..Expires: 3600..Allow: I." 0
+40 140
s0000h++ 2007-10-09 19:59:53.657 00848>p00:1597 "..NVITE, ACK, BYE, CANCEL, UPDATE, NOTIFY,." 0
+40 140
s0000h++ 2007-10-09 19:59:53.657 00848>p00:1598 ".. MESSAGE, OPTIONS..P-Preferred-Identity:." 0
+40 140
s0000h++ 2007-10-09 19:59:53.657 00848>p00:1599 ".. <sip:19726751946@saturn.com>..Route: <sX" 0
+40 140
s0000h++ 2007-10-09 19:59:53.676 00848>p00:1600 "..ip:10.8.9.200:5060;lr>..Content-Length: ." 0
+40 140
s0000h++ 2007-10-09 19:59:53.677 00848>p00:1601 "...0....E....d@.E.|...d.............G..;P." 1
5 e01 +05 +34 134 { 1581 1582 1583 1584 1585 1586 1587 1588 1589 1590 1591 1592 1593 1594 1595
1596 1597 1598 1599 1600 1601.0 ship-808 }
s0000h++ 2007-10-09 19:59:53.677 00848>p00:1602 "....'6..SIP/2.0 200 OK..v: SIP/2.0/TCP 10.." 0
+40 140 ship-40

TABLE 4-continued

Debug (verbose) printout detailing the decisions and data
encountered during the reassembly procedure of the saple
layer 2 log s0000h++ 2007-10-09 19:59:53.677 00848>p00:1603 "..8.9.200:6050;branch=z9hG4bkb83ff20a59f25<" 0 +40 140
s0008h++ 2007-10-09 19:59:53.737 00848>p00:1612 ".'pad..Server: PoC-client/OMA1.0 ObigoPoC/." 0 +40 140
s0000h++ 2007-10-09 19:59:53.737 00848>p00:1613 "..hv1.0.0..Record-Route: <sip:3Zqkv7%0Baqqg." 0 +40 140
s0000h++ 2007-10-09 19:59:53.737 00848>p00:1614 ".pObecb9ysip%3A19726751946%40saturn.com@pc." 0 +40 140
s0000h++ 2007-10-09 19:59:53.737 00848>p00:1615 "..xscf.saturn.com:5060;maddr=10.8.9.200;lr>2" 0 +40 140
s0000h++ 2007-10-09 19:59:53.757 00848>p00:1616 "....Allow: INVITE, ACK, BYE, CANCEL, UPDAT." 0 +40 140
s0000h++ 2007-10-09 19:59:53.757 00848>p00:1617 "..E, NOTIFY, MESSAGE, OPTIONS..P-Preferred." 0 +40 140
s0000h++ 2007-10-09 19:59:53.757 00848>p00:1618 "..-Identity: <sip:19726751946@saturn.com>.." 0 +40 140
s0000h++ 2007-10-09 19:59:53.757 00848>p00:1619 "...Require: timer..Session-Expires: 600;re<" 0 +40 140
s0000h++ 2007-10-09 19:59:53.774 00848<p00:3257 "..E...S...:..h......d........pSIP/2.0 200 ." 0 +40 140 ship-40
s0000h++ 2007-10-09 19:59:53.774 00848<p00:3258 "..OK..To: <sip:ysWJ3KYMWlYrlYxCsiwPyqPXiwy'" 0 +40 140
s0000h++ 2007-10-09 19:59:53.774 00848<p00:3259 "..qNWJ3KYMs.9dsiiwiwXwwwyqPiXqXQQQ@mrc.sat." 0 +40 140
s0000h++ 2007-10-09 19:59:53.774 00848<p00:3260 "..urn.com;session=1-1>;tag=add0bd59a956f25." 0 +40 140
s0000h++ 2007-10-09 19:59:53.774 00848<p00:3261 "..7b2682732b4b27082..From: <sip:1972675194." 0 +40 140
s0000h++ 2007-10-09 19:59:53.774 00848<p00:3262 "..6@saturn.com>;tag=37901..Call-ID: f4b7e9." 0 +40 140
s0000h++ 2007-10-09 19:59:53.774 00848<p00:3263 "..58b939..CSeq: 20907 SUBSCRIBE..Content-L@" 0 +40 140
s0000h++ 2007-10-09 19:59:53.777 00848>p00:1620 "..fresher=uas..c: application/sdp..Content." 0 +40 140
s0000h++ 2007-10-09 19:59:53.777 00848>p00:1621 "..-Length: 349....v=0..o=username 11919419." 0 +40 140
s0000h++ 2007-10-09 19:59:53.777 00848>p00:1622 "..54 1191941954 IN IP4 172.17.100.19..s=se." 0 +40 140
s0000h++ 2007-10-09 19:59:53.777 00848>p00:1623 "..ssion..c=IN IP4 172.17.100.19..t=0 0..m=2" 0 +40 140
s0000h++ 2007-10-09 19:59:53.781 00848<p00:3264 "..ength: 0..Via: SIP/2.0/UDP 172.17.100.19." 0 +40 140
s0000h++ 2007-10-09 19:59:53.781 00848<p00:3265 "..:01464;branch=z9hG4bKb6e4c12a;rport..Recp" 0 +40 140
s0000h++ 2007-10-09 19:59:53.781 00848<p00:3266 "..ord-Route: <sip:3Zqkv7%0AaqagGaaknwsip%3." 0 +40 140
s0000h++ 2007-10-09 19:59:53.781 00848<p00:3267 "..A19726751946%40saturn.com@pcscf.saturn.c'" 0 +40 140
s0000h++ 2007-10-09 19:59:53.781 00848<p00:3268 ". om:5060;maddr=10.8.9.200;lr>..Contact: <." 0 +40 140
s0000h++ 2007-10-09 19:59:53.781 00848<p00:3269 ".{sip:ysWJ3KYMWlYrlYxCsiwPyqPXiwyqNWJ3KYMs@" 0 +40 140
s0000h++ 2007-10-09 19:59:53.781 00848<p00:3270 "..0.9dsiiwiwXwwwyqPiXqXQQQ@mrc.saturn.com>;." 0 +40 140
s0000h++ 2007-10-09 19:59:53.781 00848<p00:3271 "..8+g.poc.talkburst;isfocus..Supported: nor." 0 +40 140
s0000h++ 2007-10-09 19:59:53.781 00848<p00:3272 ".'@efersub..P-Asserted-Identity: <sip:ysWJ3p" 0 +40 140
s0000h++ 2007-10-09 19:59:53.781 00848<p00:3273 "..HKYMWlYrlYxCsiwPyqPXiwyqNWJ3KYMs.9dsiiwiw0" 0 +40 140
s0000h++ 2007-10-09 19:59:53.781 00848<p00:3274 "..PXwwwyqPiXqXQQQ@mrc.saturn.com;session=1-." 0 +40 140
s0000h++ 2007-10-09 19:59:53.782 00848<p00:3275 "..X1>..Expires: 3600..Server: Ericsson-MRFC." 0 +40 140
s0000h++ 2007-10-09 19:59:53.782 00848<p00:3276 "..e../R8A__1__01....6...6..@6...6...6..@6p" 1
13 127 e01 +13 p26 { 3257 3258 3259 3260 3261 3262 3263 3264 3265 3266 3267 3268 3269 3270 3271 3272 3273 3274 3275 3276.0 ship-773 }
s0000h++ 2007-10-09 19:59:53.794 00848<p00:3277 "..hE...S...;.........d.......M\NOTIFY sip:1p" 0 +40 140 ship-40
s0000h++ 2007-10-09 19:59:53.794 00848<p00:3278 "..p946@172.17.100.19:1464 SIP/2.0..To: <sip." 0 +40 140
s0000h++ 2007-10-09 19:59:53.794 00848<p00:3279 "..x:I9726751946@saturn.com>;tag=37901..From." 0 +40 140
s0000h++ 2007-10-09 19:59:53.794 00848<p00:3280 "..: <sip:ysWJ3KYMWlYrlYxCsiwPyqPXiwyqNWJ3K@" 0 +40 140

TABLE 4-continued

Debug (verbose) printout detailing the decisions and data
encountered during the reassembly procedure of the saple
layer 2 log s0000h++ 2007-10-09 19:59:53.794 00848<p00:3281 "..YMs.9dsiiwiwXwwwyqPiXqXQQQ@mrc.saturn.co." 0 +40 140
s0000h++ 2007-10-09 19:59:53.794 00848<p00:3282 "..m;session=1-1>;tag=add0bd59a956f257b2682P" 0 +40 140
s0000h++ 2007-10-09 19:59:53.794 00848<p00:3283 "..732b4b27082..Call-ID: f4b7e958b939..CSeq." 0 +40 140
s0000h++ 2007-10-09 19:59:53.794 00848<p00:3284 "..: 8917053 NOTIFY..Max-Forwards: 69..Cont0" 0 +40 140
s0000h++ 2007-10-09 19:59:53.794 00848<p00:3285 "..ent-Length: 380..Via: SIP/2.0/UDP 10.8.9p" 0 +40 140
s0000h++ 2007-10-09 19:59:53.794 00848<p00:3286 "...200:6050;branch=z9hG4bKa4d61dbac167bcb40" 0 +40 140
s0000h++ 2007-10-09 19:59:53.795 00848<p00:3287 "..245e117f8f36be7cjaaaaaaiaaaaaaf1ymrhq3Zq." 0 +40 140
s0000h++ 2007-10-09 19:59:53.795 00848<p00:3288 "..kv7hk2nshkawgqwha..Record-Route: <sip:3Z." 0 +40 140
s0000h++ 2007-10-09 19:59:53.795 00848<p00:3289 "..qkv7%0AaqagObecb6sip%3A19726751946%40satp" 0 +40 140
s0000h++ 2007-10-09 19:59:53.795 00848<p00:3290 "..urn.com@pcscf.saturn.com:5060;maddr=10.80" 0 +40 140
s0000h++ 2007-10-09 19:59:53.795 00848<p00:3291 "...9.200;lr>..Contact: <sip:ysWJ3KYMWlYrlY." 0 +40 140
s0000h++ 2007-10-09 19:59:53.795 00848<p00:3292 "..xCsiwPyqPXiwyqNWJ3KYMs.9dsiiwiwXwwwyqPiX." 0 +40 140
s0000h++ 2007-10-09 19:59:53.795 00848<p00:3293 "..qXQOQ@mrc.saturn.com>;+g.poc.talkburst;i." 0 +40 140
s0000h++ 2007-10-09 19:59:53.795 00848<p00:3294 "..sfocus..Content-Type: application/confer@" 0 +40 140
s0000h++ 2007-10-09 19:59:53.795 00848<p00:3295 "..ence-info+xml..Event: conference..Subscr." 0 +40 140
s0000h++ 2007-10-09 19:59:53.795 00848<p00:3296 "..iption-State: active..User-Agent: Ericss0" 0 +40 140
s0000h++ 2007-10-09 19:59:53.796 00848<p00:3297 "..on-MRFC/R8A_1_01....<?xml version="1.0" @" 0 +40 140
s0000h++ 2007-10-09 19:59:53.796 00848<p00:3298 "..encoding="UTF-8"?>.<conference-info vers." 0 +40 140
s0000h++ 2007-10-09 19:59:53.796 00848<p00:3299 "..ion="0" state="full" entity="sip:ysWJ?KY." 0 +40 140
s0000h++ 2007-10-09 19:59:53.796 00848<p00:3300 ". MWlYrlYxCsiwPyqPXiwyqNWJ3KYMs.9dsiiwiwXw0" 0 +40 140
s0000h++ 2007-10-09 19:59:53.796 00848<p00:3301 ".(wwyqPiXqXQQQ@mrc.saturn.com;session=1-1"." 0 +40 140
s0000h++ 2007-10-09 19:59:53.796 00848<p00:3302 ".0>.<users>.<user entity="tel:+19726751926 " 0 +40 140
s0000h++ 2007-10-09 19:59:53.796 00848<p00:3303 ".8">.<display-text>1926</display-text>.<en." 0 +40 140
s0000h++ 2007-10-09 19:59:53.796 00848<p00:3304 ".@dpoint entity="sip:1926@172.17.100.18:140" 0 +40 140
s0000h++ 2007-10-09 19:59:53.796 00848<p00:3305 ".H39">.<status>connected</status>.</endpoi." 0 +40 140
s0000h++ 2007-10-09 19:59:53.796 00848<p00:3306 ".Pnt>.</user>.</users>.</conference-info>. " 0 +40 140
s0000h++ 2007-10-09 19:59:53.796 00848<p00:3307 ".]...!]Pb..T)..Y>.zA.Vj.ˇ.].BF........FY:. " 1 0 127 e01 +00 p39 { 3277 3278 3279 3280 3281 3282 3283 3284 3285 3286 3287 3288 3289 3290 3291 3292 3293 3294 3295 3296 3297 3298 3299 3300 3301 3302 3303 3304 3305 3306 3307.0 ship-1200 }
s4076h?! 2007-10-09 19:59:53.797 00848>p00:1604 ". 275eb99675b0fa05e28jaaaaaaiaaaaaac01gpga." 0 +40 140
s4077h?! 2007-10-09 19:59:53.797 00848>p00:1605 ".(3Zqkv7fmmc0pyrqngtca..t: "1946" <sip:197." 0 +40 140
s4078h?! 2007-10-09 19:59:53.797 00848>p00:1606 ".026751946@saturn.com>;tag=58868..f: "1926." 0 +40 140
s4079h?! 2007-10-09 19:59:53.797 00848>p00:1607 ".8" <sip:19726751926@saturn.com>;tag=pft+eO" 0 +40 140
s4080h?! 2007-10-09 19:59:53.817 00848>p00:1608 ".@9f70905d4bc2741e7924cc765da5f12..CSeq: 8." 0 +40 140
s4081h?! 2007-10-09 19:59:53.817 00848>p00:1609 ".H917054 INVITE..i: 571e4da62b0a01929604be." 0 +40 140
s4082h?! 2007-10-09 19:59:53.817 00848>p00:1610 ".P04be913d8c..m: "1946" <sip:1946@172.17.1." 0 +40 140
s4083h?! 2007-10-09 19:59:53.817 00848>p00:1611 ".\00.19:1464>;+g.poc.talkburst;+g.poc.grou<" 0 +40 140
s0000h++ 2007-10-09 19:59:53.837 00848>p00:1624 "..audio 59010 RTP/AVP 109..a=rtpmap:109 AM." 0 +40 140
s0000h++ 2007-10-09 19:59:53.837 00848>p00:1625 "..R/8000/1..a=ptime:200..a=maxptime:400..a." 0 +40 140

TABLE 4-continued

Debug (verbose) printout detailing the decisions and data
encountered during the reassembly procedure of the saple
layer 2 log s0000h++ 2007-10-09 19:59:53.837 00848>p00:1626 "..=fmtp:109 mode-set=1;octet-align=1..a=+g." 0
+40 140
s0000h++ 2007-10-09 19:59:53.837 00848>p00:1627 "...poc.talkburst..m=application 59011 udp 2" 0
+40 140
s0000h++ 2007-10-09 19:59:53.857 00848>p00:1628 "..TBCP..a=fmtp:TBCP queuing=0;timestamp=0;." 0
+40 140
s0000h++ 2007-10-09 19:59:53.857 00848>p00:1629 "..tb__granted=0;poc__sess__priority=1;poc__lock<" 0
+40 140
s0000h++ 2007-10-09 19:59:53.876 00848>p00:1630 getline: 0, NR: 876, ERRNO: 0
"...k=0..E..c.e..E..0..d..........O7.SIP/2.<.O7.SIP/2.<" 1 5 e01 +05 +45 145 { 1602 1603 1604
1605 1606 1607 1608 1609 1610 1611 1612 1613 1614 1615 1616 1617 1618 1619 1620 1621 1622 1623
1624 1625 1626 1627 1628 1629 1630.0 ship-1159 }
UE <>pmi=fSeq-xSeq :    {UE reference, direction, pdu/sdu, modId, first-expected seq. no.}
00848>p00=1631-1631
00847<p00=2113-2113
00847>p00=2951-2951
00848<p00=3308-3308
bash-3.2$ The invention:
1. Enables seamless integration of the measurements captured in radio network controller traces with measurements taken in the rest of the packet service network, resulting in increased productivity during performance monitoring activities
   a. Layer 2 trace logs contain useful and complete information, but in a format that is not ready for use in known commercially available network performance monitoring tools.
   b. Translation from layer 2 to layer 3 is done on a computer by a text-processing script that implements the process described herein (claim)
   c. The result is saved in the industry-standard PCAP format
   d. Most of the pertinent information captured on layer 2 is included in one PCAP record per layer 3 packet
   e. The remaining layer 2 information can be written in an additional PCAP record if required
2. Creates opportunities for new services, where layer 2 trace logs can be converted into layer 3 measurements for various performance monitoring purposes
   a. When embodied in a network performance monitoring device, can report layer 3 packet performance statistics, such as packet latency, packet size, packet emission time, layer 3 throughput, packet loss ratio: and layer 2 frame statistics, such as frame error rate, frame size, frame transmission rate (layer 2 throughput)
   b. Data thus collected can be analyzed to detect and localize access network impairments and reduce the cost of improve the service performance by focusing on the solution of the right impairment at the right place
3. Enables the viewing of trace log output in well-known performance monitoring tools, boosting the value of equipment producing layer 2 traces
4. Enables savings in measurement and protocol analyzer equipment
5. Performs well on commonly available hardware and software
   a. The script implementation runs the gawk interpreter, which is preinstalled on or freely available for platforms, including GNU/Linux, Sun Solaris™, and Microsoft® Windows
   b. Runs in a pipelined fashion
      i. As soon as a packet is reassembled it is written out. The memory left behind is reclaimed and reused to process the next packet.
      ii. Memory footprint used by the process is carefully kept as small as possible, with size determined by the number of packets outstanding at any given instant.
      iii. No intermediate file is created
      iv. Access to external resources (disk or input/output) is minimal, consists only of reading layer 2 packets from RNC, and writing results.
   c. The script implementation is fast: When run on a moderate desktop or laptop, it translates a layer 2 trace into the layer 3 packet stream several orders of magnitude (10 or more times) faster than the network creates it.
6. Easily implemented on a wide range of platforms
   a. The process can be implemented as a standalone script using the standard scripting and text stream processing languages such as Awk, Perl, or Lisp, for running on a PC or workstation having the corresponding interpreter (gawk, perl, or emacs). When integrated with the end-user's desktop, this allows quick on-demand use for processing previously stored traces.
   b. The process can be implemented as a compiled program written in the appropriate language of the target platform, such as C/C++, Java, Erlang, or .Net, and integrated with a larger system, such as the performance monitoring system, or the RNC itself.
   c. A custom implementation can form part of the core of a standalone performance monitoring probe, a small piece of hardware that is:
      i. built for this purpose (performance monitoring)
      ii. embodies an implementation of the process
      iii. contains interfaces towards the RNC and performance measurement collector
      iv. controlled, monitored, and updated remotely.
7. Enables flexible customization of format, detail level, and processing, reducing cost and improving lead time when log formats, protocols, or presentation requirements change.

a. The script implementation is an editable text file with that can be modified at will, in the field, to:
  i. Adapt the reading of layer 2 frames to suit a change in the structure of the trace log produced by the RNC
  ii. Change result record format match the requirement of a new performance monitor
  iii. Implement aggregation, counting, or other statistic extraction at layer 2 or 3, and produce statistical summaries
b. The script implementation uses well-known, standard regular expression syntax to match a pattern and to process the match. The regular expression can be modified in an easily predictable way, allowing the script to be maintained reliably, while providing flexibility to the field engineer.

| Abbreviations | |
|---|---|
| ATM | Asynchronous Transfer Mode |
| BSC | Base Station controller |
| Cell | Indexed Memory location to store a piece of data |
| chanId | Channel Identity |
| Ethereal | A Protocol Analysis Tool built for communications interfaces commonly used in the computer industry. Renamed as "Wireshark" in 2006 and otherwise referred to as performance monitor herein. |
| IP | Internet protocol |
| IRDA | Infrared Data Association |
| mod | Modulo function |
| MPBN | Mobile Packet Backbone Network |
| OSI | Open System Interconnection |
| PCAP | Packet capture log format, which is commonly used in the computer industry |
| PDU | Protocol Data Unit (layer 2) |
| RAN | Radio access network |
| RLC | Radio link control |
| RNC | Radio network controller |
| SDU | Service Data Unit (layer 3) |
| seqNo | Frame sequence number |
| UE | User equipment |
| W | Window size for RLC protocol |
| WiFi | Wireless Fidelity, common name for IEEE 802.11 Wireless fixed Access Standard |
| Wireshark | New name of Ethereal |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for measuring performance of wireless packet communications, the system comprising:
a first node;
a base station that communicates with the first node;
a radio network controller (RNC) in communication with the base station, the RNC comprising a trace function for capturing a copy of each layer 2 radio link control layer frame of a layer 2 frame flow from the first node;
a network in communication with the RNC and a computer, the computer including a first-in-first-out-bit stream buffer having an in port and an out port:
  processing the layer 2 frame copies and reassembling the layer 2 frame flow into a corresponding flow of layer 3 packets, the layer 3 packets having corresponding timing information based on layer 2 frame timing provided by the RNC;
  detecting a number of lines containing data bytes following the logging unit header;
  reading each data byte from a data frame logging unit stream, discarding the contents of first n bit positions in each data frame logging unit, where n is a data header size of data frame logging unit header, and
  with each subsequent byte read from the frame data logging unit stream into the in port of the first-in-first-out-bit stream buffer, taking a byte away from the out port of the buffer, the byte so removed from the buffer is appended to an array representing the data frame logging unit;
a performance monitor for monitoring performance of the network utilizing the layer packet flow;
and
a second node in communication with the network.

2. The system as described in claim 1 wherein the computer reads radio links control measurement sequentially, acting on data frame logging units in the measurements.

3. The system as described in claim 2 wherein each data frame logging unit includes a timestamp, a terminal identifier, a channel identifier, a direction indicator, a frame type indicator, a sequence number, bearer type, and data bytes.

4. The system as described in claim 1, wherein the computer detects a beginning of a data frame logging unit delivered in multi-line textual format, and extracts a logging unit header, the logging unit header including a corresponding timestamp, terminal identifier, channel identifier, direction indicator, frame type indicator, sequence number, bearer type, data frame size, and data header size.

5. The system as described in claim 1, wherein the computer detects an end of the sequence of data bytes in the data frame logging unit.

6. The system as described in claim 5, wherein the computer filters out any line of trace log text that contains information germane to packet flow and that is not part of the logging unit to save memory and processing time resources during reassembly of the sequence of layer 3 packets.

7. The system as described in claim 4 wherein the computer constructs a channel identity based on the terminal identifier, channel identifier, direction, and channel type.

8. The system as described in claim 7 wherein the computer derives for each channel identity an expected frame sequence number for a next frame by incrementing a last sequence number received.

9. The system as described in claim 8 including a reassembly data store corresponding to the channel identity, and wherein the computer stores the data frame in a storage cell corresponding to the sequence number on the data store if the sequence number is equal to an expected sequence number and the data frame is free of error.

10. The system as described in claim 6 wherein, for capturing a layer 3 packet start time, the computer writes an artificial Internet Control Message Protocol (ICMP) Timestamp Request packet in Packet Capture (PCAP) format, with the timestamp of a first data frame starting the reassembly of each layer 3 packet.

11. The system as described in claim 10, wherein the writing by the computer of the ICMP Timestamp Request packet indicating packet start time can be enabled or disabled by a switch.

12. The system as described in claim 10 wherein the computer writes the reassembled layer 3 packet in PCAP format, with the timestamp of a last data frame completing the reassembly.

13. The system as described in claim 8 including an outstanding frames counter, and wherein if the received frame sequence number exceeds the expected number, by less than a threshold, then intervening frames are considered to have been lost, and the outstanding frames counter is incremented by the number of intervening frames.

14. The system as described in claim 13 wherein the computer recognizes as outstanding, and stores, the received frame number sequence in the storage cell if the received frame sequence number is less than the expected frame sequence number and has a corresponding empty cell in the data store, and decrements the corresponding outstanding frames counter by one.

15. The system as described in claim 14 wherein the computer has reassembled the layer 3 packet if the data frame contains an end of a service data unit and if there are no outstanding packets.

16. A method for measuring performance of wireless packet communications comprising the steps of:
   establishing a wireless packet data communication between a first user and a second user, where the first user communicates with the second user through a wireless packet data terminal, a base station, a radio network controller (RNC), a mobile packet network, an external packet network, and the second user's communication network;
   measuring performance of the communication by collecting measurement logs of layer 2 radio link control layer frames sent from the wireless packet data terminal by switching on a trace function built into the radio network controller for such measurement;
   transferring the collected layer 2 measurement logs to a computer, the computer, including a first-in-first-out-bit stream buffer having an in port and an out port,
   processing the measurement logs;
   reassembling a sequence of layer 3 packets from a sequence of the layer 2 radio link control layer data frames in regard to the measurement logs, the layer 3 packets having timing information corresponding to layer 2 frame timing provided by the RNC;
   detecting a number of lines containing data bytes following the logging unit header; and
   reading each data byte from a data frame logging unit stream, discarding the contents of first n bit positions in each data frame logging unit, where n is given by a size of data frame logging unit header, and with each subsequent byte read from the frame data logging unit stream into the in port of the first-in-first-out-bit stream buffer, taking a byte away from the out port of the buffer, the byte so removed from the buffer is appended to an array representing the data frame logging unit.

17. The method as described in claim 16 wherein the reassembling step includes the steps of the computer reading radio link control measurements sequentially, and acting on data frame logging units in the measurements.

18. The method as described in claim 16 wherein each unit includes a timestamp, a terminal identifier, a channel identifier, a direction indicator, a frame type indicator, a sequence number, bearer type, and data bytes and the reassembling step includes the steps of the computer detecting a beginning of a data frame logging unit delivered in multi-line textual format, and extracting the corresponding timestamp, terminal identifier, channel identifier, direction, indicator, frame type indicator, sequence number, bearer type, data frame size, and data header size, hereafter collectively called a logging unit header.

19. The method as described in claim 16, wherein the reassembling step includes the step of the computer detecting an end of the sequence of data bytes in a logging unit.

20. The method as described in claim 16 wherein the reassembling step includes the step of the computer filtering out any line of trace log text that contains information germane to a packet flow and that is not part of the logging unit to save memory and processing time resources during the reassembly step.

21. The method as described in claim 16 wherein the reassembling step includes the step of the computer constructing a channel identity based on the terminal identifier, channel identifier, direction, and channel type.

22. The method as described in claim 16 wherein the reassembling step includes the step of the computer deriving for each channel identity an expected frame sequence number for a next frame by incrementing a last sequence number received.

23. The method as described in claim 16 including a reassembly data store corresponding to the channel identity, wherein the reassembling step includes the step of the computer storing the data frame in a storage cell corresponding to the sequence number on the data store if the sequence number is equal to an expected sequence number and the data frame is free of error.

24. The method as described in claim 16 wherein, for capturing a layer 3 packet start time, the reassembling step includes the step of the computer writing an artificial Internet Control Message Protocol (ICMP) Timestamp Request packet in Packet Capture (PCAP) format, with the timestamp of a first data frame starting the reassembly of layer 3 packets.

25. The method as described in claim 24, wherein the writing by the computer of the ICMP Timestamp Request packet indicating packet start time can be enabled or disabled by a switch.

26. The method as described in claim 16, wherein the reassembling step includes the step of the computer writing the reassembled layer 3 packet in PCAP format, with the timestamp of a last data frame completing the reassembly.

27. The method as described in claim 22 including an outstanding frames counter, and wherein if the received frame sequence number exceeds the expected number, by less than a threshold, then intervening frames are considered to have been lost, and there is the step of the outstanding frames counter being incremented by the number of intervening frames.

28. The method as described in claim 27 wherein the reassembling step includes the step of the computer recognizing as outstanding and then storing the received frame number sequence in the storage cell if the received frame sequence number is less than the expected frame sequence number and has a corresponding empty cell in the data store, and decrementing the corresponding outstanding frames counter by one.

29. The method as described in claim 28 wherein the computer has reassembled the layer 3 packet if the data frame contains an end of a service data unit and if there are no outstanding packets.

* * * * *